(12) United States Patent
Otsuka

(10) Patent No.: US 12,084,115 B2
(45) Date of Patent: Sep. 10, 2024

(54) FORMED ARTICLE, STRUCTURAL MEMBER USING THE SAME, AND MANUFACTURING METHOD OF FORMED ARTICLE

(71) Applicant: NIPPON STEEL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 2 days.

(21) Appl. No.: 17/766,655

(22) PCT Filed: Oct. 9, 2019

(86) PCT No.: PCT/JP2019/039906
§ 371 (c)(1),
(2) Date: Apr. 5, 2022

(87) PCT Pub. No.: WO2021/070304
PCT Pub. Date: Apr. 15, 2021

(65) Prior Publication Data
US 2023/0101313 A1    Mar. 30, 2023

(51) Int. Cl.
*B62D 25/00* (2006.01)
*B21D 5/01* (2006.01)
(Continued)

(52) U.S. Cl.
CPC ............... *B62D 25/00* (2013.01); *B21D 5/01* (2013.01); *B21D 19/08* (2013.01); *B21D 22/06* (2013.01);
(Continued)

(58) Field of Classification Search
CPC ........ B21D 53/88; B21D 47/01; B21D 5/086; B21D 19/08; B21D 22/06; B21D 22/225;
(Continued)

(56) References Cited

U.S. PATENT DOCUMENTS 5,306,058 A * 4/1994 Sturrus ................ B21D 53/88
293/154
5,803,517 A * 9/1998 Shibuya ................ B60R 19/18
293/120

(Continued)

FOREIGN PATENT DOCUMENTS

EP          3 130 409 A1    2/2017
ES          2360247 T3 *    6/2011  ............. B60R 19/18
(Continued)

*Primary Examiner* — Theodore V Adamos
(74) *Attorney, Agent, or Firm* — Birch, Stewart, Kolasch & Birch, LLP

(57) ABSTRACT

A long formed article made of one steel sheet includes a top sheet portion, a standing wall portion, and a protrusion portion formed in a portion of the top sheet portion by overlapping a portion extending toward an outside from each of both ends of the top sheet portion and a portion extending toward the outside from an upper end of the standing wall portion, in a non-protrusion region, a recessed part is formed in the top sheet portion, and a total value $\alpha$ of inner surface peripheral lengths of the top sheet portion and the standing wall portion in a cross section of the formed article in a protrusion region and a total value $\beta$ of inner surface peripheral lengths of the top sheet portion, the standing wall portion, and the recessed part in the cross section of the formed article in the non-protrusion region satisfy $1.01 \leq \beta/\alpha \leq 1.50$.

10 Claims, 32 Drawing Sheets

(51) Int. Cl.
*B21D 19/08* (2006.01)
*B21D 22/06* (2006.01)
*B21D 22/22* (2006.01)
*B21D 24/06* (2006.01)
*B21D 37/08* (2006.01)

(52) U.S. Cl.
CPC ........... *B21D 22/225* (2013.01); *B21D 24/06* (2013.01); *B21D 37/08* (2013.01)

(58) Field of Classification Search
CPC .................... B21D 24/06; B21D 37/08; B60R 2019/1813; B60R 2019/1826; B60R 2019/182; B60R 2019/1806; B60R 19/023; B60R 19/18; B60R 19/24; B60R 2019/183; Y10T 29/49622; B64C 1/06; B64C 1/061; B64C 1/064; B64C 1/12; B64C 1/068; B64C 3/182; E04C 3/07; E04C 2003/0452; E04C 2003/046; E04C 2003/0404; E04C 2003/0413; E04C 2003/0421; E04C 2003/0443; B62D 25/00

See application file for complete search history.

(56) References Cited

U.S. PATENT DOCUMENTS

| | | | | |
|---|---|---|---|---|
| 7,108,303 | B2* | 9/2006 | Bladow | B60R 19/18 293/122 |
| 7,407,219 | B2* | 8/2008 | Glasgow | B60R 19/18 293/133 |
| 8,985,632 | B1* | 3/2015 | Heckman | B62D 25/04 280/801.2 |
| 9,975,506 | B2* | 5/2018 | Handing | B60R 19/03 |
| 11,518,325 | B2* | 12/2022 | Nogiwa | B21D 53/88 |
| 2016/0325330 | A1 | 11/2016 | Nitta et al. | |
| 2017/0129429 | A1* | 5/2017 | Handing | B60R 19/18 |
| 2019/0300060 | A1 | 10/2019 | Otsuka | |

FOREIGN PATENT DOCUMENTS

| | | | |
|---|---|---|---|
| JP | 9-249155 A | 9/1997 | |
| JP | 2008-155749 A | 7/2008 | |
| JP | 2008-265609 A | 11/2008 | |
| JP | 2010-242168 A | 10/2010 | |
| JP | 2011-67841 A | 4/2011 | |
| JP | 2011-83807 A | 4/2011 | |
| JP | 2013-27894 A | 2/2013 | |
| WO | WO-2018012603 A1 * | 1/2018 | ........... B21D 22/022 |

* cited by examiner

SAMPLE 1

SAMPLE 2

SAMPLE 3

SAMPLE 4

ANGLE X=105°

ANGLE X=120°

ANGLE X=105°

ANGLE X=120°

FORMED ARTICLE, STRUCTURAL MEMBER USING THE SAME, AND MANUFACTURING METHOD OF FORMED ARTICLE

TECHNICAL FIELD OF THE INVENTION

The present invention relates to a formed article, a structural member using the same, and a manufacturing method of a formed article.

RELATED ART

Structural members of automobiles (particularly long members) are required to have high characteristics in a three-point bending test in order to improve collision safety performance. Therefore, in the related arts, various proposals have been made.

In the drawings of Patent Document 1 and Patent Document 2, a shock absorbing member including a part in which a steel sheet is triple-folded is described.

Patent Document 3 discloses a method of forming a recessed part in a wall portion of a member having a substantially hat-shaped cross section. In this method, a recessed part is formed by pressing the wall portion with a power feeding roller. Therefore, in this method, a portion protruding from the wall portion before forming the recessed part is not formed.

Patent Document 4 discloses a hollow columnar component in which a connection region between a standing wall portion and a top wall portion protrudes outward. The protruding part is not folded to increase the number of ridges in a cross section.

Patent Document 5 discloses a manufacturing method of a cross-section hat-shaped component in which a groove-shaped bead portion is formed along a longitudinal direction on a standing wall portion.

Patent Document 6 discloses a frame component having a reinforcing portion formed in a connection portion between a top wall portion and a standing wall portion. This reinforcing portion includes an overlapping portion which is rolled into a semi-cylindrical shape (paragraph [0015] of Patent Document 6).

Patent Document 7 discloses a joining structure member in which a corner portion is formed in an oval concave shape or convex shape.

PRIOR ART DOCUMENT

Patent Document

[Patent Document 1] Japanese Unexamined Patent Application, First Publication No. 2008-265609
[Patent Document 2] Japanese Unexamined Patent Application, First Publication No. 2008-155749
[Patent Document 3] Japanese Unexamined Patent Application, First Publication No. 2010-242168
[Patent Document 4] Japanese Unexamined Patent Application, First Publication No. 2011-67841
[Patent Document 5] Japanese Unexamined Patent Application, First Publication No. 2011-83807
[Patent Document 6] Japanese Unexamined Patent Application, First Publication No. 2013-27894
[Patent Document 7] Japanese Unexamined Patent Application, First Publication No. H09-249155

DISCLOSURE OF THE INVENTION

Problems to be Solved by the Invention

The techniques described in Patent Documents 1 to 7 are aimed at improving impact characteristics and compression characteristics as compared with a hat-shaped structural member of the related art. However, at present, as a structural member of an automobile such as a side sill, a structural member capable of further enhancing collision safety performance is required. In other words, there is a demand for press-formed article with higher strength and higher characteristics in a three-point bending test.

Further, in the structural members described in Patent Documents 1 to 7, since a shock absorbing member and the like are provided over the entire length in a longitudinal direction of the structural member, there is a problem that free design is hindered. For example, when the structural members described in Patent Documents 1 to 7 are applied to a limited space, further improvements and ingenuity such as further processing or joining with other members are required.

One of objects of the present invention made in view of such a situation is to provide a formed article having high strength, high characteristics in a three-point bending test and a high degree of freedom in design, and a structural member using the same. Further, one of the objects of the present invention is to provide a manufacturing method of the formed article.

Means for Solving the Problem (1) According a first aspect of the present invention, there is provided a long formed article made of one steel sheet, the formed article including: a top sheet portion which extends in a longitudinal direction; a standing wall portion which extends downward from each of both edges of the top sheet portion in a width direction; and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which in the longitudinal direction of the formed article, when a region provided with the protrusion portion is defined as a protrusion region and a region not provided with the protrusion portion is defined as a non-protrusion region, in the non-protrusion region, a recessed part extending in the longitudinal direction is formed in the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion, the standing wall portion, and the recessed part in the cross section of the formed article perpendicular to the longitudinal direction in the non-protrusion region satisfy $1.01 \leq \beta/\alpha \leq 1.50$.

(2) According a first aspect of the present invention, there is provided a long formed article made of one steel sheet, the formed article including: a top sheet portion which extends in a longitudinal direction; a standing wall portion which extends downward from each of both edges of the top sheet portion in a width direction; and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which in the longitudinal direction of the formed article, when a region provided with the protrusion portion is defined as a protrusion region and a region not provided with the protrusion portion is defined as a non-protrusion region, in the non-protrusion region, the top sheet portion includes an enlarged top sheet portion which extends in the width direction from the top sheet portion and is connected to the standing wall portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion including the enlarged top sheet portion and the standing wall portion in the cross section of the formed article perpendicular to the longitudinal direction in the non-protrusion region satisfy $1.01 \leq \beta/\alpha \leq 1.50$.

(3) According a third aspect of the present invention, there is provided a long formed article made of one steel sheet, the formed article including: a top sheet portion which extends in a longitudinal direction; a standing wall portion which extends downward from each of both edges of the top sheet portion in a width direction; and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which in the longitudinal direction of the formed article, when a region provided with the protrusion portion is defined as a protrusion region and a region not provided with the protrusion portion is defined as a non-protrusion region, in the non-protrusion region, the standing wall portion includes an enlarged standing wall portion which extends upward from the standing wall portion and is connected to the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion and the standing wall portion including the enlarged standing wall portion in the cross section of the formed article perpendicular to the longitudinal direction in the non-protrusion region satisfy $1.01 \leq \beta/\alpha \leq 1.50$.

(4) The formed article according to any one of (1) to (3), may further include a flange portion which extends toward the outside from a lower end of the standing wall portion.

(5) In the formed article according to any one of (1) to (4), a length of the protrusion region in the longitudinal direction is 30% or more of an entire length of the formed article in the longitudinal direction.

(6) In the formed article according to any one of (1) to (5), in the protrusion portion, a portion extending from the top sheet portion and a portion extending from the standing wall portion may be in close contact with each other.

(7) In the formed article according to any one of (1) to (6), in the protrusion portion, a portion extending from the top sheet portion and a portion extending from the standing wall portion may be joined to each other.

(8) In the formed article according to any one of claims 1 to 7, in the protrusion region, in the cross section of the formed article perpendicular to the longitudinal direction, an angle formed by the top sheet portion and the protrusion portion may be 90° or more and 180° or less.

(9) According to a fourth aspect of the present invention, there is provided a structural member including: the formed article according to any one of (1) to (8); and a steel sheet member which is fixed to the formed article, in which in a cross-sectional view perpendicular to a longitudinal direction, the formed article and the steel sheet member form a closed cross section.

(10) The structural member according to (9) may further include an auxiliary member which is joined to at least one of the two standing wall portions and the top sheet portion, or at least one of the two standing wall portions and the top sheet portion.

(11) According to a fifth aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, a recessed part extending in the longitudinal direction is formed in the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion, the standing wall portion, and the recessed part in the cross section of the formed article perpendicular to the longitudinal direction in the non-protrusion region satisfy $1.01 \leq \beta/\alpha \leq 1.50$, the manufacturing method being performed using a pressing apparatus including an upper die and a lower die having a shape corresponding to the recessed part in the non-protrusion region and two movable dies movable in a vertical direction and a horizontal direction, the lower die including a punch die, and two movable plates which are disposed to sandwich the punch die therebetween and movable in the vertical direction, and including: (Ia) disposing a material steel sheet between the upper die and the two movable dies, and the lower die; (Ib) obtaining a deformed steel sheet in a state in which an end portion of the material steel sheet is interposed between the two movable dies and the two movable plates by lowering the two movable dies together with the two movable plates and moving the two movable dies toward the punch die; (IIa) restraining a portion of the deformed steel sheet by the two movable dies and a side surface portion of the punch die by further moving the two movable dies toward the punch die; and (IIb) pressing a portion of the deformed steel sheet by the upper die and the punch die by lowering the upper die and overlapping a portion of the deformed steel sheet between the upper die and the movable die to form the formed article having the top sheet portion with the recessed part formed thereon.

(12) According to a sixth aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, the top sheet portion includes an enlarged top sheet portion which extends in the width direction from the top sheet portion and is connected to the standing wall portion, and a total value α of inner surface peripheral lengths of the top sheet portion and the standing wall portion in a cross section of the formed article perpendicular to the longitudinal direction in the protrusion region and a total value β of inner surface peripheral lengths of the top sheet portion including the enlarged top sheet portion and the standing wall portion in the cross section of the formed article perpendicular to the longitudinal direction in the non-protrusion region satisfy $1.01 \leq \beta/\alpha \leq 1.50$, the manufacturing method being performed using a pressing apparatus including an upper die and a lower die having a shape corresponding to the enlarged top sheet portion in the non-protrusion region and two movable dies movable in a vertical direction and a horizontal direction, the lower die including a punch die, and two movable plates which are disposed to sandwich the punch die therebetween and movable in the vertical direction, and including: (Ia) disposing a material steel sheet between the upper die and the two movable dies, and the lower die; (Ib) obtaining a deformed steel sheet in a state in which an end portion of the material steel sheet is interposed between the two movable dies and the two movable plates by lowering the two movable dies together with the two movable plates and moving the two movable dies toward the punch die; (IIa) restraining a portion of the deformed steel sheet by the two movable dies and a side surface portion of the punch die by further moving the two movable dies toward the punch die; and (IIb) pressing a portion of the deformed steel sheet by the upper die and the punch die by lowering the upper die and overlapping a portion of the deformed steel sheet between the upper die and the movable die to form the formed article having the top sheet portion including the enlarged top sheet portion.

(13) According to a seventh aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, the standing wall portion includes an enlarged standing wall portion which extends upward from the standing wall portion and is connected to the top sheet portion, and a total value α of inner surface peripheral lengths of the top sheet portion and the standing wall portion in a cross section of the formed article perpendicular to the longitudinal direction in the protrusion region and a total value β of inner surface peripheral lengths of the top sheet portion and the standing wall portion including the enlarged standing wall portion in the cross section of the formed article perpendicular to the longitudinal direction in the non-protrusion region satisfy $1.01 \leq \beta/\alpha \leq 1.50$, the manufacturing method being performed using a pressing apparatus including an upper die and a lower die having a shape corresponding to the enlarged standing wall portion in the non-protrusion region and two movable dies movable in a vertical direction and a horizontal direction, the lower die including a punch die, and two movable plates which are disposed to sandwich the punch die therebetween and movable in the vertical direction, and including: (Ia) disposing a material steel sheet between the upper die and the two movable dies, and the lower die; (Ib) obtaining a deformed steel sheet in a state in which an end portion of the material steel sheet is interposed between the two movable dies and the two movable plates by lowering the two movable dies together with the two movable plates and moving the two movable dies toward the punch die; (IIa) restraining a portion of the deformed steel sheet by the two movable dies and a side surface portion of the punch die by further moving the two movable dies toward the punch die; and (IIb) pressing a portion of the deformed steel sheet by the upper die and the punch die by lowering the upper die and overlapping a portion of the deformed steel sheet between the upper die and the movable die to form the formed article having the standing wall portion including the enlarged standing wall portion.

(14) In the manufacturing method of a formed article according to any one of (11) to (13), the deformed steel sheet obtained in (Ib) may have a long shape and include a top sheet portion equivalent portion which becomes the top sheet portion, a standing wall portion equivalent portion which becomes the standing wall portion, a protrusion portion equivalent portion which becomes the protrusion portion, and a flange portion equivalent portion which becomes the flange portion, in (Ib), the flange portion equivalent portion may be interposed between the two movable dies and the two movable plates, in (IIa), the standing wall portion equivalent portion may be restrained by the two movable dies and a side surface portion of the punch die, and in (IIb), the upper die may be lowered, and thus, the top sheet portion equivalent portion may be pressed by the upper die and the punch die, and at least a portion of the protrusion portion equivalent portion may be overlapped between the upper die and the movable die.

(15) The manufacturing method of a formed article according to any one of (11) to (14) may further include cutting the flange portion after the forming of the formed article.

(16) In the manufacturing method of a formed article according to any one of (11) to (15), when viewing the cross section of the formed article, an angle formed by the top sheet portion and the protrusion portion may be 90° or more and 135° or less, and (IIa) may be completed after (IIb) is completed.

(17) In the manufacturing method of a formed article according to any one of (11) to (15), when viewing the cross section of the formed article, an angle formed by the top sheet portion and the protrusion portion may be 135° or more and 180° or less, and (IIb) may be completed after (IIa) is completed.

(18) The manufacturing method of a formed article according to any one of (11) to (17) may further include heating the material steel sheet before (Ia), in which in (Ia) and (Ib), a state where the punch die and the material steel sheet are not in contact with each other may be maintained, and in (IIa), a state where an upper surface portion of the punch die and the deformed steel sheet are not in contact with each other may be maintained.

(19) According to an eighth aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, a recessed part extending in the longitudinal direction is formed in the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion, the standing wall portion, and the recessed part in the cross section of the formed article perpendicular to the longitudinal direction in the non-protrusion region satisfy $1.01 \leq \beta/\alpha \leq 1.50$, the manufacturing method including: a first step of deforming a material steel sheet to obtain a deformed steel sheet which has a long shape and includes a top sheet portion equivalent portion which becomes the top sheet portion, a standing wall portion equivalent portion which becomes the standing wall portion, a protrusion portion equivalent portion which becomes the protrusion portion, and a flange portion equivalent portion which becomes the flange portion; and a second step of forming the deformed steel sheet to form the formed article, in which in the second step, the protrusion portion having the top sheet portion formed with the recessed part is formed by overlapping at least a portion of the protrusion portion equivalent portion.

(20) According to a ninth aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, the top sheet portion includes an enlarged top sheet portion which extends in the width direction from the top sheet portion and is connected to the standing wall portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion including the enlarged top sheet portion and the standing wall portion in the cross section of the formed article perpendicular to the longitudinal direction in the non-protrusion region satisfy $1.01 \leq \beta/\alpha \leq 1.50$, the method including: a first step of deforming a material steel sheet to obtain a deformed steel sheet which has a long shape and includes a top sheet portion equivalent portion which becomes the top sheet portion, two standing wall portion equivalent portions which become the standing wall portions, a protrusion portion equivalent portion which becomes the protrusion portion, and a flange portion equivalent portion which becomes the flange portion; and a second step of forming the deformed steel sheet to form the formed article, in which in the second step, the protrusion portion having the top sheet portion including the enlarged top sheet portion is formed by overlapping at least a portion of the protrusion portion equivalent portion.

(21) According to a tenth aspect of the present invention, there is provided a manufacturing method of a formed article which is long and made of one steel sheet, the formed article including a top sheet portion which extends in a longitudinal direction, a standing wall portion which extends downward from each of both edges of the top sheet portion in a width direction, a flange portion which extends from a lower end of the standing wall portion, and a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, in which when a region provided with the protrusion portion is defined as a protrusion region and a region not provided with the protrusion portion is defined as a non-protrusion region in the longitudinal direction of the formed article, in the non-protrusion region, the standing wall portion includes an enlarged standing wall portion which extends upward from the standing wall portion and is connected to the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion and the standing wall portion including the enlarged standing wall portion in the cross section of the formed article perpendicular to the longitudinal direction in the non-protrusion region satisfy $1.01 \leq \beta/\alpha \leq 1.50$, the method including: a first step of deforming a material steel sheet to obtain a deformed steel sheet which has a long shape and includes a top sheet portion equivalent portion which becomes the top sheet portion, a standing wall portion equivalent portion which becomes the standing wall portion, a protrusion portion equivalent portion which becomes the protrusion portion, and a flange portion equivalent portion which becomes the flange portion; and a second step of forming the deformed steel sheet to form the formed article, in which in the second step, the protrusion portion having the standing wall portion including the enlarged standing wall portion is formed by overlapping at least a portion of the protrusion portion equivalent portion.

(22) The manufacturing method of a formed article according to any one of (19) to (21) may further include cutting the flange portion after the second step.

(23) The manufacturing method of a formed article according to any one of (19) to (22) may further include heating the deformed steel sheet after the first step and before the second step, in which in the second step, hot press forming may be performed by a press die including an upper die and a lower die having a protrusion and two cam dies, and after the heating, the deformed steel sheet may be disposed in a state where the protrusion of the lower die and the deformed steel sheet are not in contact with each other.

Effects of the Invention

According to the present invention, it is possible to obtain a formed article having high strength, high characteristics in a three-point bending test, and a high degree of freedom in design, and a structural member using the formed article. Further, according to a manufacturing method according to the present invention, the formed article can be easily manufactured.

EMBODIMENTS OF THE INVENTION

As a result of diligent studies in order to obtain a formed article having a high degree of freedom in design, high strength, and high characteristics in a three-point bending test, the present inventors have newly found that properties against collision are improved by a specific structure.

Hereinafter, the present invention made based on the above new findings will be described based on specific embodiments. In the following description, embodiments of the present invention will be described with examples, but it is obvious that the present invention is not limited to the examples described below.

In the following description, specific numerical values and materials may be exemplified, but other numerical values and materials may be applied as long as the effects of the present invention can be obtained.

First Embodiment

Hereinafter, a press-formed article 100 according to a first embodiment of the present invention will be specifically described.

Figure 1:
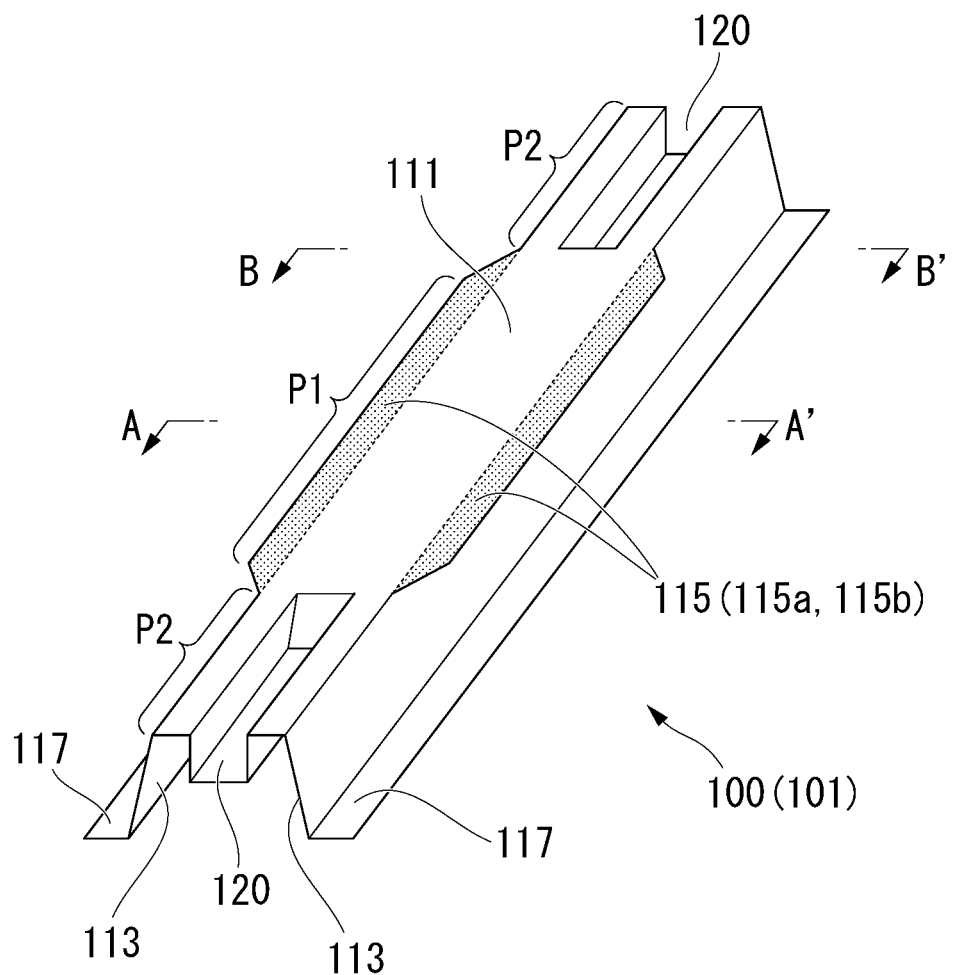
FIG. 1 is a perspective view schematically showing a press-formed article 100 according to one embodiment of the present invention.

FIG. 1 schematically shows a perspective view of the press-formed article 100 according to the present embodiment. As shown in FIG. 1, the press-formed article 100 according to the present embodiment has a top sheet portion 111, two standing wall portions 113, two protrusion portions 115, and two flange portions 117.

The top sheet portion is a horizontal wall portion that connects the two standing wall portions to each other. Therefore, in this specification, the top sheet portion can be read as the horizontal wall portion. When the press-formed article is disposed with the horizontal wall portion (top sheet portion) facing downward, the horizontal wall portion can also be referred to as a bottom sheet portion. However, in this specification, the horizontal wall portion is referred to as a top sheet portion based on a case where the horizontal wall portion is disposed above.

Further, in the following description, a material axis direction of the press-formed article 100 may be referred to as a longitudinal direction, and a direction perpendicular to the longitudinal direction and along the top sheet portion 111 may be referred to as a width direction. Further, in the direction perpendicular to the longitudinal direction and the width direction, the top sheet portion side may be referred to as an upper portion, and the flange portion side may be referred to as a lower portion.

The press-formed article 100 is formed by deforming one steel sheet 101 (material steel sheet). Specifically, as will be described below, the press-formed article is manufactured by press-forming one material steel sheet.

As the steel sheet constituting the press-formed article 100 of the present embodiment, TRIP steel, composite structure steel, steel sheet for hot stamping, precipitation strengthening steel, or the like can be used.

A tensile strength of the press-formed article 100 may be 590 MPa or more, 780 MPa or more, 980 MPa or more, or 1200 MPa or more. An upper limit of the tensile strength of the press-formed article 100 is not particularly limited, but is, for example, 2500 MPa. When a one-step manufacturing method described below is performed by hot stamping, or when a second step in a two-step manufacturing method is performed by hot stamping, the tensile strength of the press-formed article 100 can be higher than the tensile strength of the steel sheet(blank) which is the material.

When the tensile strength of the press-formed article 100 is equal to or more than the above value, in other words, in a metallographic structure of the press-formed article 100, a martensite structure is 20% or more in volume percentage, and when the tensile strength of the press-formed article is 1310 MPa or more and hot stamping is performed, the metallographic structure is a metallographic structure in which the martensite structure is 90% or more in volume percentage.

In the press-formed article 100, for example, when the tensile strength is 1500 MPa or more and the martensite structure is 90% or more in volume percentage, the Vickers hardness of the protrusion portion 115 may be 454 or more. Further, in this case, a ratio of the Vickers hardness of the protrusion portion to the Vickers hardness of the standing wall portion may be 0.95 or more.

As shown in FIG. 1, the press-formed article 100 has a long shape in which the top sheet portion 111, the standing wall portions 113, the protrusion portions 115, and the flange portions 117 all extend in the longitudinal direction. Of these, each of the top sheet portion 111, the standing wall portions 113, and the flange portions 117 extends in a flat sheet shape over the entire length in the longitudinal direction. Only a portion of the protrusion portion 115 in the longitudinal direction extends in a flat sheet shape.

In the following description, in the longitudinal direction of the press-formed article 100, a region provided with the protrusion portion 115 is defined as a protrusion region P1, and a region not provided with the protrusion portion 115 is defined as a non-protrusion region P2.

Figure 2A:
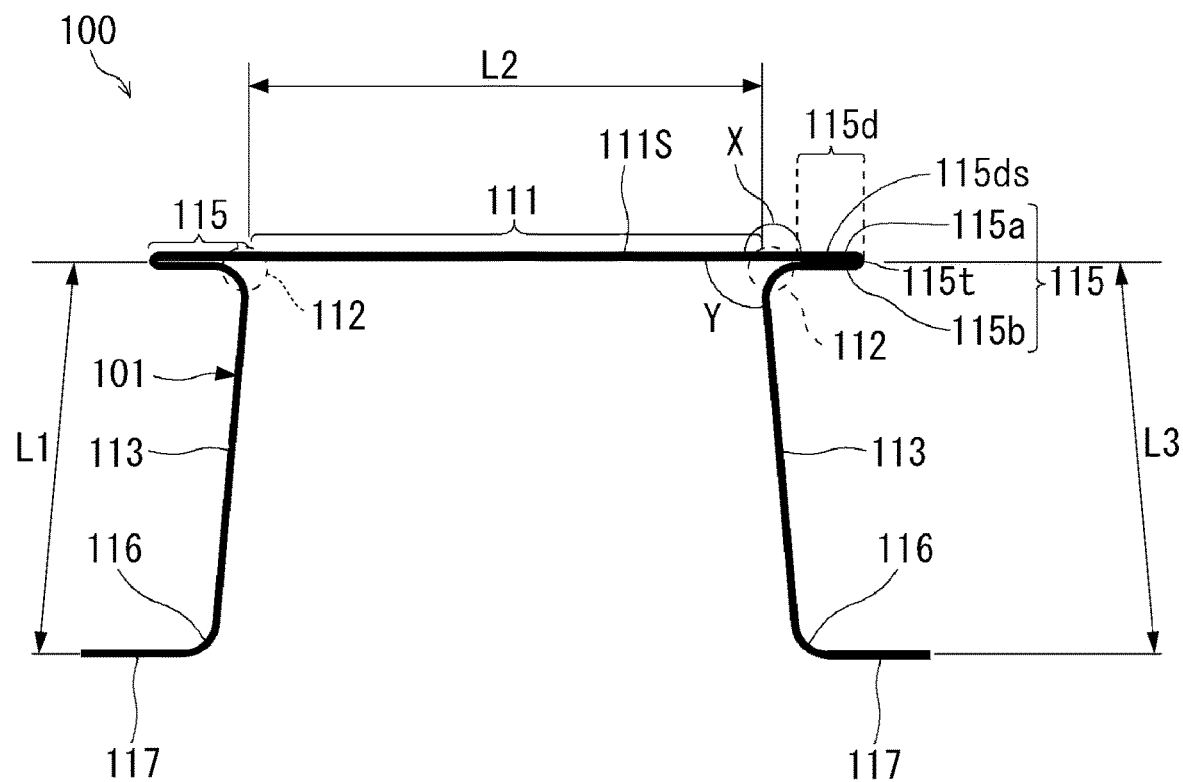
FIG. 2A is a cross-sectional view schematically showing a cross-sectional shape in a cross section taken along line A-A' of the press-formed article 100.
Figure 2B:
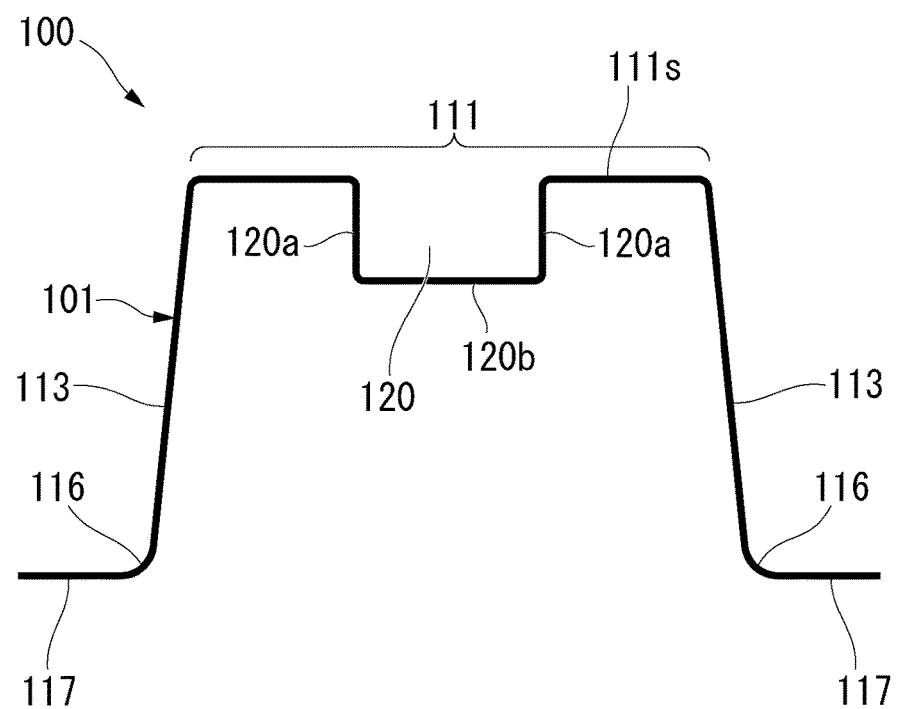
FIG. 2B is a cross-sectional view schematically showing a cross-sectional shape in a cross section taken along line B-B' of the press-formed article 100.

Here, FIG. 2A is a cross-sectional view taken along line A-A' of FIG. 1, and schematically showing a cross section of a surface of the press-formed article 100 perpendicular to the longitudinal direction in the protrusion region P1. Further, FIG. 2B is a cross-sectional view taken along line B-B' of FIG. 1, and schematically showing a cross section of a surface of the press-formed article 100 perpendicular to the longitudinal direction in the non-protrusion region P2.

A length of the protrusion region P1 in the longitudinal direction may be 30% or more of the entire length of the press-formed article 100 in the longitudinal direction. By setting the length of the protrusion region P1 of the press-formed article 100 in the longitudinal direction to 30% or more of the entire length of the press-formed article 100 in the longitudinal direction, even when the protrusion portion 115 is not provided over the entire length of the press-formed article 100, it is possible to obtain high strength and high characteristics in the three-point bending test.

More preferably, the length of the protrusion region P1 of the press-formed article in the longitudinal direction is 50% or more of the entire length of the press-formed article 100 in the longitudinal direction from the viewpoint of strength.

Hereinafter, a cross-sectional shape of the press-formed article 100 in the protrusion region P1 will be described.

As shown in FIG. 2A, when a surface perpendicular to the longitudinal direction is cross-sectionally viewed in the protrusion region P1, the press-formed article 100 has the top sheet portion 111, the standing wall portions 113, the protrusion portions 115, and the flange portions 117. The protrusion portion 115 has a shape protruding outward from a boundary portion 112 of a corner portion connecting the top sheet portion 111 and the standing wall portion 113 to each other. A cross section (cross section perpendicular to the longitudinal direction) of the press-formed article 100 excluding the protrusion portions 115 is a hat shape.

As shown in FIG. 2A, the protrusion portion 115 is formed by bending the steel sheets protruding from a portion of the top sheet portion 111 in the longitudinal direction and a portion of the standing wall portion 113 in the longitudinal direction at the tip end portion 115*t*. An overlapping portion 115*d* is present on at least the tip end portion 115*t* side of the protrusion portion 115. In the present embodiment, the "overlapping portion 115*d*" is a portion in which the steel sheet is doubly overlapped in the protrusion portion 115. The entire overlapping portion 115*d* has a plate-like shape.

More specifically, as shown in FIG. 2A, the protrusion portion 115 is configured by overlapping a portion 115*a* extending outward from each of both end portions in the width direction of the top sheet portion 111 and a portion 115*b* extending outward from an upper end of the standing wall portion 113.

In the configuration shown in FIG. 2A, the portion 115*a* is formed by extending outward from each of both end portions in the width direction of the top sheet portion 111 in the same plane as the top sheet portion 111. The portion 115*b* is formed by bending outward from the upper end of the standing wall portion 113 and extending outward.

Each of the portion 115*a* and the portion 115*b* is a portion of the steel sheet 101. The portion 115*a* is bent in the opposite direction at the tip end portion 115*t* and becomes the portion 115*b*.

In a region of the protrusion portion 115 other than the tip end portion 115*t*, a portion of the steel sheet constituting the protrusion portion 115 is curved but not bent. That is, in the protrusion portion 115 except for the tip end portion 115*t*, there is no ridge portion that protrudes toward the outside of the protrusion portion 115. Therefore, the press-formed article 100 is different from the components described in Patent Documents 4 and 5.

Figure 6:
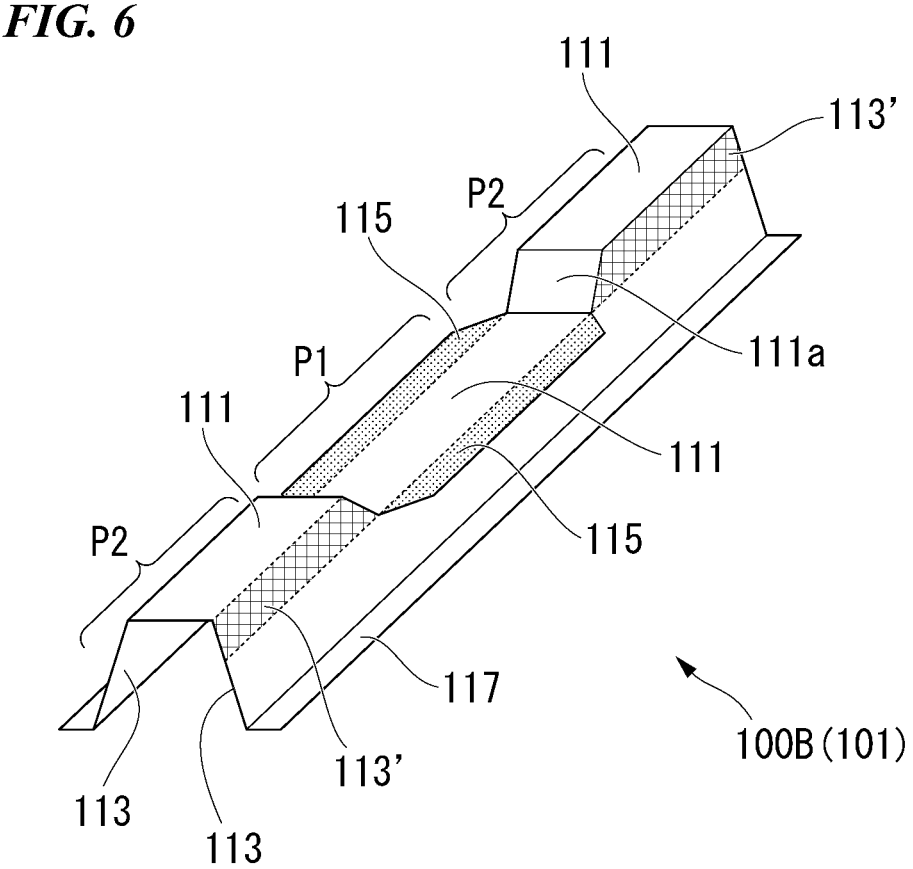
FIG. 6 is a perspective view schematically showing a press-formed article 100B according to a modification example.

Further, the overlapping portion 115*d* is not rounded into a tubular shape, and the protrusion portion 115 is different from a reinforcing portion rounded into a tubular shape described in FIG. 6 of Patent Document 6.

Further, the protrusion portion 115 has a shape different from that of a corner portion formed in an oval concave shape or convex shape described in FIGS. 1 and 2 of Patent Document 7.

In the protrusion portion 115, the portion 115a and the portion 115b may be overlapped and brought into close contact with each other. With this configuration, the strength of the protrusion portion 115 can be further improved. A structure in which the portion 115a and the portion 115b are in close contact with each other can be obtained by a manufacturing method described below.

Figure 3:
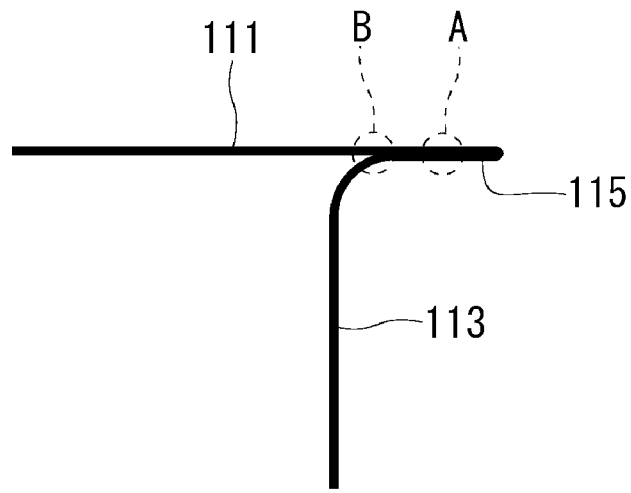
FIG. 3 is a schematic cross-sectional view for explaining a joint region of a protrusion portion.

In the protrusion portion 115, the portion 115a and the portion 115b may be fixed to each other by a joining unit. For example, the portion 115a and the portion 115b that overlap each other in the overlapping portion 115d may be welded by resistance spot welding or laser welding. Further, on a lower end side of the protrusion portion 115 (a boundary between the top sheet portion and the standing wall portion and the protrusion portion), the portion 115a and the portion 115b may be arc-welded (fillet welded). The joining means may be any of adhesive, brazing, riveting, bolting, and friction stir welding. For example, a region A and/or a region B shown in FIG. 3 may be joined. The region A shown in FIG. 3 is a region other than the end portion of the protrusion portion 115, and may be performed by resistance spot welding or laser welding. Welding (fillet welding) of the region B at the boundary between the protrusion portion 115 and the other portions may be performed by arc welding.

As shown in FIG. 2A, in the press-formed article 100 according to the present embodiment, an angle Y formed by the top sheet portion 111 and the standing wall portion 113 is about 90° to 100° when the surface perpendicular to the longitudinal direction is cross-sectionally viewed in the protrusion region P1. The angle Y may be less than 90°, but is preferably 90° or more, particularly preferably in a range of 90° to 150°. The two angles Y formed by the top sheet portion 111 and the standing wall portions 113 may be different, but a difference between the two angles is preferably within 10°, and particularly preferably, the two angles are the same as each other.

As shown in FIG. 2A, in the press-formed article 100 according to the present embodiment, an angle X formed by the top sheet portion 111 and the protrusion portion 115 is 180°. The angle X is an angle formed by a surface including an outer surface 111s of the top sheet portion 111 and a surface including a surface 115ds (a surface of the portion 115a in the overlapping portion 115d) of the overlapping portion 115d which is a portion of the protrusion portion 115. For example, when minute irregularities are formed on the top sheet portion 111 and a portion of the top sheet portion 111 is not flat sheet shape, an angle when the entire top sheet portion 111 is regarded as a flat sheet is the angle of the top sheet portion 111.

As shown in FIGS. 1 and 2A, the press-formed article 100 according to the present embodiment has the angle X of 180°, and thus, the top sheet portion 111 and the protrusion portion 115 are parallel to each other. In a preferable example when the angle X is 180°, there is no step between the portion 115a extending from the top sheet portion 111 and the top sheet portion 111.

Figure 4A:
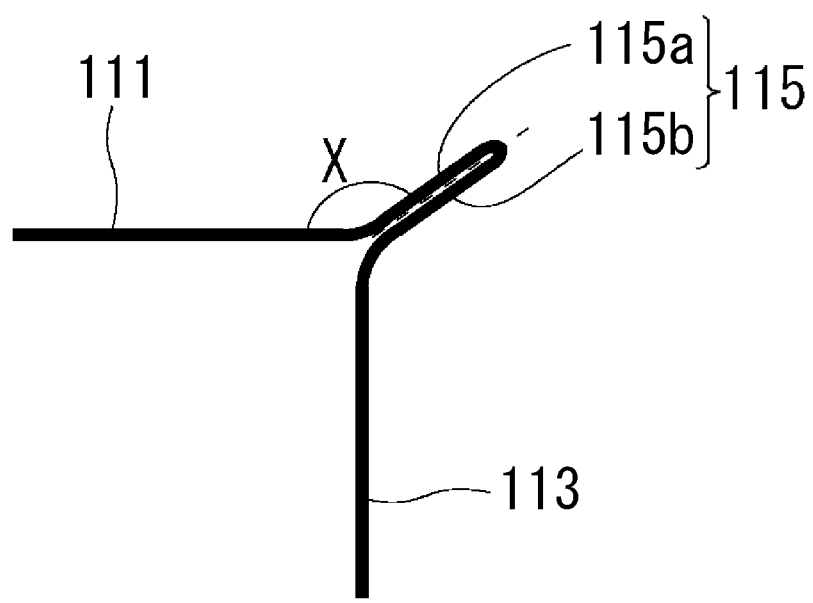
FIG. 4A is a cross-sectional view schematically showing a case where an angle X is 145°.

The angle X is not limited to 180°, and may be set in a range of 90° or more and 180° or less, for example, 105° or 135°. That is, for example, the angle X may be 145° as shown in FIG. 4A, which is a cross-sectional view of a modification example of the press-formed article 100. When the angle X is larger than 90°, when the press-formed article 100 is viewed from above the top sheet portion 111 along the direction perpendicular to the sheet surface of the top sheet portion 111, the portion 115b constituting the protrusion portion 115 is obscured by the portion 115a. In some cases, this portion is called a negative corner portion. From another point of view, the negative corner portion is a portion having a reverse gradient when press forming is performed only with an upper die and a lower die.

When the press-formed article 100 of the present embodiment is used as a structural member, the top sheet portion 111 and the flange portion 117 may be fixed to a portion of other members and used. In this case, it may be preferable that the angle X is 180° as shown in FIG. 2A. When the angle X is 180° and the surface of the top sheet portion 111 and the surface of the protrusion portion 115 are flush with each other, it may be easy to fix the top sheet portion 111 side to another member. Further, when a load is applied from the top sheet portion 111 side, the load can be easily supported by both the top sheet portion 111 and the protrusion portion 115.

The protrusion portions 115 protrude from both ends of the top sheet portion 111, but a difference between the two angles X formed by the protrusion portions 115 and the top sheet portion 111 is preferably within 10°, and particularly preferably, the two angles are the same as each other. Further, shapes of the protrusion portions 115 in the cross section perpendicular to the longitudinal direction do not have to be line-symmetrical, but are preferably line-symmetrical.

Figure 4B:
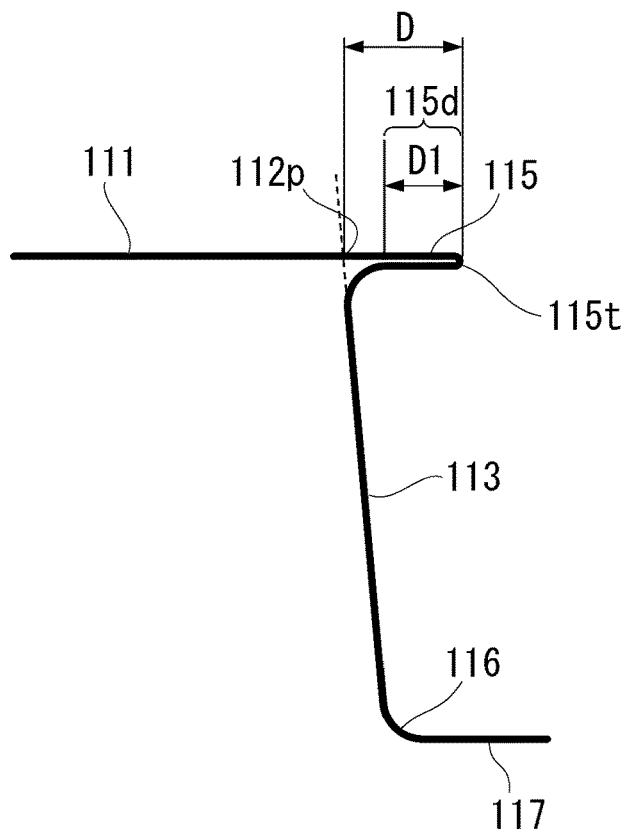
FIG. 4B is a schematic cross-sectional view for explaining the protrusion portion of the press-formed article 100.

As shown in FIG. 4B, in the present embodiment, a length of the protrusion portion 115 in the cross section perpendicular to the longitudinal direction is defined as a "length D". That is, when the surface of the press-formed article 100 perpendicular to the longitudinal direction is cross-sectionally viewed, as shown in FIG. 4B, a length from a boundary point 112p where the extension lines of the top sheet portion 111 and the standing wall portion 113 intersect to the tip end portion 115t of the protrusion portion 115 is defined as the "length D".

Preferably, the length D is 3 mm or more from the viewpoint of ensuring stiffness. When the length D is less than 3 mm, a force that the standing wall portion 113 tries to fall inward becomes too small and stiffness of the press-formed article 100 is insufficient, which is not preferable. The length D can be appropriately set according to a thickness of the steel sheet and a size of the press-formed article 100, and can be appropriately set to 5 mm or more, 10 mm or more, 15 mm or more, 25 mm, or the like, for example. The lengths D of the two protrusion portions 115 may be the same or different.

As shown in FIG. 4B, a length D1 of the overlapping portion 115d in the cross section perpendicular to the longitudinal direction may be in the range of 0.1 to 1 time the length D of the protrusion portion 115, and, preferably, is in the range of 0.5 to 1 times the length D. Since the length D1 is in the range of 0.1 to 1 time the length D of the protrusion portion 115, stress applied to the press-formed article 100 is concentrated on the overlapping portion 115d, and thus, the stiffness of the press-formed article 100 is sufficiently maintained. Specifically, the length D1 of the overlapping portion 115d may be appropriately set according to manufacturing conditions, such as 0.3 times or 0.8 times the length D of the protrusion portion 115.

Preferably, the corner portion of the boundary between the portion 115b in the protrusion portion 115 and the standing wall portion 113 is a curved surface when the surface of the press-formed article 100 perpendicular to the longitudinal direction is cross-sectionally viewed. Since the corner portion is a curved surface, buckling at the corner portion can be suppressed.

A radius of curvature of the corner portion on the surface perpendicular to the longitudinal direction may be in the range (for example, in the range of 0.2 to 0.8 times or 0.2 to 0.5 times) of 0.1 to 1 time the length D. For example, when the angle X is smaller than 180°, the corner portion of the boundary between the portion 115a of the protrusion portion 115 and the top sheet portion 111 may be a curved surface.

As shown in the cross-sectional view of FIG. 2B, a recessed part 120 is provided in the top sheet portion 111 in the non-protrusion region P2.

In the above-mentioned protrusion region P1, as shown in FIG. 2A, the top sheet portion 111 connects the two standing wall portions 113 adjacent to the top sheet portion 111 via the two protrusion portions 115. Meanwhile, in the non-protrusion region P2, as shown in FIG. 2B, since the protrusion portion 115 is not provided, the two adjacent standing wall portions 113 extend downward directly from both ends of the top sheet portion 111.

In the press-formed article 100 of FIG. 1, the protrusion portions 115 are not formed in the non-protrusion regions P2 at both ends in the longitudinal direction, and the protrusion portions 115 are formed in the central protrusion region P1 in the longitudinal direction. With this configuration, when the press-formed article 100 is combined with other members to form a structural member, the other members are not restricted in shape and desired collision safety performance can be obtained.

It should be noted that, as shown in FIG. 1, the press-formed article 100 in which the protrusion portion is formed only in a portion in the longitudinal direction can be manufactured from a single material steel sheet by a manufacturing method described below.

As shown in the cross-sectional views of FIGS. 2A and 2B, in the protrusion region P1 and the non-protrusion region P2, preferably, a corner portion 116 which connects the standing wall portion 113 and the flange portion 117 to each other has a rounded shape. Since the corner portion 116 has a rounded shape, buckling at the corner portion 116 can be suppressed.

In the present embodiment, a region which is surrounded by the top sheet portion 111, the two standing wall portions 113, and a virtual surface connecting the lower end portions of the two standing wall portions 113 to each other is referred to as an "inside of the press-formed article 100". Further, a region opposite to the inside in a state in which the top sheet portion 111 and the standing wall portion 113 are interposed is referred to as an "outside of the press-formed article 100". As shown in FIG. 2A, an "inner surface peripheral length α" is the total of the following distances L1, L2, and L3 along an inner peripheral side of the press-formed article 100.

L1: distance between an end portion of one standing wall portion 113 on the flange portion 117 side and the boundary point where the extension lines of one standing wall portion 113 and the top sheet portion 111 intersect.

L2: distance between the boundary point where the extension lines of one standing wall portion 113 and the top sheet portion 111 intersect and the boundary point where the extension lines of the top sheet portion 111 and the other standing wall portion 113 intersect.

L3: distance between the boundary point where the extension lines of the top sheet portion 111 and the other standing wall portion 113 intersect and an end portion of the other standing wall portion 113 on the flange portion 117 side.

Meanwhile, an "inner surface peripheral length β" is a distance along the inner peripheral side of the press-formed article 100 from the end portion of one standing wall portion 113 on the flange portion 117 side to the end portion of the other standing wall portion 113 on the flange portion 117 side.

In the example shown in FIG. 2B, a cross section of the recessed part 120 has a rectangular shape including two wall portions 120a and a bottom portion 120b. However, the cross-sectional shape of the recessed part is not limited to this, and the inner surface peripheral length α of the cross section in the protrusion region P1 and the inner surface peripheral length β of the cross section in the non-protrusion region P2 may satisfy $1.01 \leq \beta/\alpha \leq 1.50$, and, more preferably, $1.01 \leq \beta/\alpha \leq 1.20$. As long as $1.01 \leq \beta/\alpha \leq 1.50$ is satisfied, the cross-sectional shape of the recessed part is not limited to a rectangular shape including the wall portions 120a and the bottom portion 120b. For example, the cross-sectional shape may be a wedge shape in which the two wall portions 120a are directly connected to each other at the upper ends thereof, or may be a shape in which the cross-sectional shape of the top sheet portion 111 or the bottom portion 120b includes a curve such as a semicircular shape or a semi-elliptical shape.

Figure 10A:
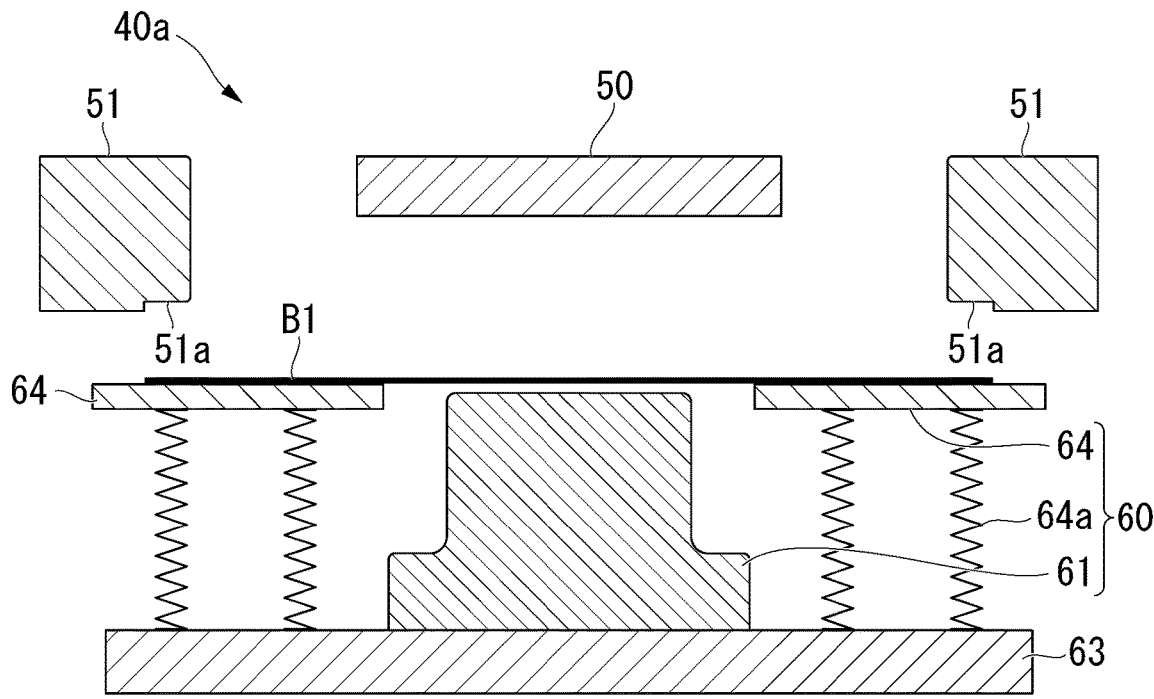
FIG. 10A is a cross-sectional view schematically showing Step (Ia) in one example of a manufacturing method of the present embodiment, and is a cross-sectional view in a first region of a preliminary formed article.
Figure 10B:
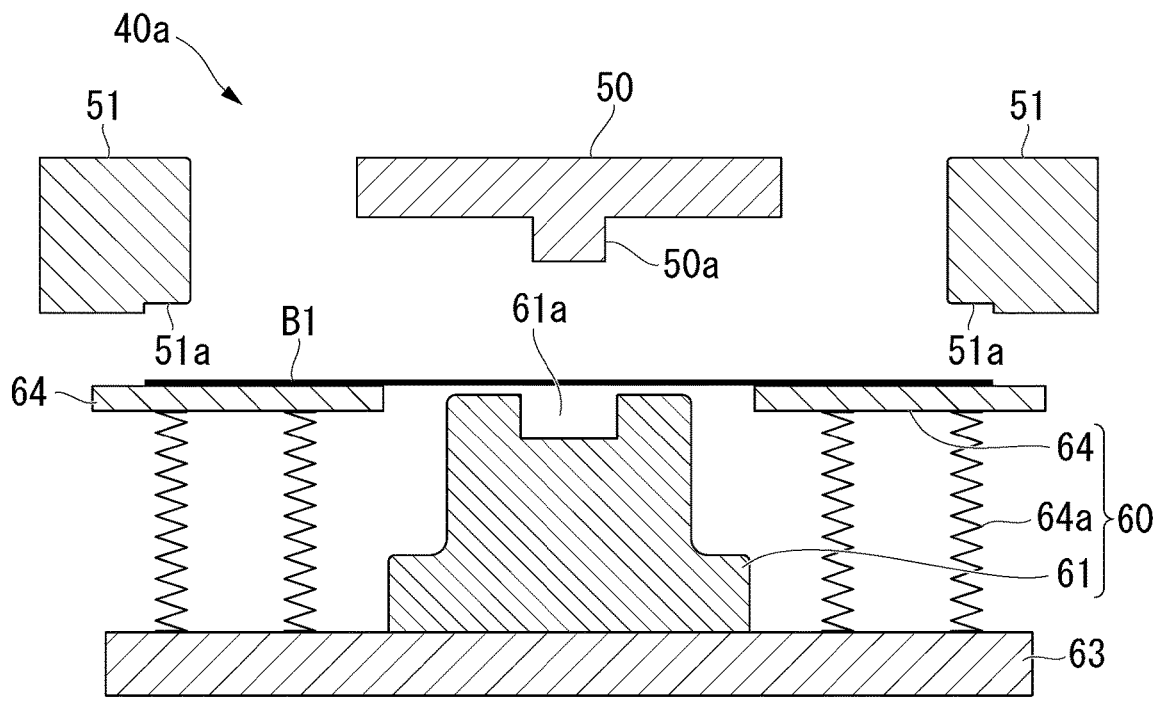
FIG. 10B is a cross-sectional view schematically showing Step (Ia) in one example of the manufacturing method of the present embodiment, and is a cross-sectional view in a second region of the preliminary formed article.
Figure 10C:
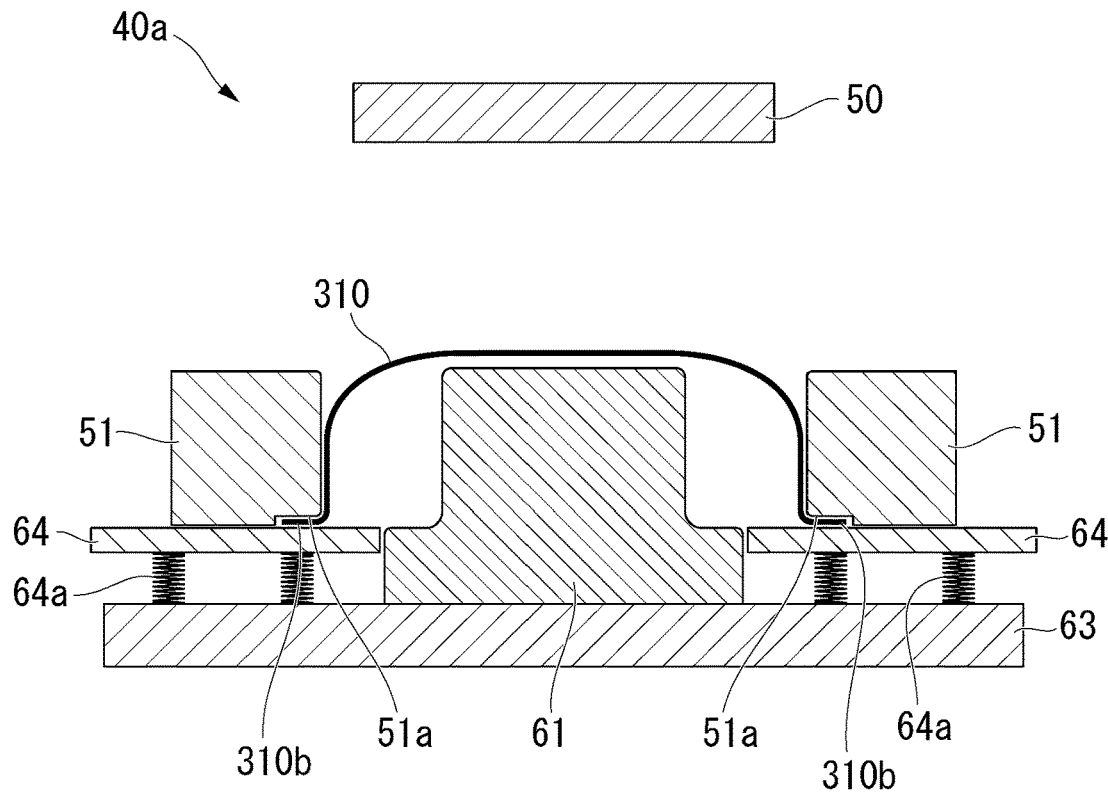
FIG. 10C is a cross-sectional view in the first region of the preliminary formed article schematically showing Step (Ib) following Step of FIG. 10A.
Figure 10D:
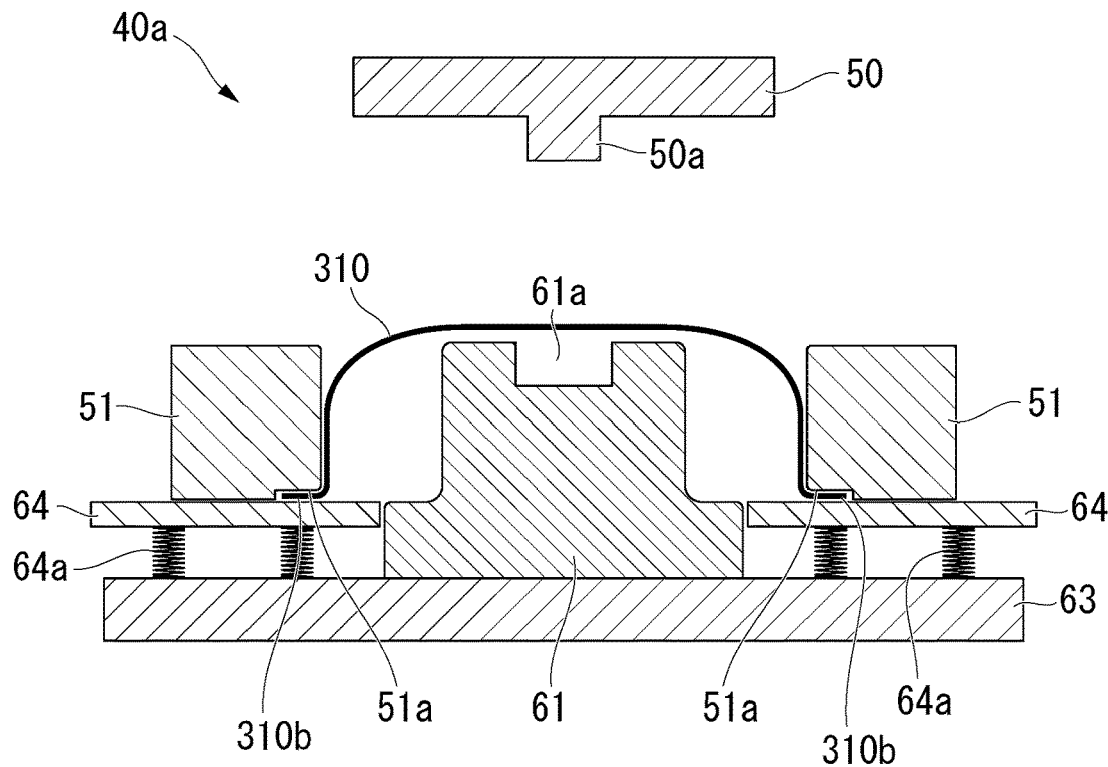
FIG. 10D is a cross-sectional view in the second region of the preliminary formed article schematically showing Step (Ib) following Step of FIG. 10B.

A manufacturing method will be described below, but as shown in FIGS. 10C and 10D, lengths of the inner peripheries of the protrusion region P1 and the non-protrusion region P2 are the same during the manufacturing of the press-formed article 100. However, as shown in FIG. 10G, a surplus of the top sheet portion 111 in the protrusion region P1 becomes the protrusion portion 115, and as shown in FIG. 10H, by recessing the top sheet portion 111, the non-protrusion region P2 is formed. Accordingly, the inner surface peripheral length α of the protrusion region P1 of the press-formed article 100 and the inner surface peripheral length β of the non-protrusion region P2 are different from each other. That is, in the press-formed article 100 which is a completed article, the difference between the inner surface peripheral length α of the protrusion region P1 and the inner surface peripheral length α of the non-protrusion region P2 depends on the length of the steel sheet spent in the protrusion portion 115. Therefore, when $\beta/\alpha$ is small, the length of the overlapping portion 115d is short (the protrusion portion 115 is small), and when p/a is large, the length of the overlapping portion 115d is long (the protrusion portion 115 is large).

Therefore, when $\beta/\alpha$ is less than 1.01, the length of the overlapping portion 115d in a protruding direction is insufficient, and sufficient strength cannot be secured in the protrusion portion 115. Therefore, the stiffness of the protrusion region P1 cannot be sufficiently increased, which is not preferable. Meanwhile, when $\beta/\alpha$ exceeds 1.50, the length of the overlapping portion 115d in the protruding direction becomes too long, and thus, the stiffness of the protrusion portion 115 becomes too high as compared with the non-protrusion region P2. Therefore, stress tends to be concentrated on the boundary between the protrusion portion 115 and the non-protrusion region P2, which is not preferable.

In other words, by satisfying $1.01 \leq \beta/\alpha \leq 1.50$, the stiffness of the protrusion region P1 can be sufficiently increased, and stress concentration at the boundary between the protrusion portion 115 and the non-protrusion region P2 is prevented, and thus, it is possible to obtain high strength and high characteristics in the three-point bending test.

In order to maintain the strength of the protrusion portion 115 and avoid the stress concentration at the boundary between the protrusion portion 115 and the non-protrusion region P2, it is particularly preferable that $1.01 \leq \beta/\alpha \leq 1.20$.

The press-formed article 100 according to the present embodiment is designed to satisfy $1.01 \leq \beta/\alpha \leq 1.50$ by forming the recessed part 120 in the top sheet portion 111 in the non-protrusion region P2. However, a press-formed article 100A according to a modification example shown in FIG. 5 may be designed to satisfy $1.01 \leq \beta/\alpha \leq 1.50$ so that the top sheet portion 111 includes enlarged top sheet portions 111' in instead of the recessed part 120, or a press-formed article 100B according to a modification example shown in FIG. 6 may be designed to satisfy $1.01 \leq \beta/\alpha \leq 1.50$ so that the standing wall portion 113 includes enlarged standing wall portions 113' in instead of the recessed part 120. The press-formed article 100A and the press-formed article 100B will be described below.

Figure 5:
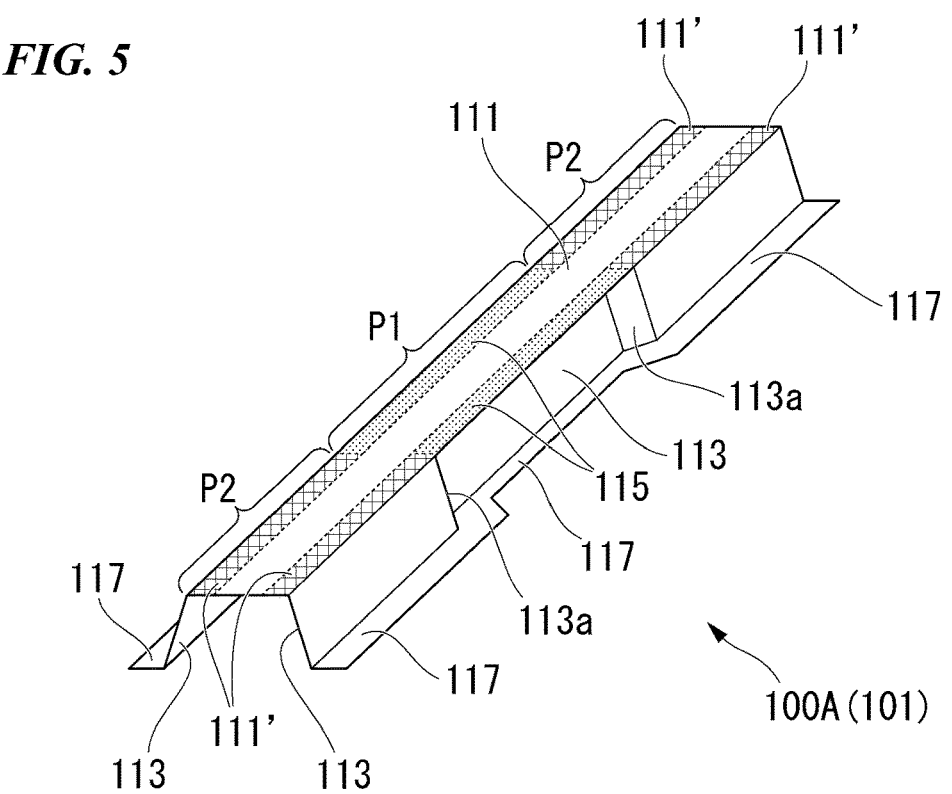
FIG. 5 is a perspective view schematically showing a press-formed article 100A according to a modification example.

In the press-formed article 100A according to the modification example shown in FIG. 5, the protrusion region P1 is configured in the same manner as the press-formed article 100, but in the non-protrusion region P2, the enlarged the top sheet portion 111 includes the enlarged top sheet portions 111' connected to the standing wall portions 113. Accordingly, the two standing wall portions 113 protrude toward the outside of the press-formed article 100A from the two standing wall portions 113 in the protrusion region P1.

In other words, the press-formed article 100A shown in HG. 5 has the enlarged top sheet portions 111' which extend from the top sheet portion 111 and are connected to end edges of the standing wall portion 113 in the non-protrusion region P2. In the top sheet portion 111, a sheet surface of the top sheet portion 111 in the protrusion region P1 and a sheet surface of the top sheet portion 111 in the non-protrusion region P2 are in the same plane. The fact that the sheet surfaces of the top sheet portion 111 are in the same plane in the protrusion region P1 and the non-protrusion region P2 means that, for example, the outer or inner sheet surface of this portion is in the same plane.

In this press-formed article 100A, a total value α of inner surface peripheral lengths of the top sheet portion 111 and the standing wall portion 113 in the cross section perpendicular to the longitudinal direction in the protrusion region P1 and a total value β of the inner surface peripheral lengths of the top sheet portion 111 including the enlarged top sheet portion 111' and the standing wall portion 113 in the cross section perpendicular to the longitudinal direction in the non-protrusion region P2 satisfy $1.01 \leq \beta/\alpha \leq 1.50$, and thus, as in the press-formed article 100, it is possible to obtain high strength and high characteristics in the three-point bending test.

The press-formed article 100A shown in FIG. 5 can also be manufactured from a single material steel sheet by a manufacturing method described below. The press-formed article 100A has a shape in which a width (peripheral length) of the flange portion 117 in the non-protrusion region P2 is larger than a width (peripheral length) of the flange portion 117 in the protrusion region P1.

In the press-formed article 100B according to the modification example shown in FIG. 6 as well, the protrusion region P1 is configured in the same manner as the press-formed article 100, but in the non-protrusion region P2, the standing wall portion 113 includes the enlarged standing wall portions 113 connected to the top sheet portion 111. Accordingly, the top sheet portion 111 protrudes toward the outside of the press-formed article 100B from the top sheet portion 111 in the protrusion region P1.

In other words, the press-formed article 100B shown in FIG. 6 has the enlarged standing wall portions 113' which extend from the standing wall portions 113 and is connected to the end edge of the top sheet portion 111 in the non-protrusion region P2. In the standing wall portion 113, a sheet surface of the standing wall portion 113 in the protrusion region P1 and a sheet surface of the standing wall portion 113 in the non-protrusion region P2 are in the same plane. The fact that the sheet surfaces of the standing wall portions 113 are in the same plane in the protrusion region P1 and the non-protrusion region P2 means that, for example, the outer or inner sheet surface of this portion is in the same plane.

In this press-formed article 100B, a total value α of inner surface peripheral lengths of the top sheet portion 111 and the standing wall portion 113 in the cross section perpendicular to the longitudinal direction in the protrusion region P1 and the non-protrusion region P2 and a total value β of the inner surface peripheral lengths of the top sheet portion 111 and the standing wall portion 113 including the enlarged standing wall portion 113' in the cross section perpendicular to the longitudinal direction satisfy $1.01 \leq \beta/\alpha \leq 1.50$, and thus, as in the press-formed article 100, it is possible to obtain high strength and high characteristics in the three-point bending test.

The press-formed article 100B shown in FIG. 6 can also be manufactured from a single material steel sheet by a manufacturing method described below.

A transition region (not shown) may be provided at the boundary between the protrusion region P1 and the non-protrusion region P2. In this transition region, a length from the boundary point 112p to the tip end portion 115t of the protrusion portion 115 may be gradually reduced from the protrusion region P1 side to the non-protrusion region P2 side. In the transition region, the size of the recessed part shown in FIG. 1 or 2B or the depth from the top sheet portion 111 may be gradually reduced.

Further, the press-formed article 100A according to the modification example shown in FIG. 5 may have transition standing wall portions 113a which connect the two standing wall portions 113 of the non-protrusion region P2 and the two standing wall portions 113 of the protrusion region P1 to each other. Further, the press-formed article 100B according to the modification example shown in FIG. 6 may have transition top sheet portions 111a which connect the top sheet portion 111 of the non-protrusion region P2 and the top sheet portion 111 of the protrusion region P1. The transition region may be included in either the protrusion region P1 or the non-protrusion region P2.

From the viewpoint of formability, a length of the transition region in the longitudinal direction of the press-formed article may be set to about 20% of the entire length of the formed article 100 in the longitudinal direction. Alternatively, the transition region may be designed to be extremely small in consideration of the design of the formed article 100.

The press-formed article 100 according to the present embodiment and the press-formed article 100A and 100B which are modification examples thereof have high strength, high characteristics in the three-point bending test, and a high degree of freedom in design. Therefore, the press-formed article of the present embodiment can be used for various purposes. For example, the press-formed article can be used in structural members of various apparatuses of transportation (automobile, motorcycle, railroad vehicle, ship, aircraft) and structural members of various machines. Examples of the structural member for automobile may include side sill, pillars (front pillars, front pillar lowers, center pillars, or the like), roof rails, roof arches, bumpers, beltline reinforcements, and door impact beams, and other structural members.

Moreover, in the press-formed article 100 according to the present embodiment, as shown in FIG. 2A, the two flange portions 117 extend horizontally from the lower end portions of the two standing wall portions 113 toward the outside. That is, each of the flange portions 117 is parallel to the top sheet portion 111.

The press-formed article 100 may have a shape that does not include the flange portion 117 by cutting the flange portion 117. That is, a formed article including the top sheet portion 111, the standing wall portions 113, and the protrusion portion 115 may be provided.

Second Embodiment

Hereinafter, a structural member 200 according to a second embodiment of the present invention will be described with reference to FIGS. 7A to 9B.

Figure 7A:
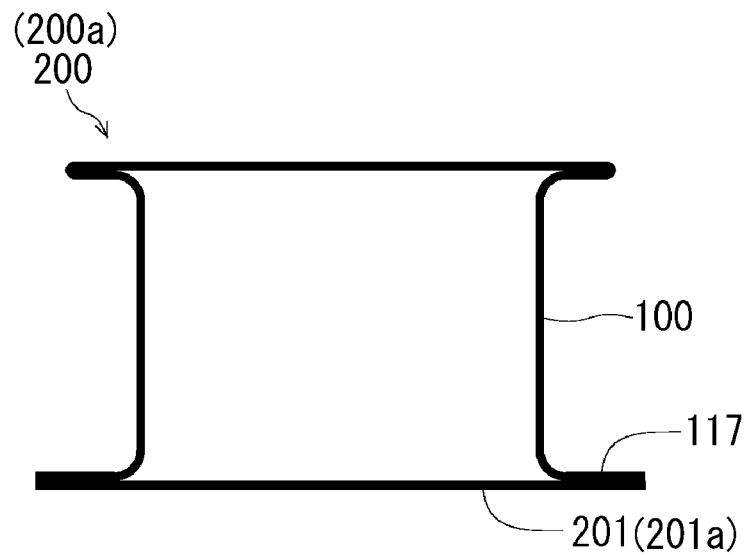
FIG. 7A is a cross-sectional view schematically showing one example of a structural member 200 according to one embodiment of the present invention.
Figure 7B:
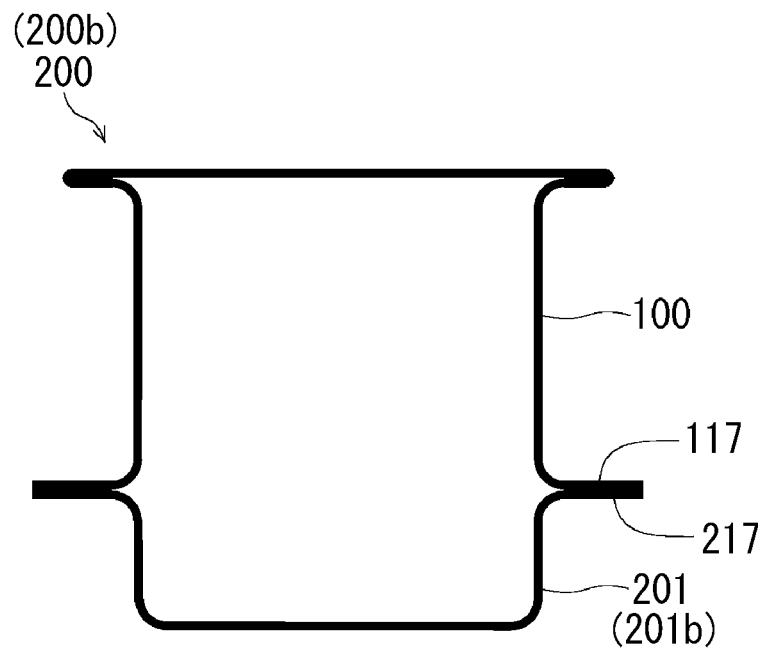
FIG. 7B is a cross-sectional view schematically showing another example of the structural member 200.
Figure 7C:
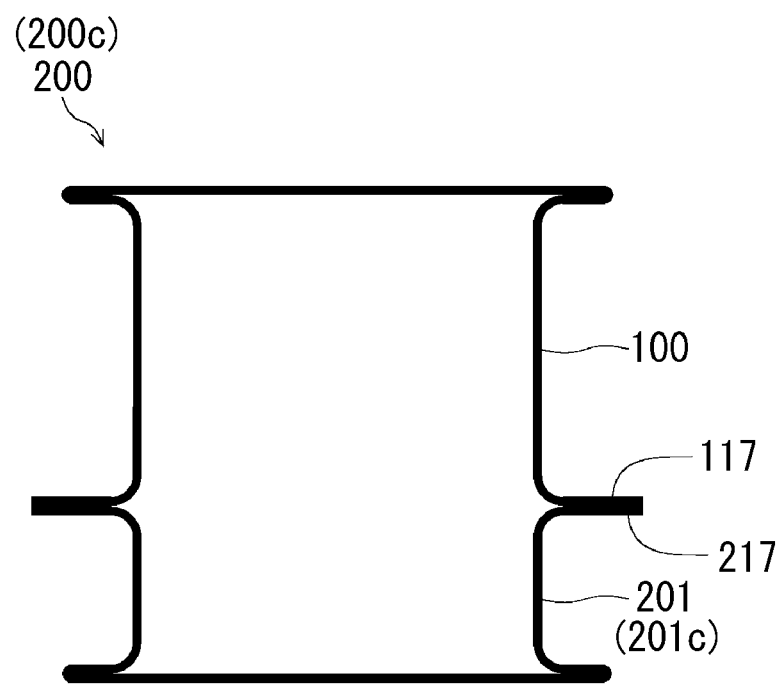
FIG. 7C is a cross-sectional view schematically showing still another example of the structural member 200.
Figure 7D:
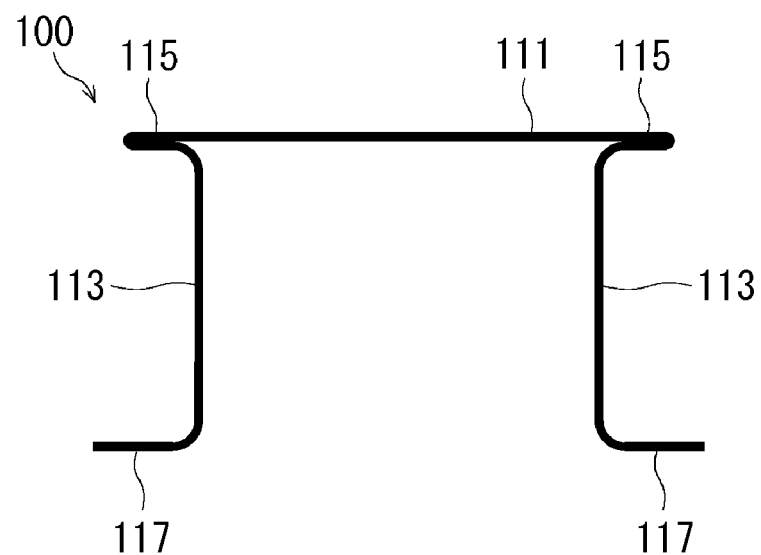
FIG. 7D is a cross-sectional view schematically showing one example of a case where the press-formed article 100 is used as a structural component.

As shown in FIGS. 7A to 7C, the press-formed article 100 described in the first embodiment described above can be used as the structural member 200 for a vehicle component and other applications by forming a closed cross section in combination with a steel sheet member. Moreover, as shown in FIG. 7D, the press-formed article 100 can be used as a structural component as it is.

As shown in FIGS. 7A to 7C, the structural member 200 according to the present embodiment is configured to form a closed cross section by combining the press-formed article 100 described in the first embodiment and a steel sheet member 201. That is, the press-formed article 100 and the steel sheet member 201 form a hollow body.

In the description of the present embodiment, a case where the press-formed article 100 according to the first embodiment is used is described, but the press-formed articles 100A and 100B may be used.

FIGS. 7A to 7C are views showing structural members 200a, 200b, and 200c which are specific examples of the structural member 200, and are views schematically showing a cross section perpendicular to the longitudinal direction in the protrusion region P1. The angle Y formed by the top sheet portion 111 and the standing wall portion 113 of the press-formed article 100 is set to 90° for simplification of descriptions.

In the structural member 200a shown in FIG. 7A, a back sheet (steel sheet) 201a is used as the steel sheet member 201. The back sheet 201a is welded to the two flange portions 117 of the press-formed article 100.

In the structural member 200b shown in FIG. 7B, the press-formed article 201b having a hat-shaped cross section is used as the steel sheet member 201. The press-formed article 100 and the press-formed article 201b are disposed so that inner regions thereof face each other, and the flange portion 117 of the press-formed article 100 and a flange portion 217 of the press-formed article 201b are welded to each other.

In the structural member 200c shown in FIG. 7C, the press-formed article 201c, which differs only in the dimensions of the standing wall portion from the press-formed article 100, is used as the steel sheet member 201. The press-formed article 100 and the press-formed article 201c are disposed so that inner regions thereof face each other, and the flange portion 117 of the press-formed article 100 and the flange portion 217 of the press-formed article 201c are welded to each other.

In this way, the steel sheet member 201 is fixed to the two flange portions 117 so as to connect the two flange portions 117 of the press-formed article 100. The steel sheet member 201 is not limited to the above-mentioned examples, and other formed articles may be included.

A fixing method between the press-formed article 100 and the steel sheet member 201 is not particularly limited, and an appropriate fixing method may be selected depending on the situation. Examples of fixing methods include at least one selected from the group including welding, adhesives, brazing, riveting, bolting, and friction stir welding. Of these, welding is easy to carry out. Examples of the welding include resistance spot welding and laser welding.

Further, as shown in FIGS. 8A to 8D, the structural member 200 according to the present embodiment may include an auxiliary member 601 joined via joint portions 602. FIGS. 8A to 8D are views showing a state in which the auxiliary member 601 having a U shape when a cross section of the structural member 200 perpendicular to the longitudinal direction is viewed in cross section is joined by different joint portions 602. The joint portion 602 may include any of welding, adhesive, brazing, riveting, bolting, and friction stir welding.

The auxiliary member 601 is a long member, and the longitudinal direction of the press-formed article 100 and the longitudinal direction of the auxiliary member 601 are parallel to each other.

Figure 8A:
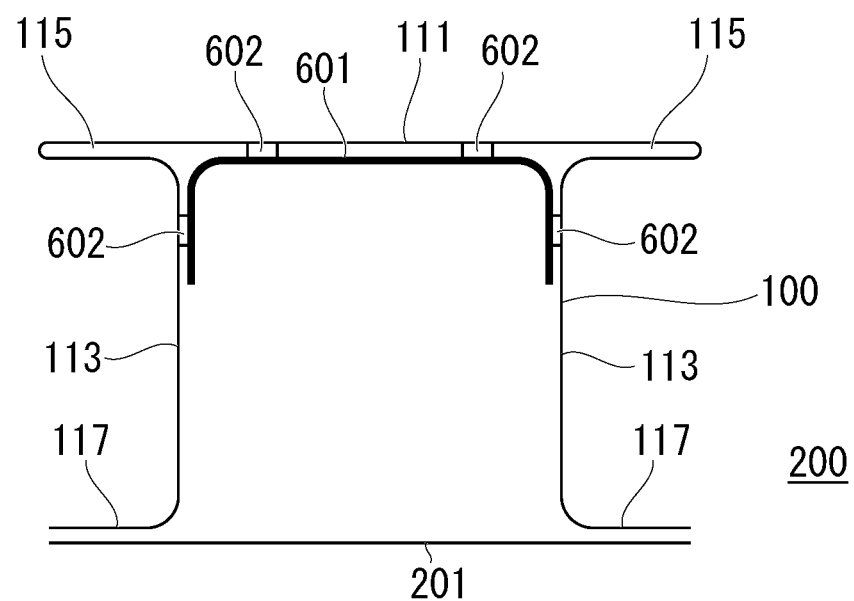
FIG. 8A is a cross-sectional view schematically showing one example of a state in which an auxiliary member 601 is joined to the structural member 200.

In the example shown in FIG. 8A, the auxiliary member 601 is joined to the structural member 200 via the joint portion 602 provided on each of the top sheet portion 111 and the two standing wall portions 113.

Figure 8B:
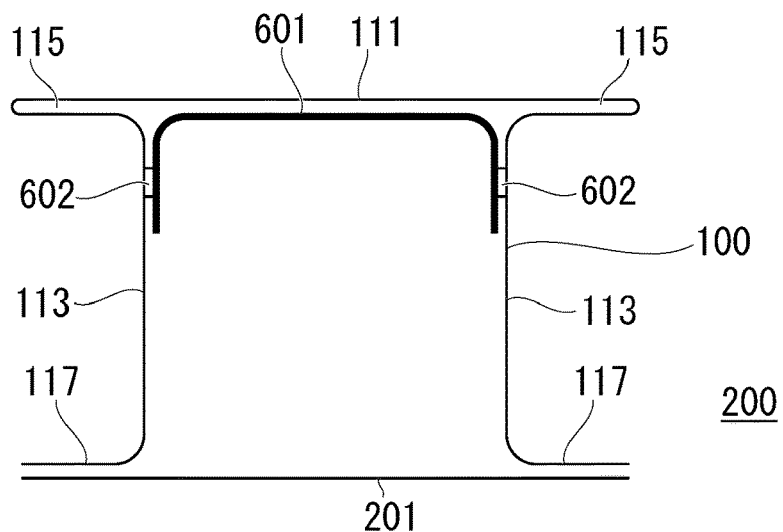
FIG. 8B is a cross-sectional view schematically showing another example of a state in which the auxiliary member 601 is joined to the structural member 200.

In the example shown in FIG. 8B, the auxiliary member 601 is joined to the structural member 200 via the joint portion 602 provided in each of the two standing wall portions 113. The joint portion 602 is not provided between the top sheet portion 111 and the auxiliary member 601. The top sheet portion 111 and the auxiliary member 601 may be disposed so as to be in close contact with each other, or may be disposed so as to form a gap therebetween.

Figure 8C:
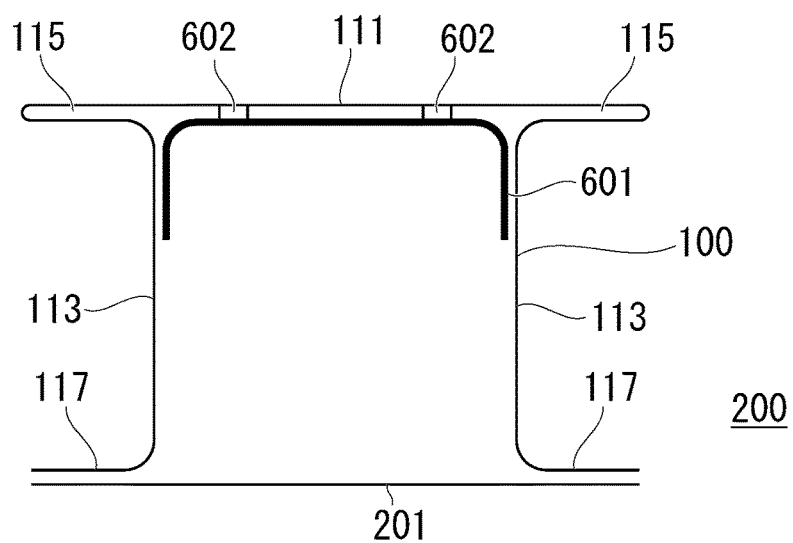
FIG. 8C is a cross-sectional view schematically showing still another example of a state in which the auxiliary member 601 is joined to the structural member 200.
Figure 8D:
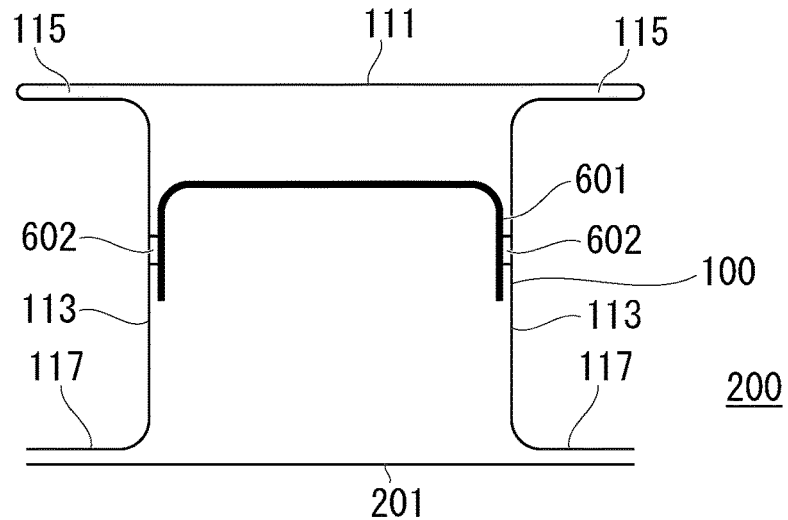
FIG. 8D is a cross-sectional view schematically showing still another example of a state in which the auxiliary member 601 is joined to the structural member 200.

In the example shown in FIG. 8C, the auxiliary member 601 is joined to the structural member 200 via the joint portion 602 provided on the top sheet portion 111. The joint portion 602 is not provided between the two standing wall portions 113 and the auxiliary member 601. The standing wall portion 113 and the auxiliary member 601 may be disposed so as to be in close contact with each other, or may be disposed so as to form a gap therebetween.

In the example shown in HG. 8D, the auxiliary member 601 is joined to the structural member 200 via the joint portion 602 provided in each of the two standing wall portions 113. A space is provided between the top sheet portion 111 and an upper surface of the auxiliary member 601.

Figure 9A:
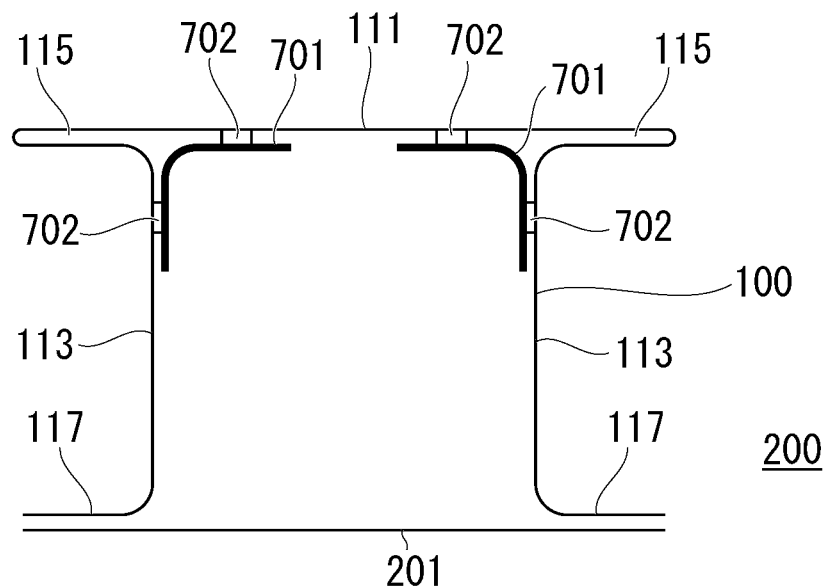
FIG. 9A is a cross-sectional view schematically showing one example of a state in which an auxiliary member 701 as a modification example is joined to the structural member 200.
Figure 9B:
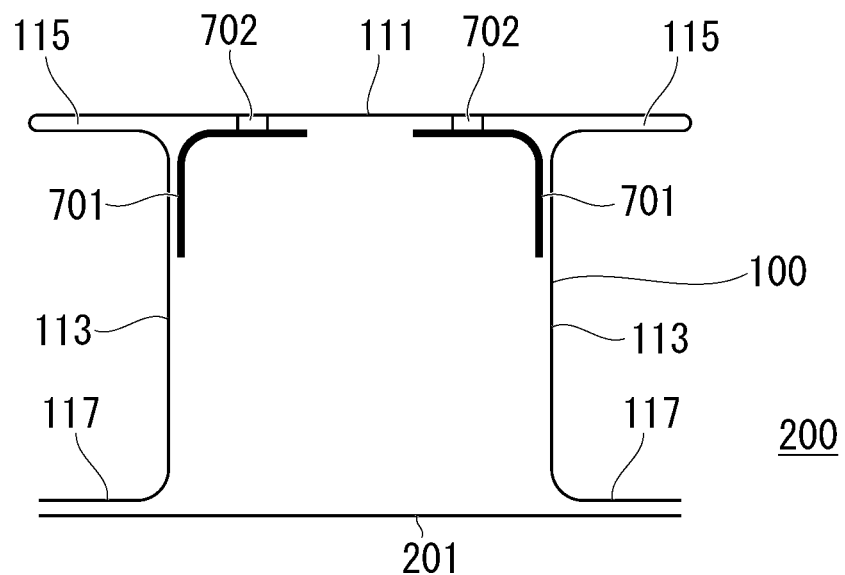
FIG. 9B is a cross-sectional view schematically showing another example of the state in which the auxiliary member 701 as the modification example is joined to a structural member 200.

Further, FIGS. 9A and 9B are views for describing a case where auxiliary members 701 are used as a modification example of the auxiliary member 601, and schematically shows a cross section of the structural member 200 perpendicular to the longitudinal direction in the protrusion region P1. As shown in FIGS. 9A and 9B, the auxiliary member 701 having an L shape when the cross section perpendicular to the longitudinal direction is viewed in cross section can be used instead of the auxiliary member 601. The auxiliary member 701 is a long member, and the longitudinal direction of the press-formed article 100 and the longitudinal direction of the auxiliary member 701 may be parallel to each other.

In the example shown in FIG. 9A, two auxiliary members 701 are joined to the top sheet portion 111 and each of the two standing wall portions 113 via joint portions 702.

In the example shown in HG. 9B, two auxiliary members 701 are joined to the top sheet portion 111 via the joint portions 702. The joint portion 702 is not provided between the two standing wall portions 113 and the two auxiliary members 701. The standing wall portion 113 and the auxiliary member 701 may be disposed in close contact with each other, or may be disposed so as to form a gap.

The joint portion 702 may include any of welding, adhesive, brazing, riveting, bolting, and friction stir welding.

The auxiliary member 601 or the auxiliary member 701 described above may be disposed over the entire structural member 200 in the longitudinal direction, and may be disposed only in a portion of the press-formed article 100 in the longitudinal direction so as to include, for example, the protrusion region P1. Alternatively, the auxiliary member 601 or the auxiliary member 701 may be disposed in a portion of the press-formed article 100 in the longitudinal direction so as to include the non-protrusion region P2.

In the structural member 200 according to the present embodiment, the press-formed article 100 having the protrusion region P1 only in a portion in the longitudinal direction and the steel sheet member 201 are combined to form the closed cross section, and thus, high strength, high characteristics in the three-point bending test, and a high degree of freedom in design are obtained.

Further, when the auxiliary member is further provided, collision characteristics are further improved. More specifically, in the structural member 200, the standing wall portion 113 of the press-formed article 100 is collapsed so as to move inward at the time of collision. Therefore, by adding the auxiliary members 601 and 701, the collapse can be suppressed, and thus, the collision characteristics are further improved.

It is preferable that the strength of the auxiliary member 601 or 701 is high, but a material of the auxiliary member 601 or 701 may be a non-metal such as a polymer material or a foamed resin as long as the material contributes to the suppression of the inward collapse as described above.

Further, in the press-formed article in the related art, the standing wall is collapsed to the outside, and thus, the joint portion between the press-formed article and the auxiliary member is easily broken. However, in the press-formed article 100 described in the first embodiment, the standing wall portion 113 is collapsed inward, and thus, breakage is unlikely to occur at the joint portion 602 of the auxiliary member 601 as shown in FIGS. 8A to 8D.

In the structural member 200 according to the present embodiment, only a portion of the flange portion 117 of the press-formed article 100 may be fixed to the steel sheet member 201. In that case, the other portions of the flange portion 117 are not fixed to the steel sheet member 201. For example, in the flange portion 117 of the press-formed article 100, only the flange portion 117 near both end portions in the longitudinal direction may be fixed to the steel sheet member 201, and the other flange portion 117 may not be fixed to the steel sheet member 201.

Third Embodiment

Hereinafter, a manufacturing method of a press-formed article according to a third embodiment of the present invention will be described. In the manufacturing method according to the present embodiment, a first example of a manufacturing method of the press-formed article 100, 100A, and 100B described in the first embodiment will be described. According to the manufacturing method according to the present embodiment, both a first step for obtaining the deformed steel sheet which is an intermediate article and a second step for obtaining the press-formed article 100 which is a final article can be performed by one apparatus.

In the following, a steel sheet (material steel sheet) which is a starting material may be referred to as a "blank". The blank is a flat steel sheet and has a planar shape corresponding to the shape of the press-formed article to be manufactured. A thickness and physical properties of the blank are selected according to properties required for the press-formed article. For example, when the press-formed article 100 is a structural member for an automobile, a blank corresponding to the structural member is selected. For example, the thickness of the blank may be in the range of 0.4 mm to 4.0 mm, or may be in the range of 0.8 mm to 2.0 mm.

The thickness of the press-formed article 100 is determined by the thickness of the blank and the processing step, and may be in the range of the thickness of the blank exemplified here.

When hot press forming is performed, preferably, the blank is a high tensile strength steel sheet (high tensile material) having a tensile strength of 340 MPa or more (for example, a tensile strength of 500 to 800 MPa, 490 MPa or more, 590 MPa or more, 780 MPa or more, 980 MPa or more, or 1200 MPa or more). In order to reduce the weight while maintaining strength as a structural member, it is preferable that the tensile strength of the formed article is high and a blank of 590 MPa or more (for example, 780 MPa or more, 980 MPa or more, or 1180 MPa or more) is used. An upper limit of the tensile strength of the blank is not limited, and in an example, the upper limit is 2500 MPa or less. The tensile strength of the press-formed article of the present embodiment may be equal to or higher than the tensile strength of the blank, and may be in the range exemplified here.

When the tensile strength of the material steel sheet (blank) is 590 MPa or more, in order to obtain a press-formed article having the tensile strength equal to or higher than that of the blank, preferably, forming is performed by hot press forming (also referred to as hot stamping or hot pressing), in which the forming is performed in a state in which the material steel sheet is heated in advance. Even when a blank having the tensile strength of less than 590 MPa is used, the second step may be performed by the hot stamping. When performing hot stamping, a blank having a known composition suitable for the hot stamping may be used.

When the tensile strength of the blank is 590 MPa or more and the thickness thereof is 1.4 mm or more, it is particularly preferable to perform the forming by hot stamping in order to prevent cracking at the protrusion portion even when the blank has low ductility.

For the same reason, when the tensile strength of the blank is 780 MPa or more and the thickness thereof is 0.8 mm or more, it is particularly preferable to perform the forming by the hot stamping. Since the heated steel sheet has high ductility, cracking is unlikely to occur even when the thickness of the blank is 3.2 mm in a case where the forming is performed by hot stamping.

When the tensile strength of the blank is high, cracks are likely to occur at the tip end portion of the protrusion portion in cold pressing. Therefore, when the tensile strength of the steel sheet after the forming is 1200 MPa or more (for example, 1500 MPa or more or 1800 MPa or more), it is more preferable to perform the forming by the hot stamping. Even when the tensile strength of the steel sheet after the forming is less than 1200 MPa, the forming may be performed by the hot stamping.

Further, when the tensile strength of the blank is 780 MPa or more, wrinkles or cracks may occur in the protrusion portion or the like when the shape of the press-formed article of the above embodiment is obtained by the cold pressing. However, in the manufacturing method of a press-formed article of the present invention, by performing the forming by the hot stamping, the shape of the press-formed article of the above embodiment can be obtained even when the tensile strength of the blank is 780 MPa or more. That is, by performing a series of steps by the hot stamping in one apparatus, the press-formed article having the tensile strength of 780 MPa or more can be manufactured.

In the hot stamping, preferably, an amount of C is 0.09 to 0.40 by mass % as a chemical composition of the blank in order to secure a desired strength. Similarly, preferably, Mn is also 1.0 to 5.0 by mass %. Similarly, preferably, B is also 0.0005 to 0.0500 by mass %.

A typical chemical composition of a blank having a tensile strength of 1500 MPa or more after quenching is not particularly limited. However, preferably, the blank, as the typical chemical composition, includes C: 0.19 to 0.23 by mass %, Si: 0.18 to 0.22 by mass %, Mn: 1.1 to 1.5 by mass %, Al: 0.02 to 0.04 by mass %, Ti: 0.015 to 0.030 by mass %, and B: 0.0010 to 0.0020 by mass %, and for example, includes C: 0.20 by mass %, Si: 0.20 by mass %, Mn: 1.3 by mass %, Al: 0.03 by mass %, Ti: 0.020 by mass %, and B: 0.0015 by mass %.

In the manufacturing method of the present embodiment, when the hot stamping is performed, the material steel sheet is heated to a predetermined quenching temperature. The quenching temperature is higher than an A3 transformation point (more specifically, an Ac3 transformation point) at which the material steel sheet which is a workpiece is austenitized, and may be, for example, 910° C. or higher. For heating the material steel sheet, for example, a method of heating the material steel sheet in a heating apparatus such as a heating furnace or a method of heating the material steel sheet by energizing the material steel sheet can be used. Preferably, a heating temperature range is a range of the Ac3 transformation point or more (Ac3 transformation point +150° C.) or less in order to obtain an austenite single layer and suppress the decomposition of the austenite layer. In order to dissolve carbides in the steel sheet, a heating temperature retention time is preferably 1 second or more and 300 seconds or less. When elements such as Mn, Cr, and Mo having good hardenability are added, the heating temperature can be retained within a short time.

Next, the heated material steel sheet is pressed by the pressing apparatus 40a or the like shown in FIG. 10A or the like. Since the material steel sheet is heated, the material steel sheet is unlikely to crack even when the material steel sheet is greatly deformed. Preferably, a temperature of the material steel sheet when the pressing starts is an Ms point or more (Ac3 transformation point +150° C.) or less in order to obtain a martensite single layer within the heating temperature range. Further, in order to secure productivity and suppress the disappearance of Zn in the case of a GA steel sheet, preferably, a temperature rising rate is 5° C./sec or more and 500° C./sec or less.

When the material steel sheet, which is the workpiece, is pressed, the deformed material steel sheet, that is, the formed article is rapidly cooled. Due to this rapid cooling, the workpiece is quenched during pressing. The rapid cooling can be performed by providing a water-cooling pipe inside a die or by ejecting water from the die toward the formed article. Preferably, a cooling rate when the formed article is rapidly cooled by the pressing apparatus is 20° C./sec or more and 200° C./sec or less in order to suppress the manufacturing cost and obtain the martensite single layer. For example, 30° C./sec or more is more preferable.

A procedure (heating, pressing, or the like) of the hot stamping and the device used therein are not particularly limited, and known procedures and devices may be used.

In this manufacturing method, the press forming is performed using a pressing apparatus including an upper die, a lower die, and two movable dies that can move in the vertical direction and the horizontal direction.

The lower die includes a punch die and two movable plates which are disposed so as to sandwich the punch die and movable at least in the vertical direction. Then, the manufacturing method includes Step (Ia), Step (Ib), Step (IIa), and Step (IIb).

Here, as the movable direction of the movable die, the vertical direction and the horizontal direction may include only one direction in the vertical direction and one direction in the horizontal direction, but also an oblique direction in which both the vertical direction and the horizontal direction overlap each other.

Step (Ia) is a step of arranging the material steel sheet between the upper die and the two movable dies, and the lower die.

Step (Ib) is a step of obtaining the deformed steel sheet in a state in which the end portion of the material steel sheet is interposed between the two movable dies and movable plates by lowering the two movable dies together with the two movable plates and moving the two movable dies toward the punch die.

Step (IIa) is a step of restraining a portion of the deformed steel sheet by the two movable dies and side surface portions of the punch dies by further moving the two movable dies toward the punch dies.

Step (IIb) is a step of pressing a portion of the deformed steel sheet by the upper die and the punch die by lowering the upper die and overlapping at least a portion of a protrusion portion equivalent portion between the upper die and the movable die to form the press-formed article.

In the manufacturing method of the following embodiment, a through-hole may be formed in a top sheet portion equivalent portion. Then, in Step (IIa), the movement of the deformed steel sheet may be suppressed by causing a pin protruding from the press die to pass through the through-hole. The pin protrudes from either the upper die or lower die of the press die.

On the other side of the press die, the through-hole through which the pin passes is formed. The through-hole is generally formed at a stage of blanking, but may be formed at another stage before a second step of a fourth embodiment described below. In a first step of the fourth embodiment described below as well, the movement of the blank may be suppressed by causing the pin to pass through the through-hole.

Hereinafter, the manufacturing method of the present embodiment will be described with reference to FIGS. 10A to 10H. The embodiments described below are examples, and the present invention is not limited to the following embodiments, and various variations described above can be applied. In the following description, the same portions may be designated by the same reference numerals and duplicate description thereof may be omitted.

Further, in the following drawings, in order to facilitate understanding, a gap may be shown between the steel sheets overlapped at the overlapping portion, but preferably, the steel sheets overlapped at the overlapping portion are in close contact with each other.

In the following example, a manufacturing method in which hot press forming is performed in a state in which the material steel sheet is heated before Step (Ia) will be described. Therefore, in Steps (Ia) and (Ib), a state in which the punch die and the material steel sheet, which will be described below, are not in contact with each other is maintained, and in Step (IIa), a state in which an upper surface portion of the punch die and the deformed steel sheet are not in contact with each other is maintained, and thus, the hot press forming is performed by one pressing apparatus.

An example of the pressing apparatus used in this manufacturing method is shown in FIG. 10A. The pressing apparatus 40a of FIG. 10A includes an upper die 50, a lower die 60, two movable dies 51, and a plate 63. Each of the two movable dies 51 is movable in the vertical direction and the horizontal direction. The lower die 60 includes a punch die 61 and two movable plates 64 which are disposed so as to sandwich the punch die 61 and movable in the vertical direction.

FIG. 10A shows an example in which the movable plates 64 are connected to the plate 63 via extension/contraction mechanisms 64a. As the extension/contraction mechanism 64a, a mechanism exemplified for the extension/contraction mechanism 61b can be used. The movable plate 64 may be moved independently of the movable die 51 by a driving device directly attached to the movable plate 64.

The manufacturing method of the present embodiment includes Steps (Ia), (Ib), (IIa), and (IIb) described above.

The deformed steel sheet 310 obtained in Step (Ib) has a long shape, and includes two standing wall portion equivalent portions 310aw which become the two standing wall portions, a top sheet portion equivalent portion 310at which becomes the top sheet portion, a protrusion portion equivalent portion 310ae which becomes the protrusion portion, and two flange portion equivalent portions 310b which become the two flange portions.

In Step (Ib), two flange portion equivalent portions 310b are sandwiched between the two movable dies 51 and the two movable plates 64.

In Step (IIa), the two standing wall portion equivalent portions 310aw are restrained by the two movable dies 51 and the side surface portions of the punch die 61.

In Step (IIb), by lowering the upper die 50, the top sheet portion equivalent portion 310at is pressed by the upper die 50 and the punch die 61, and at least a portion of the protrusion portion equivalent portion 310ae is overlapped between the upper die 50 and the movable die 51.

An example of a manufacturing step of manufacturing the press-formed article 100 shown in FIG. 1 using the pressing apparatus 40a will be described below.

FIGS. 10A, 10C, 10E and 10G show cross-sectional views in a cross section corresponding to the protrusion region P1 of the formed article 100 obtained by the manufacturing method of the present embodiment. Further, FIGS. 10B, 10D, 10F and 10H show cross-sectional views in a cross section corresponding to the non-protrusion region P2 of the formed article 100. That is, FIGS. 10A and 10B, FIGS. 10C and 10D, FIGS. 10E and 10F, and FIGS. 10G and 10H show the cross sections of the material steel sheet B1, the deformed steel sheet 310, the formed article 100, and the pressing apparatus 40a at the same time. This also applies to FIGS. 11A to 11H and FIGS. 12A to 12F, which will be described below.

The cross section portion of the pressing apparatus 40a corresponding to the protrusion region P1 of the formed article 100 is as shown in FIG. 10A and the like.

As shown in FIG. 10B and the like, in a cross section portion of the pressing apparatus 40a corresponding to the non-protrusion region P2 of the formed article 100, a protruding die portion 50a is provided in the upper die 50 and a recessed die portion 61a is provided in the punch die 61 to form the recessed part 120.

First, as shown in FIGS. 10A and 10B, the material steel sheet B1 is disposed between the upper die 50 and the movable dies 51, and the lower die 60 (Step (Ia)).

In Step (Ia), as shown in FIGS. 10A and 10B, the material steel sheet B1 is disposed between the upper die 50 and the two movable dies 51 and the lower die 60 in a state in which the punch die 61 and the material steel sheet B1 are not in contact with each other.

Next, as shown in FIGS. 10C and 10D, the two movable dies 51 are lowered to sandwich the two flange portion equivalent portions 310b between stepped parts 51a of the two movable dies 51 and the movable plate 64, the two movable dies 51 are lowered together with the two movable plates 64, the two movable dies 51 is moved toward the punch die 61, and thus, the deformed steel sheet 310 is obtained (Step (Ib)). At this time, the two flange portion equivalent portions are sandwiched between the stepped parts 51a of the two movable dies 51 and the movable plate 64.

Further, in Step (Ib), the state in which the upper surface portion of the punch die 61 and the deformed steel sheet 310 are not in contact with each other is maintained.

Figure 10E:
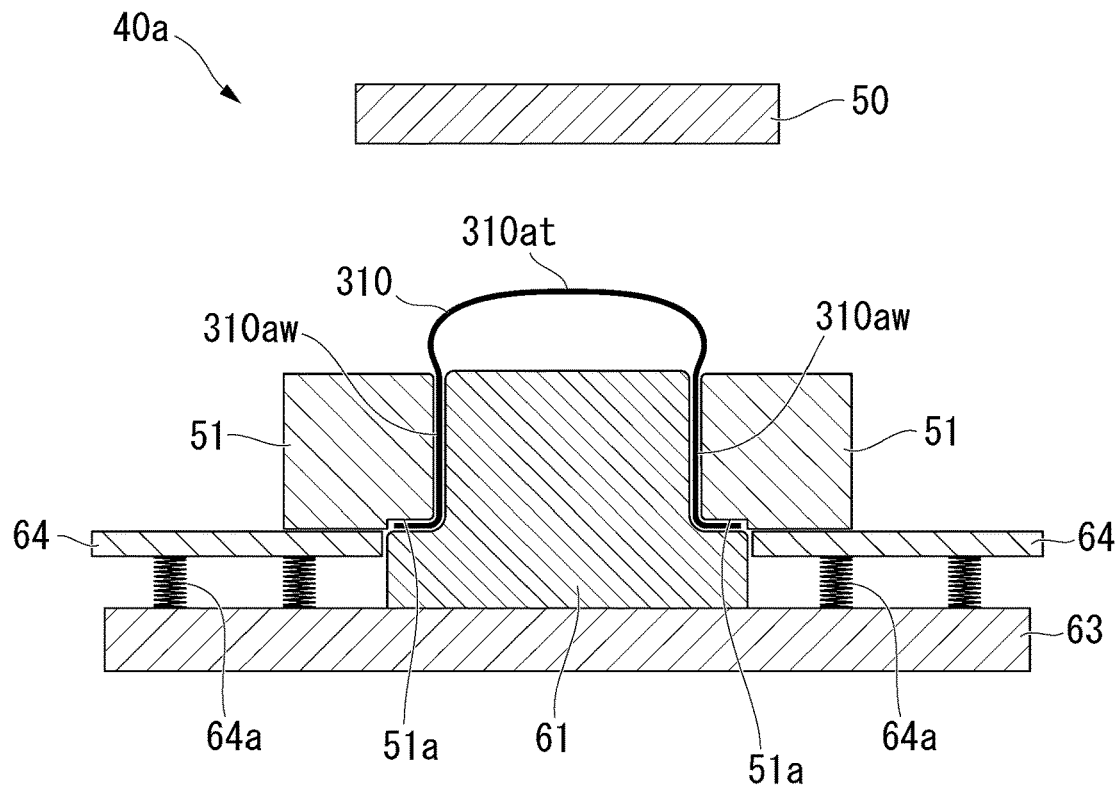
FIG. 10E is a cross-sectional view in the first region of the preliminary formed article schematically showing Step (IIa) following Step of FIG. 10C.
Figure 10F:
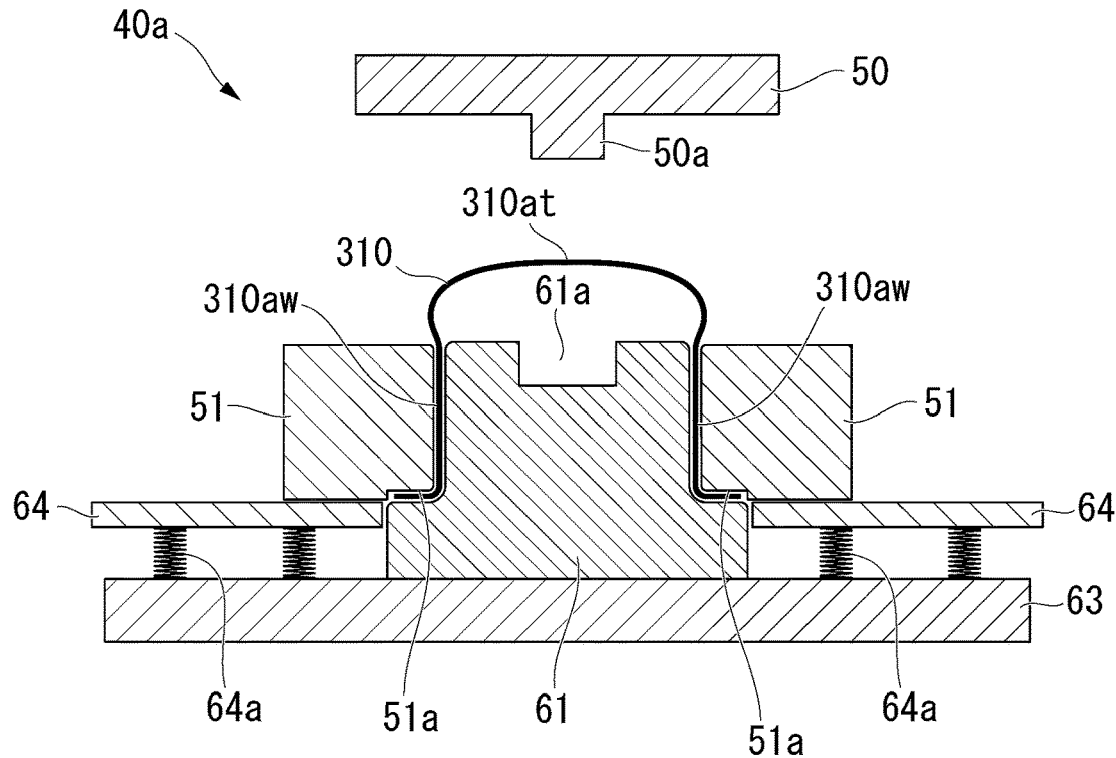
FIG. 10F is a cross-sectional view in the second region of the preliminary formed article schematically showing Step (IIa) following Step of FIG. 10D.
Figure 10G:
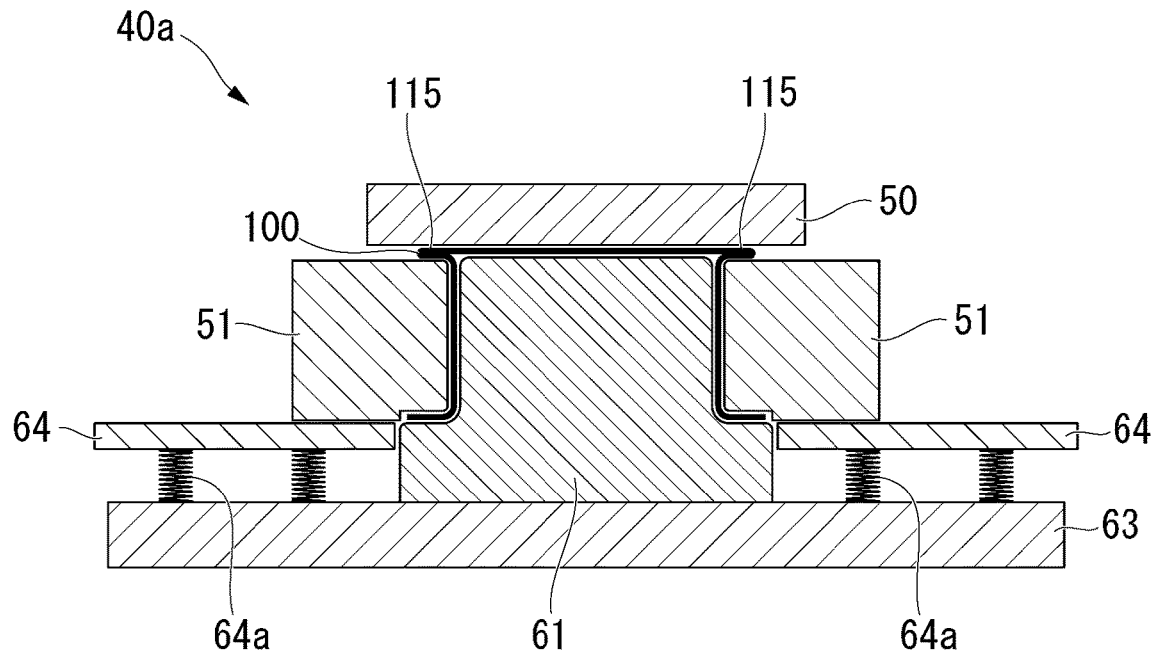
FIG. 10G is a cross-sectional view in the first region of the preliminary formed article schematically showing Step (IIb) following Step of FIG. 10E.
Figure 10H:
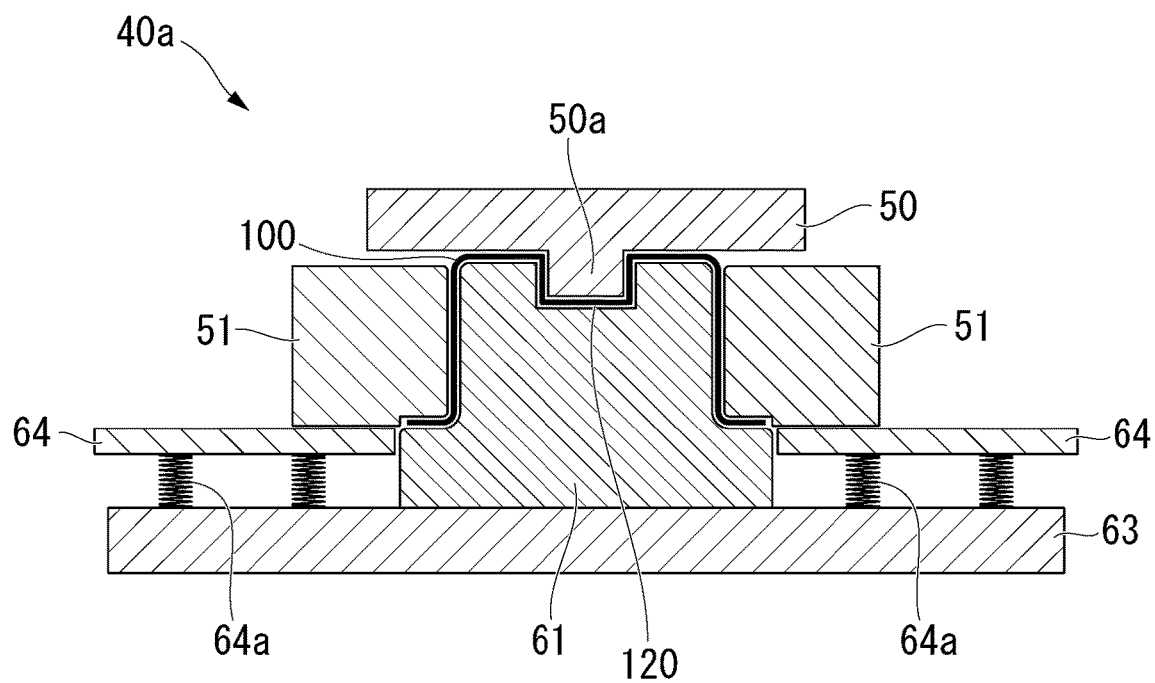
FIG. 10H is a cross-sectional view in the second region of the preliminary formed article schematically showing Step (IIb) following Step of FIG. 10F.

Next, as shown in FIGS. 10E and 10F, the two movable dies 51 are further moved toward the punch die 61, and thus, the two standing wall portion equivalent portions 310aw are restrained by the two movable dies 51 and the side surface portions of the punch die 61 (Step (Ib)).

In this step, the standing wall portion equivalent portions 310aw are restrained at a predetermined position. In this case, with the movement of the movable die 51, the flange portion equivalent portion 310b moves from a portion above the movable plate 64 to a portion above the punch die 61. In this case, it is preferable to maintain a state in which the upper surface portion of the punch die 61 and the deformed steel sheet 310 are not in contact with each other.

As shown in FIGS. 10E and 10F, the punch die 61 includes a portion (level difference portion) having a shape corresponding to the flange portion 117. In Step (IIa), the step portion and the movable plate 64 are flush with each other. In Step (IIa), the flange portion equivalent portion 310b shifts from the state of being disposed between the movable die 51 and the movable plate 64 to the state of being disposed between the movable die 51 and the punch die 61. Preferably, a distance between the two sandwiching the flange portion equivalent portion 310b is a length obtained by adding about 0.1 to 0.3 mm to the sheet thickness of the flange portion equivalent portion 310b. With this configuration, smooth movement in the horizontal direction is possible.

Next, as shown in FIG. 10G, the upper die 50 is lowered, the top sheet portion equivalent portion 310at is pressed by the upper die 50 and the punch die 61, and at least a portion of the protrusion portion equivalent portion 310ae is overlapped between the upper die 50 and the movable die 51 (Step (IIb)).

At the same time, as shown in FIG. 10H, the upper die 50 is lowered, the top sheet portion equivalent portion 310*at* is pressed by the upper die 50 and the punch die 61, the top sheet portion equivalent portion 310*at* is deformed by the protruding die portion 50*a* and the recessed die portion 61*a*, and thus, the recessed part 120 is formed between the upper die 50 and the punch die 61.

As a result, the press-formed article 100 is formed.

In the above Step (IIa), the two movable dies 51 are lowered to sandwich the two flange portion equivalent portions between the two movable dies 51 and the movable plate 64, and the two movable dies 51 are lowered to bottom dead points. After that, an example is shown in which the two standing wall portion equivalent portions are restrained by the two movable dies 51 and the punch die 61 by moving the two movable dies 51 in the horizontal direction (refer to FIG. 10E or FIG. 10F). Meanwhile, the two movable dies 51 may be lowered to sandwich the two flange portion equivalent portions 310*b* between the two movable dies 51 and the movable plate 64, and then the two movable dies 51 may be moved in a direction oblique toward the punch die 61, and thus, the two standing wall portion equivalent portions may be restrained by the two movable dies 51 and the punch die 61.

Next, the movable die 51 is moved in the horizontal direction and then the movable die 51, the movable plate 64, and the upper die 50 are raised, and thus, the press-formed article 100 can be carried out from the pressing apparatus 40*c*. In this manufacturing method using the pressing apparatus 40*a*, the movable die 51 and the movable plate 64 can be raised at the same time. Therefore, it is possible to shorten the time required of manufacturing.

In the above-mentioned example of the manufacturing method, the entire flange portion equivalent portion 310*b* (or flange portion 117) is disposed on the punch die 61 in Step (IIa) and Step (IIb). However, a portion of the flange portion equivalent portion 310*b* (or the flange portion 117) may be disposed on the movable plate 64 in Step (IIa) and Step (IIb). In this manufacturing method, after the press is completed, a portion of the flange portion 117 is disposed on the movable plate 64, and thus, the press-formed article 100 is raised as the movable plate 64 is raised. Therefore, the upper die 50, the movable die 51, and the movable plate 64 can be raised at the same time, and the time required of the manufacturing can be further shortened.

Hereinafter, an example of a manufacturing step of manufacturing the press-formed article 100A according to the modification example shown in FIG. 5 by using a pressing apparatus 40*b* will be described.

Figure 11A:
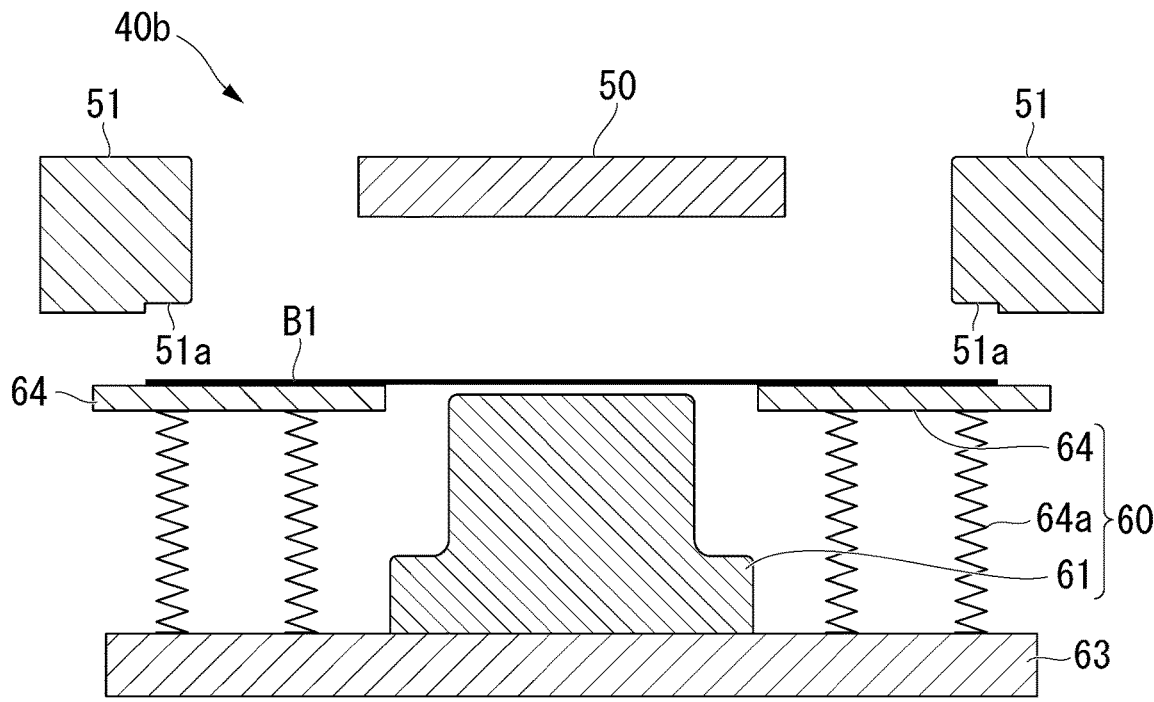
FIG. 11A is a cross-sectional view schematically showing Step (Ia) in one example of the manufacturing method of the present embodiment, and is a cross-sectional view in the first region of the preliminary formed article.
Figure 11B:
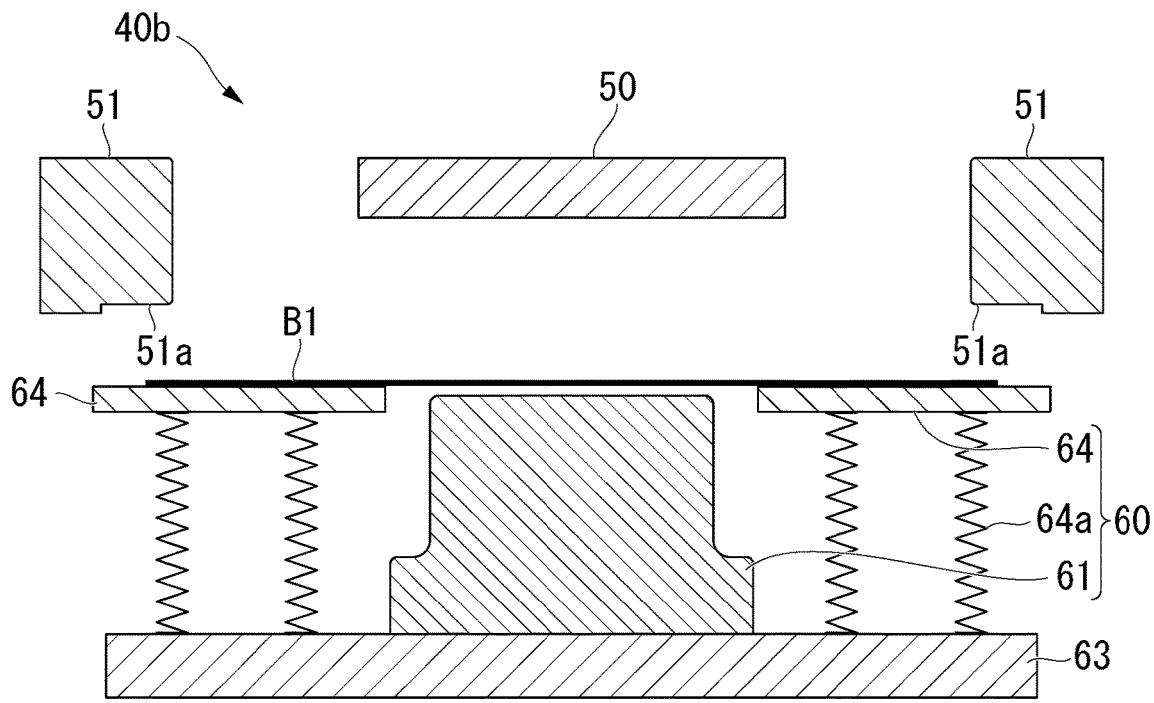
FIG. 11B is a cross-sectional view schematically showing Step (Ia) in one example of the manufacturing method of the present embodiment, and is a cross-sectional view in the second region of the preliminary formed article.

The cross section portion of the pressing apparatus 40*b* corresponding to the protrusion region P1 of the formed article 100A is as shown in FIG. 11A and the like. As shown in FIG. 11B and the like, in the cross section portion of the pressing apparatus 40*b* corresponding to the non-protrusion region P2 of the formed article 100A, compared with the punch die 61 of FIG. 11A and the like, a width of the punch die 61 is wider in the horizontal direction and the stepped part 51*a* of the movable die 51 is deeper.

First, as shown in FIGS. 11A and 11B, the material steel sheet B1 is disposed between the upper die 50 and the movable die 51, and the lower die 60 (Step (Ia)).

In Step (Ia), as shown in FIGS. 11A and 11B, the material steel sheet B1 is disposed between the upper die 50 and the two movable dies 51 and the lower die 60 in a state in which the punch die 61 and the material steel sheet B1 are not in contact with each other.

Figure 11C:
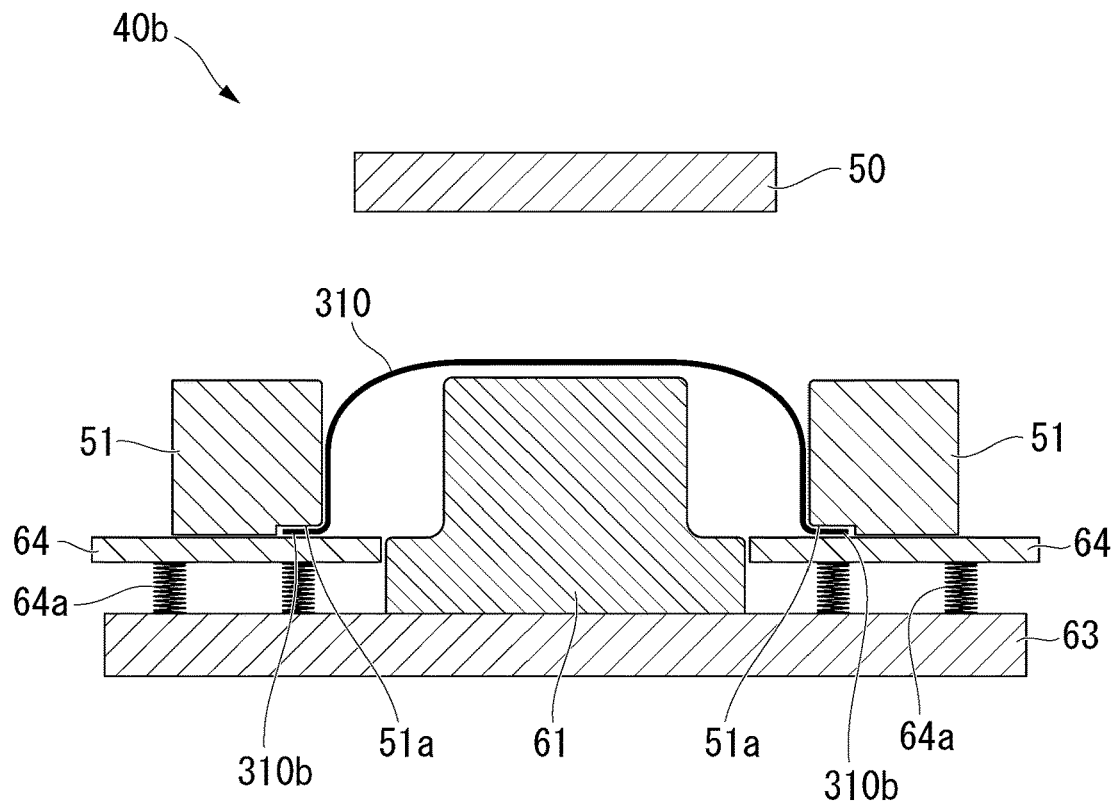
FIG. 11C is a cross-sectional view in the first region of the preliminary formed article schematically showing Step (Ib) following Step of FIG. 11A.
Figure 11D:
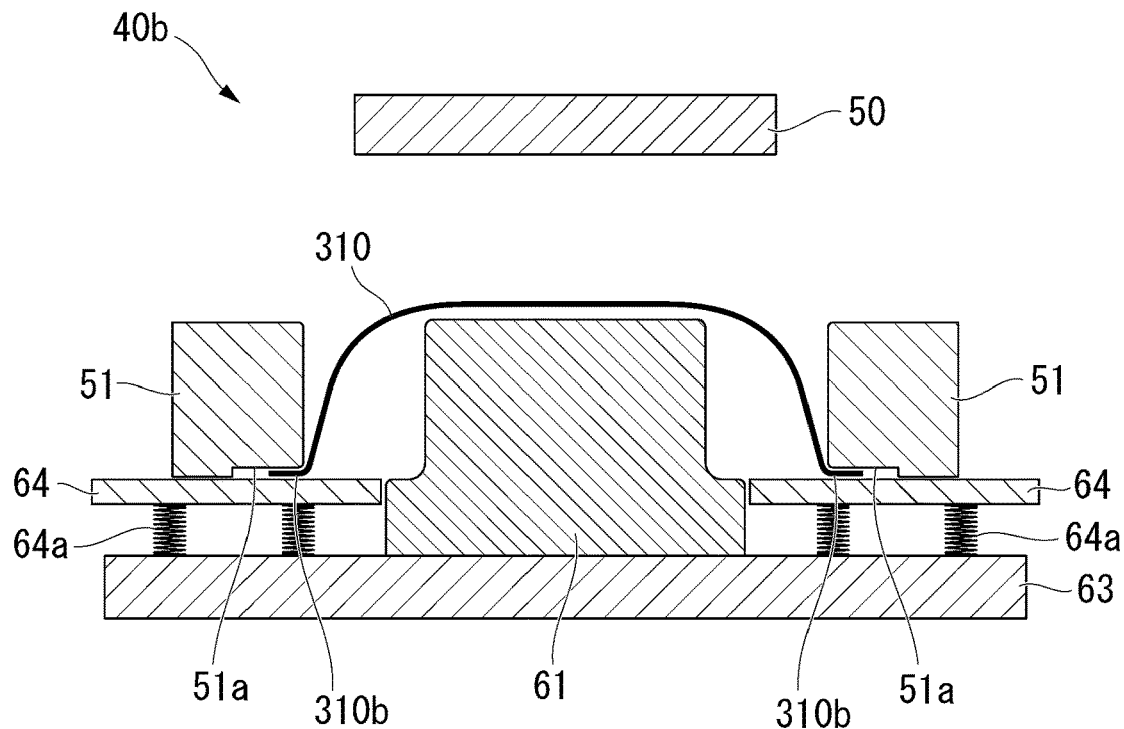
FIG. 11D is a cross-sectional view in the second region of the preliminary formed article schematically showing Step (Ib) following Step of FIG. 11B.

Next, as shown in FIGS. 11C and 11D, the two movable dies 51 are lowered to sandwich the two flange portion equivalent portions 310*b* between the stepped parts 51*a* of the two movable dies 51 and the movable plate 64, the two movable dies 51 are lowered together with the two movable plates 64, the two movable dies 51 is moved toward the punch die 61, and thus, the deformed steel sheet 310 is obtained (Step (Ib)). At this time, the two flange portion equivalent portions are sandwiched between the stepped parts 51*a* of the two movable dies 51 and the movable plate 64.

Further, in Step (Ib), as shown in FIG. 11C, the state in which the upper surface portion of the punch die 61 and the deformed steel sheet 310 are not in contact with each other is maintained.

Figure 11E:
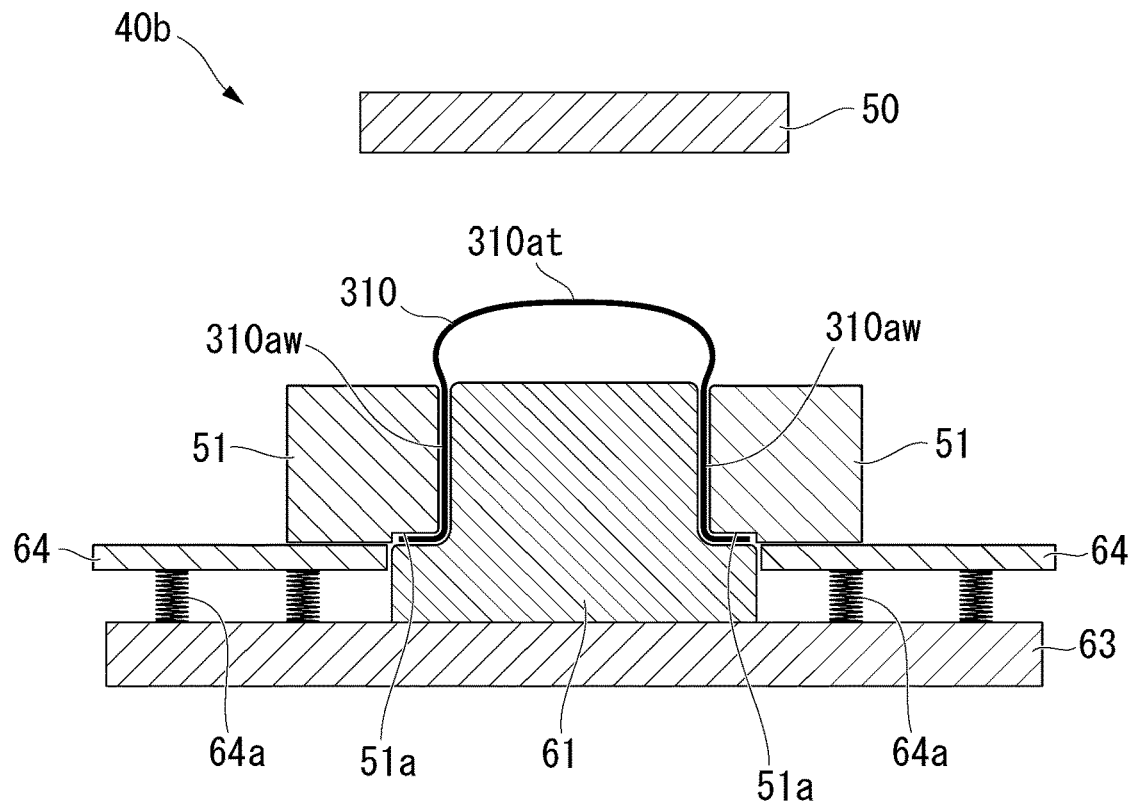
FIG. 11E is a cross-sectional view in the first region of the preliminary formed article schematically showing Step (IIa) following Step of FIG. 11C.
Figure 11F:
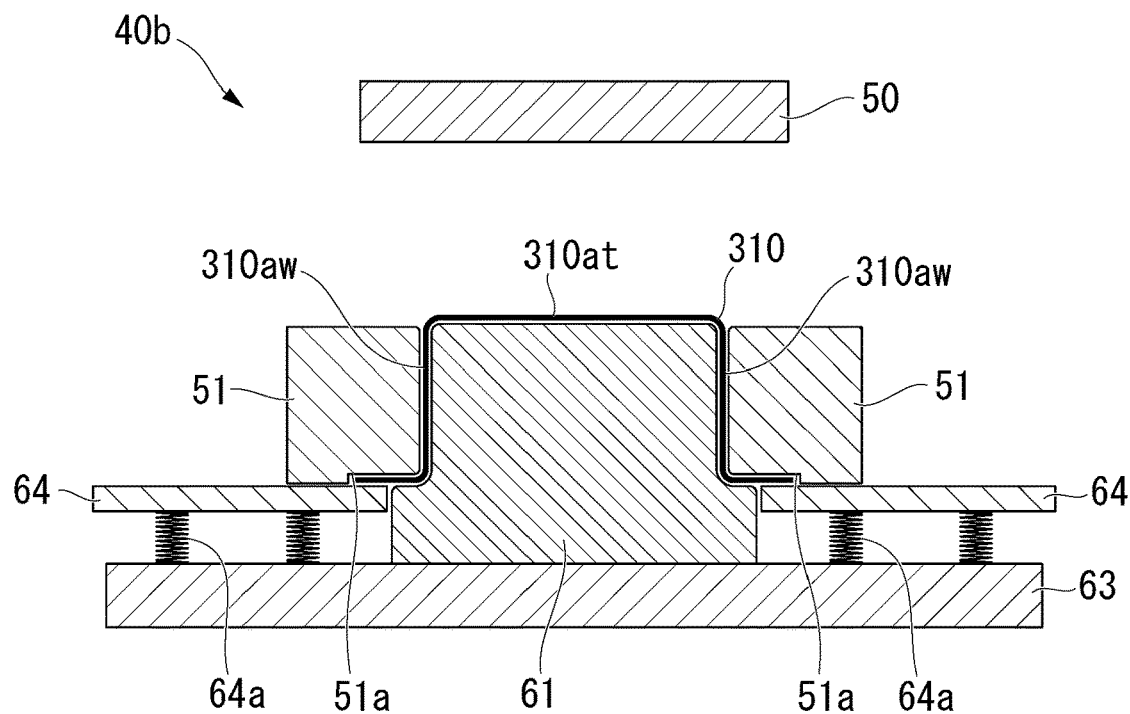
FIG. 11F is a cross-sectional view in the second region of the preliminary formed article schematically showing Step (IIa) following Step of FIG. 11D.

Next, as shown in FIGS. 11E and 11F, the two movable dies 51 are further moved toward the punch die 61, and thus, the two standing wall portion equivalent portions 310*aw* are restrained by the two movable dies 51 and the side surface portions of the punch die 61 (Step (IIa)).

At this time, in at least a region of the deformed steel sheet 310 corresponding to the protrusion region P1 of the formed article 100A, it is preferable to maintain the state in which the upper surface portion of the punch die 61 and the deformed steel sheet 310 are not in contact with each other.

Figure 11G:
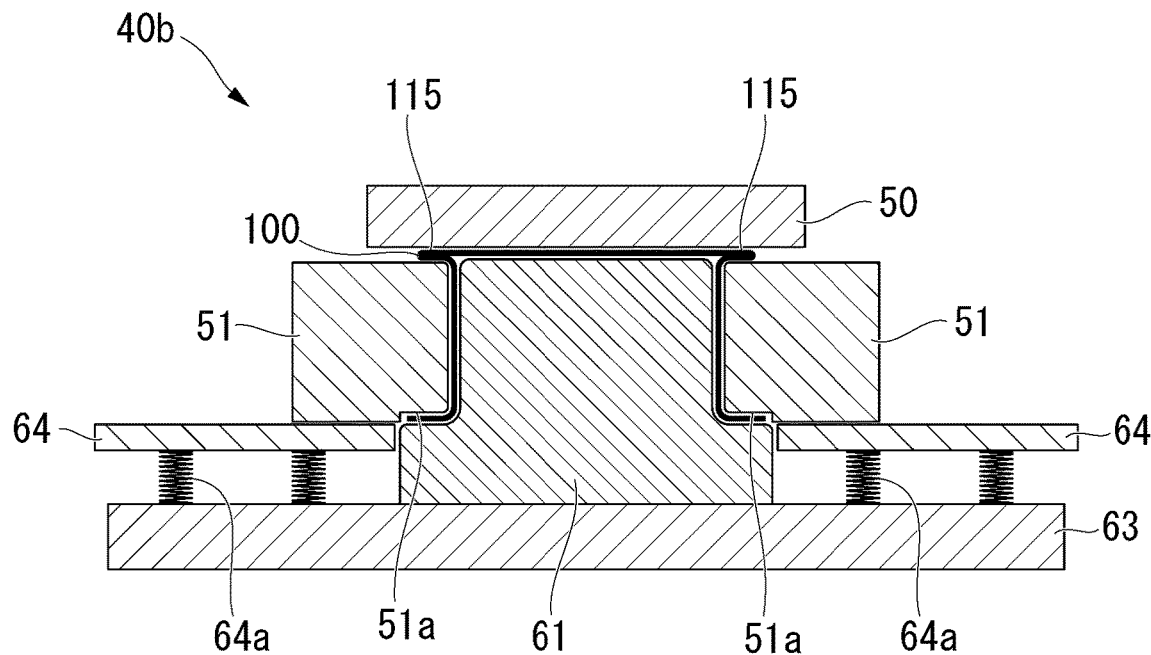
FIG. 11G is a cross-sectional view in the first region of the preliminary formed article schematically showing Step (IIb) following Step of FIG. 11E.
Figure 11H:
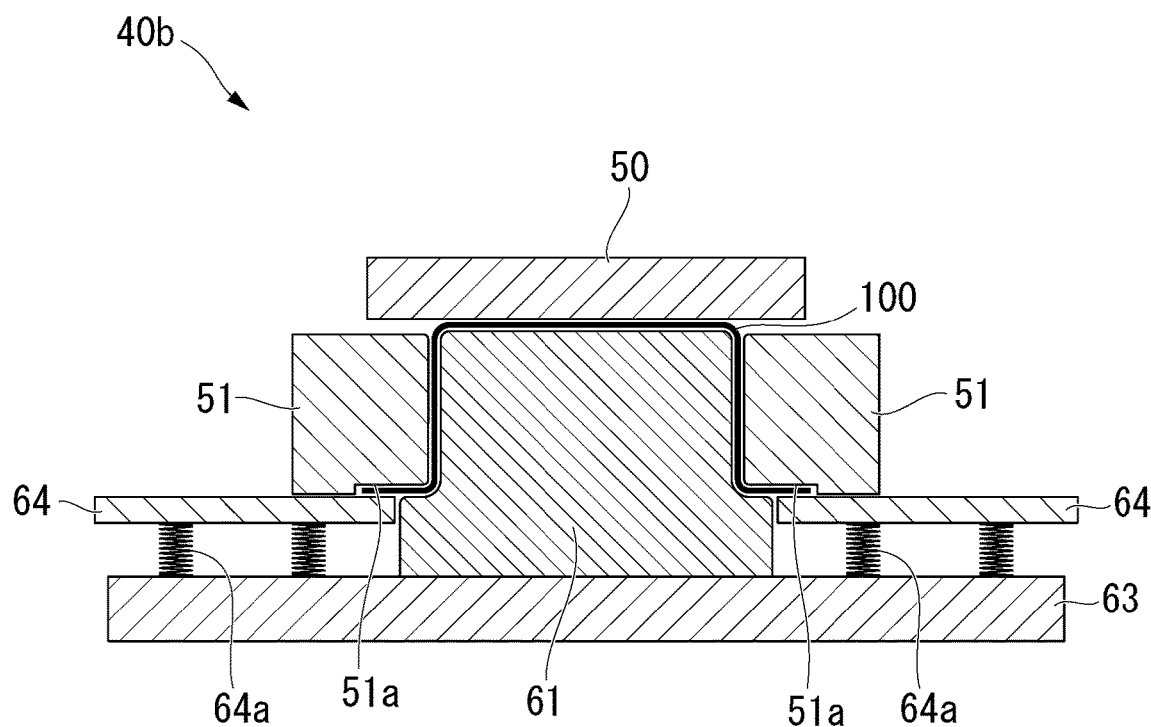
FIG. 11H is a cross-sectional view in the second region of the preliminary formed article schematically showing Step (IIb) following Step of FIG. 11F.

Next, as shown in FIG. 11G, in a region of the deformed steel sheet 310 corresponding to the protrusion region P1 of the formed article 100A, the upper die 50 is lowered, the top sheet portion equivalent portion 310*at* is pressed by the upper die 50 and the punch die 61, and at least a portion of the protrusion portion equivalent portion 310*ae* is overlapped between the upper die 50 and the movable die 51 (Step (IIb)). As a result, the press-formed article 100A is formed. As shown in FIG. 11H, in the region of the deformed steel sheet 310 corresponding to the non-protrusion region P2 of the formed article 100A, the protrusion portion 115 is not formed.

In the above Step (IIa), the two movable dies 51 are lowered to sandwich the two flange portion equivalent portions between the two movable dies 51 and the movable plate 64, and the two movable dies 51 are lowered to the bottom dead points. After that, an example is shown in which the two standing wall portion equivalent portions are restrained by the two movable dies 51 and the punch die 61 by moving the two movable dies 51 in the horizontal direction (refer to FIG. 11E or FIG. 11F). Meanwhile, the two movable dies 51 may be lowered to sandwich the two flange portion equivalent portions 310*b* between the two movable dies 51 and the movable plate 64, and then the two movable dies 51 may be moved in a direction oblique toward the punch die 61, and thus, the two standing wall portion equivalent portions may be restrained by the two movable dies 51 and the punch die 61.

Next, the movable die 51 is moved in the horizontal direction and then the movable die 51, the movable plate 64, and the upper die 50 are raised, and thus, the press-formed article 100A can be carried out from the pressing apparatus 40*c*. In this manufacturing method using the pressing apparatus 40*b*, the movable die 51 and the movable plate 64 can be raised at the same time. Therefore, it is possible to shorten the time required of manufacturing.

Further, in the pressing apparatus 40*b* shown in FIG. 11A and the like, a portion of the flange portion 117 of the formed article 100A is disposed on the movable plate 64 at the end of Step (IIb). Accordingly, the press-formed article 100A is raised as the movable plate 64 is raised, the upper die 50, the movable die 51, and the movable plate 64 can be raised at the same time, and the time required of the manufacturing can be further shortened.

Hereinafter, an example of a manufacturing step of manufacturing the press-formed article 100B shown in FIG. 6 using the pressing apparatus 40c will be described.

Figure 12A:
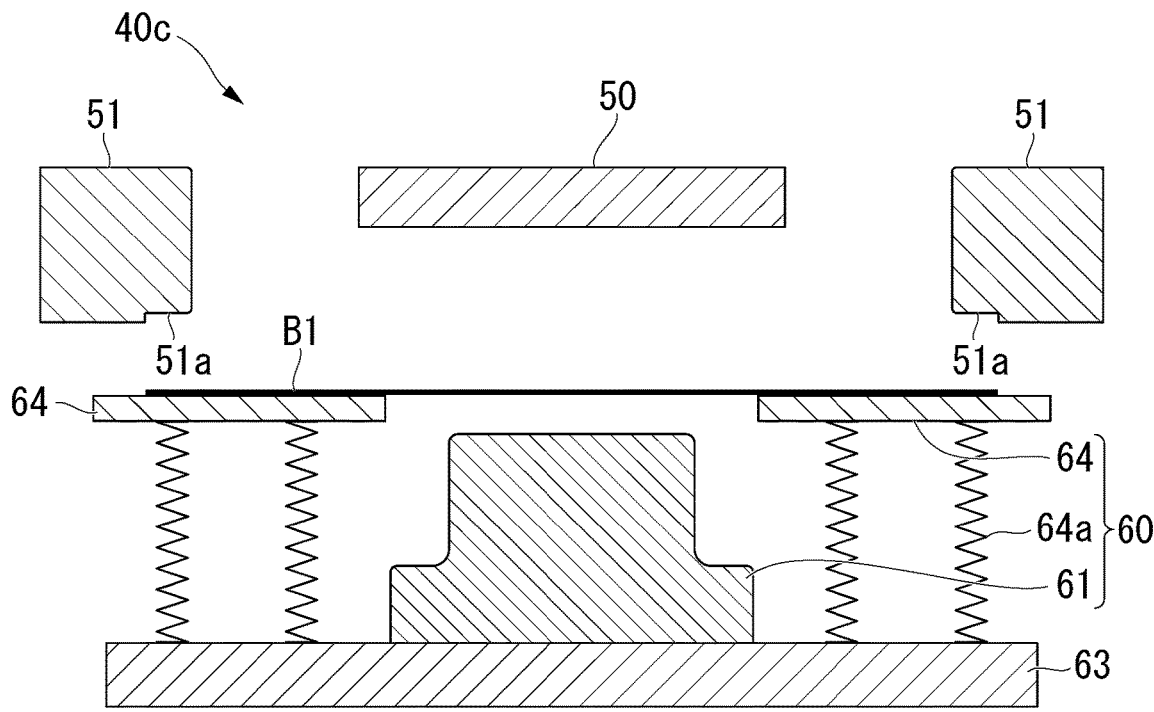
FIG. 12A is a cross-sectional view schematically showing Step (Ia) in one example of the manufacturing method of the present embodiment, and is a cross-sectional view in the first region of the preliminary formed article.
Figure 12B:
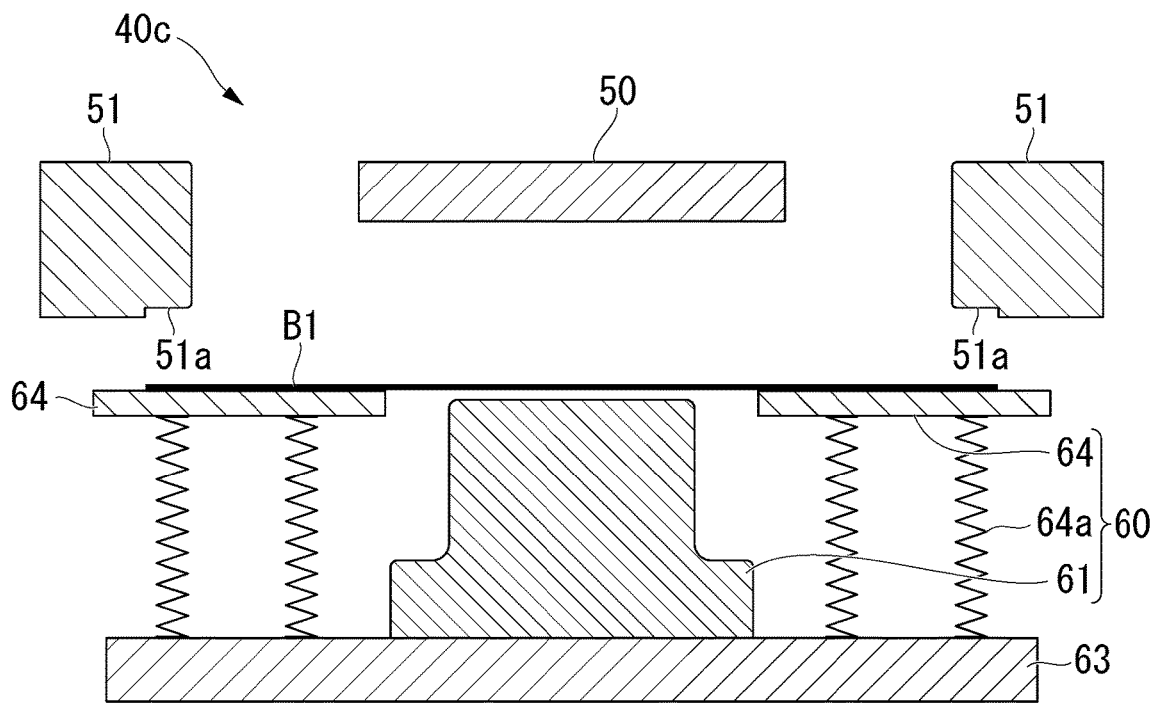
FIG. 12B is a cross-sectional view schematically showing Step (Ia) in one example of the manufacturing method of the present embodiment, and is a cross-sectional view in the second region of the preliminary formed article.

The cross section portion of the pressing apparatus 40c corresponding to the protrusion region P1 of the formed article 100B is as shown in FIG. 12A and the like. As shown in FIG. 12B and the like, in the cross section portion of the pressing apparatus 40c corresponding to the non-protrusion region P2 of the formed article 100B, compared with the punch die 61 of FIG. 12A and the like, a height of the punch die 61 is higher.

First, as shown in FIGS. 12A and 12B, the material steel sheet B1 is disposed between the upper die 50 and the movable die 51, and the lower die 60 (Step (Ia)).

In Step (Ia), as shown in FIGS. 12A and 12B, the material steel sheet B1 is disposed between the upper die 50 and the two movable dies 51 and the lower die 60 in a state in which the punch die 61 and the material steel sheet B1 are not in contact with each other.

Next, the two movable dies 51 are lowered to sandwich the two flange portion equivalent portions 310b between the stepped parts 51a of the two movable dies 51 and the movable plate 64, the two movable dies 51 are lowered together with the two movable plates 64, the two movable dies 51 is moved toward the punch die 61, and thus, the deformed steel sheet 310 is obtained (Step (Ib)). At this time, the two flange portion equivalent portions are sandwiched between the stepped part 51a of the two movable dies 51 and the movable plate 64.

Further, in Step (Ib), the state in which the upper surface portion of the punch die 61 and the deformed steel sheet 310 are not in contact with each other is maintained.

Figure 12C:
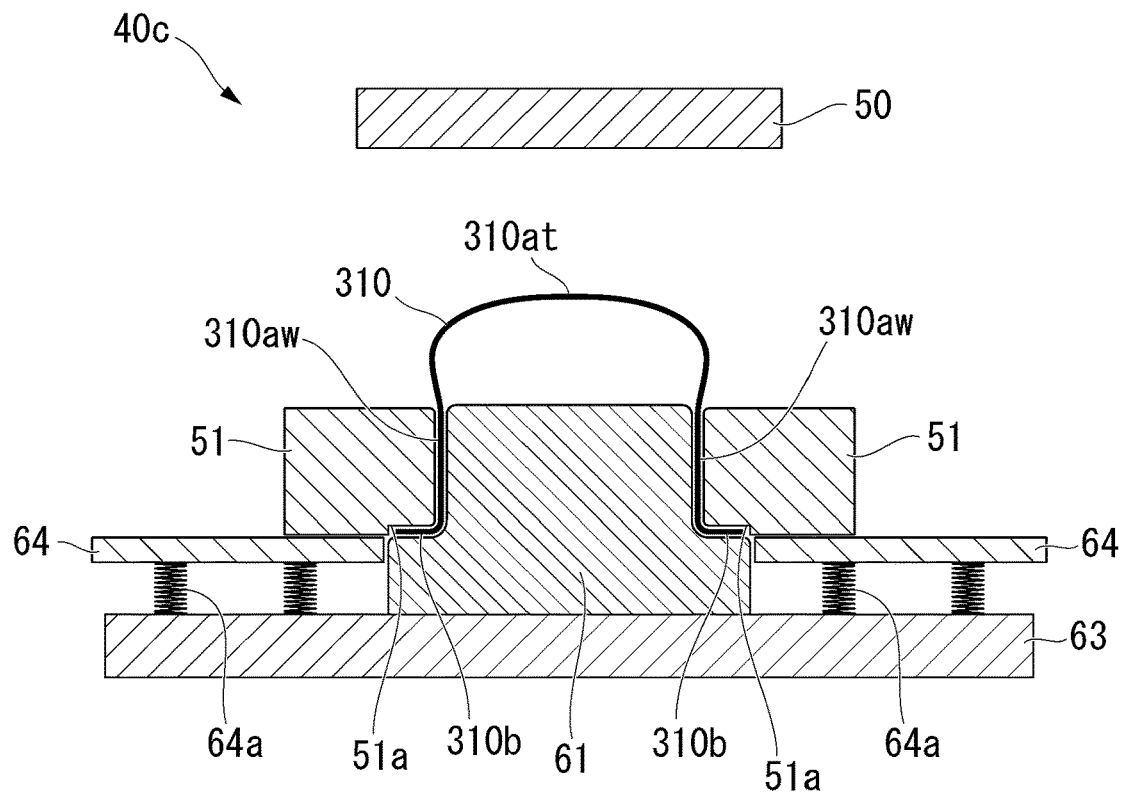
FIG. 12C is a cross-sectional view in the first region of the preliminary formed article schematically showing Steps (Ib) to (IIa) following Step of FIG. 12A.
Figure 12D:
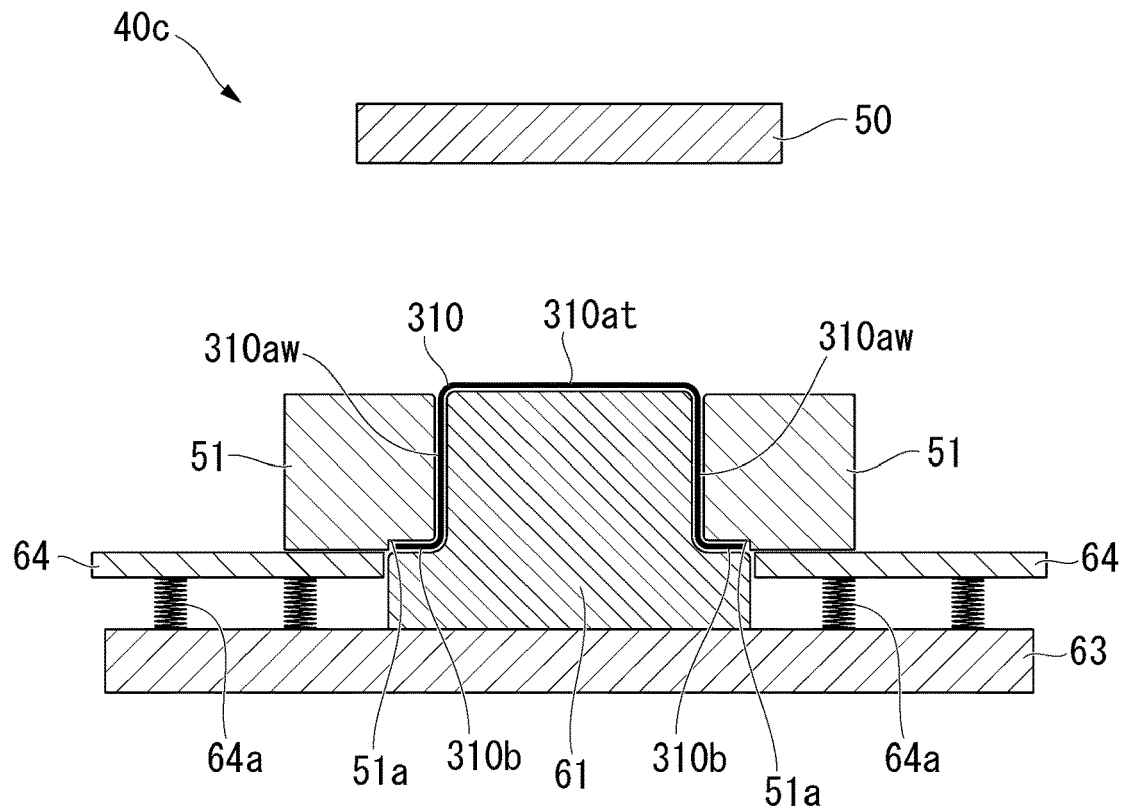
FIG. 12D is a cross-sectional view in the second region of the preliminary formed article schematically showing Steps (Ib) to (IIa) following Step of FIG. 12B.

Next, as shown in FIGS. 12C and 12D, the two movable dies 51 are further moved toward the punch die 61, and thus, the two standing wall portion equivalent portions 310aw are restrained by the two movable dies 51 and the side surface portions of the punch die 61 (Step (IIa)).

In this step, the standing wall portion equivalent portion 310aw is restrained at a predetermined position. At this time, with the movement of the movable die 51, the flange portion equivalent portion 310b moves from the portion above the movable plate 64 to the portion above the punch die 61. At this time, in at least a region of the deformed steel sheet 310 corresponding to the protrusion region P1 of the formed article 100B, it is preferable to maintain the state in which the upper surface portion of the punch die 61 and the deformed steel sheet 310 are not in contact with each other.

Figure 12E:
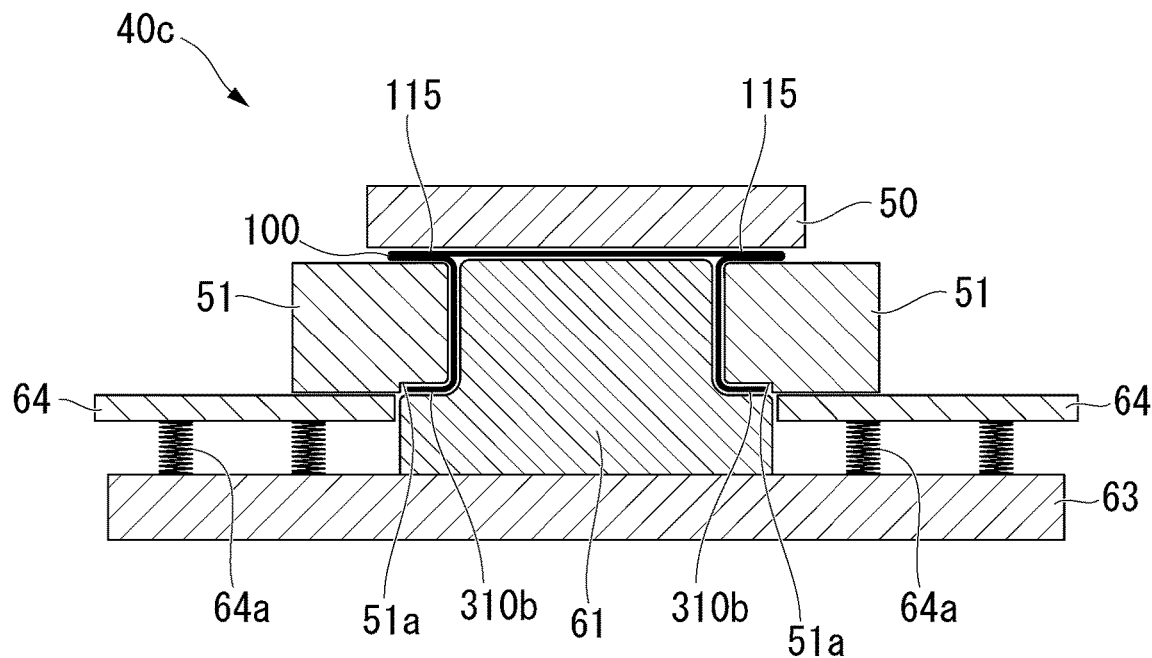
FIG. 12E is a cross-sectional view in the first region of the preliminary formed article schematically showing Step (IIb) following Step of FIG. 12C.
Figure 12F:
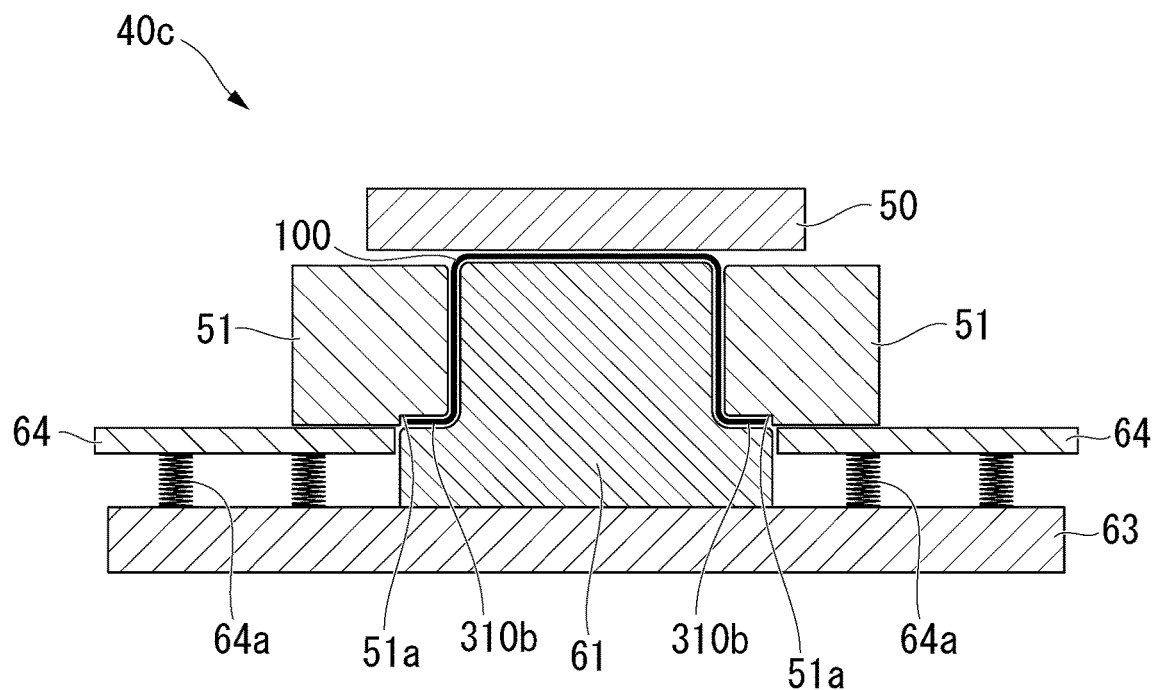
FIG. 12F is a cross-sectional view in the second region of the preliminary formed article schematically showing Step (IIb) following Step of FIG. 12D.

Next, as shown in FIG. 12E, the upper die 50 is lowered, the top sheet portion equivalent portion 310at is pressed by the upper die 50 and the punch die 61, and at least a portion of the protrusion portion equivalent portion 310ae is overlapped between the upper die 50 and the movable die 51 (Step (IIb)). As shown in FIG. 12F, in the region of the deformed steel sheet 310 corresponding to the non-protrusion region P2 of the formed article 100B, the protrusion portion 115 is not formed. As a result, the press-formed article 100B is formed.

In the above Step (IIa), the two movable dies 51 are lowered to sandwich the two flange portion equivalent portions between the two movable dies 51 and the movable plate 64, and the two movable dies 51 are lowered to the bottom dead points. After that, an example is shown in which the two standing wall portion equivalent portions are restrained by the two movable dies 51 and the punch die 61 by moving the two movable dies 51 in the horizontal direction. Meanwhile, the two movable dies 51 may be lowered to sandwich the two flange portion equivalent portions 310b between the two movable dies 51 and the movable plate 64, and then the two movable dies 51 may be moved in a direction oblique toward the punch die 61, and thus, the two standing wall portion equivalent portions may be restrained by the two movable dies 51 and the punch die 61.

Next, the movable die 51 is moved in the horizontal direction and then the movable die 51, the movable plate 64, and the upper die 50 are raised, and thus, the press-formed article 100 can be carried out from the pressing apparatus 40c. In this manufacturing method using the pressing apparatus 40a, the movable die 51 and the movable plate 64 can be raised at the same time. Therefore, it is possible to shorten the time required of manufacturing.

In the above-mentioned example of the manufacturing method, the entire flange portion equivalent portion 310b (or flange portion 117) is disposed on the punch die 61 in Step (IIa) and Step (IIb). However, a portion of the flange portion equivalent portion 310b (or the flange portion 117) may be disposed on the movable plate 64 in Step (IIa) and Step (IIb). In this manufacturing method, after the press is completed, a portion of the flange portion 117 is disposed on the movable plate 64, and thus, the press-formed article 100 is raised as the movable plate 64 is raised. Therefore, the upper die 50, the movable die 51, and the movable plate 64 can be raised at the same time, and the time required of manufacturing can be further shortened.

In addition, in the example of the present embodiment, the example of heating the material steel sheet B1 and performing the hot press forming is described, but the manufacturing method of the present embodiment may be carried out by the cold pressing. When the manufacturing method of the present embodiment is performed by the cold pressing, in Steps (Ia) and (Ib), it is not necessary to maintain the state in which the punch die 61 and the material steel sheet B1 are not in contact with each other. Further, in Step (IIa), it is not necessary to maintain the state in which the upper surface portion of the punch die 61 and the deformed steel sheet 310 are not in contact with each other.

Here, when viewing in the cross section of the protrusion region P1 of each of the press-formed articles 100, 100A, and 100B, in a case where the angle X formed by the top sheet portion 111 and the protrusion portion 115 is 90° or more and 135° or less, Step (IIa) may be completed after Step (IIb) is completed.

Further, when viewing the cross section of the protrusion region P1 of each of the press-formed articles 100, 100A, and 100B, in a case where the angle X formed by the top sheet portion 111 and the protrusion portion 115 is 135° or more and 180° or less, Step (IIb) may be completed after Step (IIa) is completed.

After manufacturing the press-formed articles 100, 100A, and 100B, the flange portion 117 may be cut if necessary.

Fourth Embodiment

Hereinafter, a manufacturing method of a press-formed article according to a fourth embodiment of the present invention will be described. In the manufacturing method according to the present embodiment, a second example of the manufacturing method of the press-formed articles 100, 100A, and 100B described in the first embodiment will be described.

In the manufacturing method of a press-formed article according to the third embodiment described above, the first step for obtaining the deformed steel sheet which is the intermediate article and the second step for obtaining the press-formed article 100 which is the final article are performed by one device. Meanwhile, the manufacturing method of a press-formed article according to the fourth embodiment described below, the first step for obtaining the deformed steel sheet which is the intermediate article and the second step for obtaining the press-formed article which is the final article are separately performed by with different dies.

Since the descriptions of the blank (material steel sheet) overlap with the descriptions in the third embodiment described above, the description of the blank will be omitted here. Further, the temperature conditions in the case of performing hot press forming in the second step also overlap with the description in the third embodiment described above, and thus the description thereof will be omitted here.

The first step is a step of obtaining the deformed steel sheet by deforming the material steel sheet. In the first step, the deformed steel sheet is obtained, which includes the top sheet portion equivalent portion which has a long shape and becomes the top sheet portion 111, the two standing wall portion equivalent portions which become the two standing wall portions 113, the protrusion portion equivalent portion which becomes the protrusion portion 115, and the two flange portion equivalent portions which become the two flange portions 117.

The region corresponding to the protrusion region P1 of the formed article 100 is referred to as the first region, and the region corresponding to the non-protrusion region P2 of the formed article 100 is referred to as the second region.

In the deformed steel sheet, there is no clear boundary between the standing wall portion equivalent portion, the top sheet portion equivalent portion, the protrusion portion equivalent portion, and the flange portion equivalent portion. However, there may be some boundaries between them.

The deformed steel sheet may be in a state of elastic deformation in which deformation is eliminated when a load is removed, or may be in a state of plastic deformation in which the deformation is not eliminated even when a load is removed. That is, the deformed steel sheet may be in the state of the plastic deformation or the state of the elastic deformation. The deformed steel sheet in the state of the plastic deformation may be referred to as a "preliminary formed article" below.

Deformation from the material steel sheet (not shown) to a preliminary formed article 301 in the first step of the present embodiment can be performed by bending, pressing, drawing, or a combination thereof. The deformation in the first step can be performed by cold working (for example, cold pressing) regardless of the tensile strength of the blank. In this case, the forming can be performed at a lower cost than hot stamping. However, when necessary, the first step may be performed by hot working (for example, hot pressing). In one example, the first step is performed by the cold working and the second step is performed by the hot stamping. When the second step is performed by the cold working, it is an advantage that hardness of a ridge portion can be made higher than that of a flat portion by work hardening.

The second step is a step of forming the press-formed article 100 by press-forming the deformed steel sheet. In the second step, the protrusion portion 115 is formed by overlapping at least a portion of the protrusion portion equivalent portion.

The forming in the second step may be either hot press forming or cold press forming, but it is more preferable to use hot press forming. The press-formed article obtained in the second step may be further post-treated. The press-formed article obtained by the second step (or obtained by the subsequent post-treatment) may be used as it is, or may be used in combination with other members.

When the hot stamping is performed in the second step, first, the workpiece (preliminary formed article) is heated to a predetermined quenching temperature. The quenching temperature is higher than the A3 transformation point (more specifically, the Ac3 transformation point) at which the workpiece is made into austenite, and may be, for example, 910° C. or higher. For heating the preliminary formed article 301, for example, a method of heating the preliminary formed article 301 in a heating apparatus such as a heating furnace or a method of energizing the preliminary formed article 301 to heat the preliminary formed article can be used. Preferably, a heating temperature range is a range of the Ac3 transformation point or more (Ac3 transformation point +150° C.) or less in order to obtain an austenite single layer and suppress the decomposition of the austenite layer. In order to dissolve the carbides in the steel sheet, a heating temperature retention time is preferably 1 second or more and 300 seconds or less. When elements such as Mn, Cr, and Mo having good hardenability are added, the heating temperature can be retained in a short time.

Next, the heated workpiece is pressed by a pressing apparatus. Since the workpiece is heated, the workpiece is unlikely to crack even when the workpiece is greatly deformed. Preferably, a temperature of the workpiece (preliminary formed article) when the pressing starts is an Ms point or more (Ac3 transformation point +150° C.) or less in order to obtain a martensite single layer within the heating temperature range. Further, in order to secure productivity and suppress the disappearance of Zn in the case of a GA steel sheet, preferably, a temperature rising rate is 5° C./sec or more and 500° C./sec or less.

When the workpiece is pressed, the formed workpiece is rapid cooled. Due to this rapid cooling, the workpiece is quenching during pressing. The rapid cooling of the workpiece can be performed by providing a water-cooling pipe inside a die or by ejecting water from the die toward the workpiece. Preferably, a cooling rate when the workpiece is rapidly cooled by the pressing apparatus is 20° C./sec or more and 200° C./sec or less in order to suppress the manufacturing cost and obtain the martensite single layer. For example, 30° C./sec or more is more preferable.

The preliminary formed article 301 (deformed steel sheet) may include a U-shaped portion having a U-shaped cross section perpendicular to the longitudinal direction. This U-shaped portion includes two standing wall portion equivalent portions, a top sheet portion equivalent portion, and a protrusion portion equivalent portion, and becomes two standing wall portions, a top sheet portion, and a protrusion portion in the formed article. A portion which becomes a flange portion may be connected to the end portion of the U-shaped portion.

In the following description, the term "cross section" means, in principle, a cross section perpendicular to the longitudinal direction of a member such as a preliminary formed article.

When hot stamping is performed in the second step, the hot stamping includes a heating step of heating the preliminary formed article 301 obtained by processing the material steel sheet in the first step after the first step and before the second step, and in the second step, hot press forming is performed by a press die including an upper die and a lower die and two cam dies. The lower die has a protrusion, and the second step includes a step of disposing the lower die and the deformed steel sheet in a state in which the protrusion of the lower die and at least a portion of the deformed steel sheet are not in contact with each other.

Further, the second step includes (a) step of pressing the top sheet portion equivalent portion by the upper die and the lower die, and (b) step of pressing the two standing wall portion equivalent portions by the lower die and the two cam dies.

In the manufacturing method described below, the second step may include the following Steps (a) and (b). Preferably, this second step is used when the deformed steel sheet is the preliminary formed article that is plastically deformed.

In Step (a), the top sheet portion equivalent portion is pressed by a press die including a pair of upper die and lower die. In Step (b), the two standing wall portion equivalent portions are pressed by the lower die and the two cam dies. In the manufacturing method of the following embodiment, a die may be used in which a protrusion portion is formed when both Step (a) and Step (b) are completed. The cam die mainly moves in a direction (horizontal direction) perpendicular to a pressing direction. In a typical example, the cam die moves in only the horizontal direction.

A timing at which Steps (a) and (b) are performed can be selected depending on situations, and any one of both may be completed first, or both may be completed at the same time. Further, either Step (a) or Step (b) may start first, or both may start at the same time. First to third examples in which the timings of completion of Step (a) and Step (b) are different will be described below.

In the first example of the second step, Step (b) is completed after Step (a) is completed. Preferably, the first example is performed when the angle X formed by the top sheet portion and the protrusion portion is 90° or more and 135° or less. As long as Step (b) is completed after Step (a) is completed, the movement of the cam die in Step (b) may start before Step (a) is completed.

In the second example of the second step, Step (a) is completed after Step (b) is completed. Preferably, the second example is performed when the angle X formed by the top sheet portion and the protrusion portion is 135° or more and 180° or less. As long as Step (a) is completed after Step (b) is completed, the movement of the press die in Step (a) may start before Step (b) is completed.

In the third example of the second step, Step (a) and Step (b) are completed at the same time. As long as Steps (a) and (b) are completed at the same time, there is no limitation on a start timing of the movement of the press die in Step (a) and a start timing of the movement of the cam die in Step (b).

After the second step, the flange portion 117 of the press-formed article 100 may be cut when necessary.

Hereinafter, a specific example of the manufacturing method when the second step is performed by the hot stamping will be described with reference to the drawings. However, even when the second step is performed by the cold pressing, the step of the present embodiment can be used. In the present embodiment, a case where the preliminary formed article 301 which is plastically deformed is used as a deformed steel sheet will be described.

Figure 13:
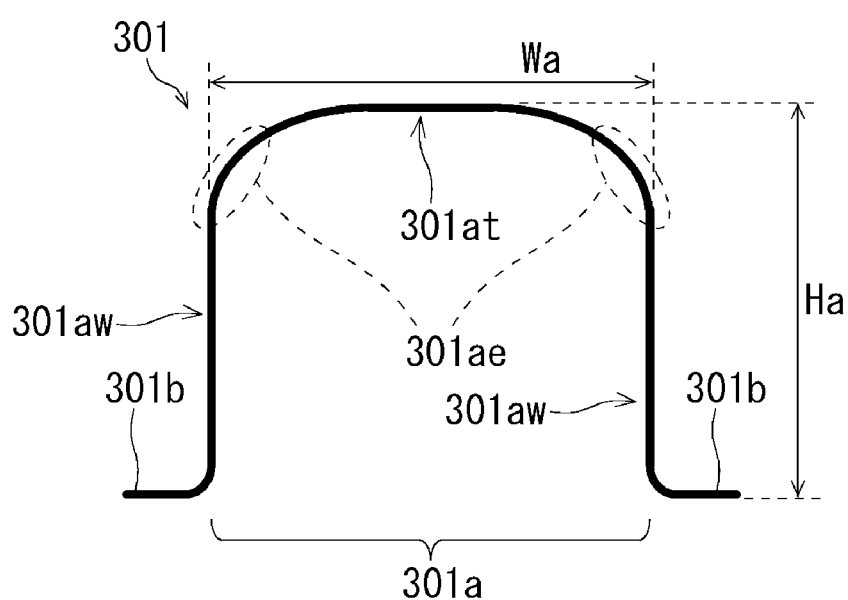
FIG. 13 is a cross-sectional view schematically showing one example of the preliminary formed article formed in the manufacturing method of the present embodiment.

First, in the first step, by deforming the material steel sheet, the preliminary formed article 301 (deformed steel sheet) is formed, which at least includes the portion (top sheet portion equivalent portion) which becomes the top sheet portion 111, the portion (two standing wall portion equivalent portions) which becomes the two standing wall portions 113, the portion (protrusion portion equivalent portion) which becomes the protrusion portion 115, and the portion (the flange portion equivalent portion) which become the flange portion 117. The first step can be performed by the method described above (for example, pressing). FIG. 13 schematically shows a cross section (cross section perpendicular to the longitudinal direction) of an example of the preliminary formed article 301 formed in the first step.

As shown in FIG. 13, the preliminary formed article 301 includes a U-shaped portion 301a and flat portions 301b (flange portion equivalent portions) which becomes the flange portions 117. The U-shaped portion 301a includes two standing wall portion equivalent portions 301aw and a top sheet portion equivalent portion 301at, and further includes protrusion portion equivalent portions 301ae.

In the preliminary formed article 301, the two standing wall portion equivalent portions 301aw are bent in the same direction with respect to the top sheet portion equivalent portion 301at. That is, the two standing wall portion equivalent portions 301aw are together bent toward one main surface side of the top sheet portion equivalent portion 301at.

The cross section of the preliminary formed article 301 is hat-shaped. The cross section of the U-shaped portion 301a is U-shaped. The preliminary formed article 301 is plastically deformed and maintains the shape shown in FIG. 13 in a state in which a load is not applied.

A length (cross section length) of the U-shaped portion 301a is defined as Lu. Further, in the press-formed article 100, a height of the standing wall portion is defined as Hb (corresponding to Hb1 in FIG. 16A), and a width between the two standing wall portions is defined as Wb (corresponding to Wb1 in FIG. 16A). The U-shaped portion 301a includes the protrusion portion equivalent portions 301ae which become the protrusion portions 115 in the second step, in addition to the standing wall portion equivalent portions 301aw and the top sheet portion equivalent portion 301at. Therefore, the length Lu, the width Wb, and the height Hb satisfy a relationship of Wb+2Hb<Lu. Further, a width of the U-shaped portion 301a is defined as Wa, and a height thereof is defined as Ha. It is preferable that a relationship of Wb≤Wa and a relationship of Wb+2Hb<Wa+2Ha are satisfied.

In the U-shaped portion 301a of the preliminary formed article 301 shown in FIG. 13, there is no clear boundary between the protrusion portion equivalent portion 301ae and the other portions.

An end portion of the flat portion 301b of the preliminary formed article 301 may be lowered downward (in a direction away from the top sheet portion 111). In FIGS. 14A to 14H below, an example in which the second step is performed using the preliminary formed article 301 in which the end portion of the flat portion 301b is not lowered will be described.

When the second step is performed by the hot stamping, the preliminary formed article 301 is preheated to a temperature of the Ac3 transformation point or more (for example, a temperature higher than the Ac3 transformation point by 80° C. or higher).

Figure 14A:
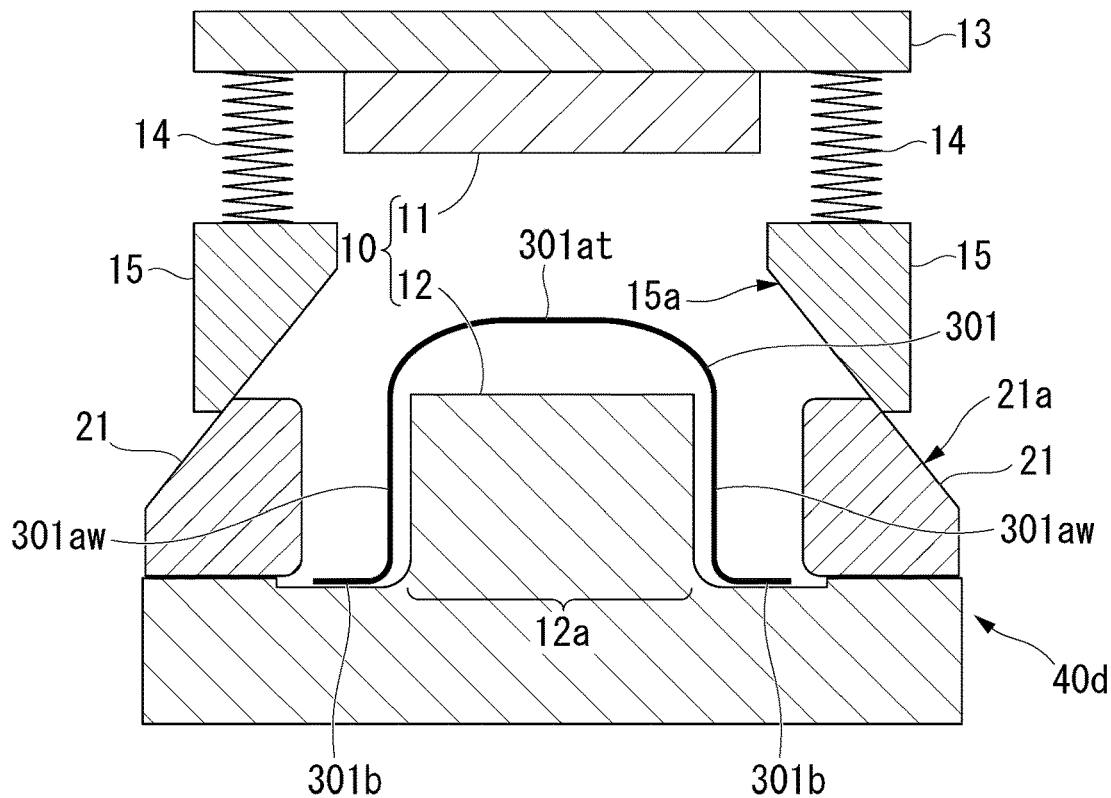
FIG. 14A is a cross-sectional view schematically showing one step in a second step in the example of the manufacturing method of the present embodiment, and is a cross-sectional view in the first region of the preliminary formed article.

Next, the heated preliminary formed article 301 is pressed by a pressing apparatus 40d. An example of the configuration of the press die used for the pressing is shown in FIG. 14A and the like. The pressing apparatus 40d includes a press die 10, a plate 13, extension/contraction mechanisms 14, cam pressing dies 15, and cam dies (slide dies) 21.

The press die 10 includes a pair of upper die 11 and lower die 12. The lower die 12 includes a protrusion 12a of which a convex surface faces a direction of the upper die 11. The cam pressing die 15 and the cam die 21 have inclined surfaces 15a and 21a which act as a cam mechanism. The cam pressing dies 15 are fixed to the plate 13 via the extension/contraction mechanisms 14 that can be expanded and contracted. As the extension/contraction mechanism, a known extension/contraction mechanism such as a spring or a hydraulic cylinder can be used.

As the plate 13 is lowered, the upper die 11 and the cam pressing dies 15 are lowered. As the cam pressing dies 15 are lowered, the cam dies 21 are pushed by the cam pressing dies 15 and move to the protrusion 12a side of the lower die 12. As is well known, the timing of movement of the cam die 21 can be adjusted by changing positions and shapes of the inclined surfaces 15a and 21a. That is, by these adjustments, the timings of the completion of the above-mentioned Step (a) and the completion of Step (b) can be adjusted.

In the above example, the cam dies 21 are moved by the cam mechanism. However, the cam dies 21 may be configured to move independently by a hydraulic cylinder or the like without depending on the movements of other dies without using the cam mechanism.

In the present embodiment, an example is shown in which the upper die 11 and the cam pressing dies 15 are attached to the same slide of the press machine via the plate 13. However, the upper die 11 and the cam pressing dies 15 may be attached to separate slides of the press machine and operated individually.

Further, in the present embodiment, an example in which the cam dies 21 are moved by being pressed against the cam pressing dies 15 is shown. However, the cam dies 21 may be moved independently of the upper die 11 by a driving device directly attached to the cam dies 21.

The press die 10 and the cam dies 21 have a cooling function. For example, the press die 10 and the cam dies 21 may be configured such that cooling water circulates inside them. By performing the press using the cooled die, the heated preliminary formed article 301 is formed and cooled. As a result, press forming and quenching are performed. The cooling may be performed by ejecting water from the die.

An example of the step of press forming using the apparatus of FIG. 14A will be described below. FIGS. 14A to 14H schematically show an example in which the second step is performed by the method of the second example described above. In FIGS. 14A to 14H, the preliminary formed article 301 (deformed steel sheet) shown in FIG. 1 will be used for description.

Preferably, the method of this second example is used when the angle X of the formed article 100 is in a range of 135° to 180°.

FIGS. 14A, 14C, 14E and 14G show cross-sectional views in a cross section of the preliminary formed article 301 (deformed steel sheet) corresponding to the protrusion region P1 of the formed article 100. Moreover, FIGS. 14B, 14D, 14F and 14H show cross-sectional views in a cross section corresponding to the non-protrusion region P2 of the formed article 100. That is, FIGS. 14A and 14B, FIGS. 14C and 14D, FIGS. 14E and 14F, and FIGS. 14G and 14H show cross sections of the preliminary formed article 301, the press die 10, and the like at different cross sections at the same time.

Figure 14B:
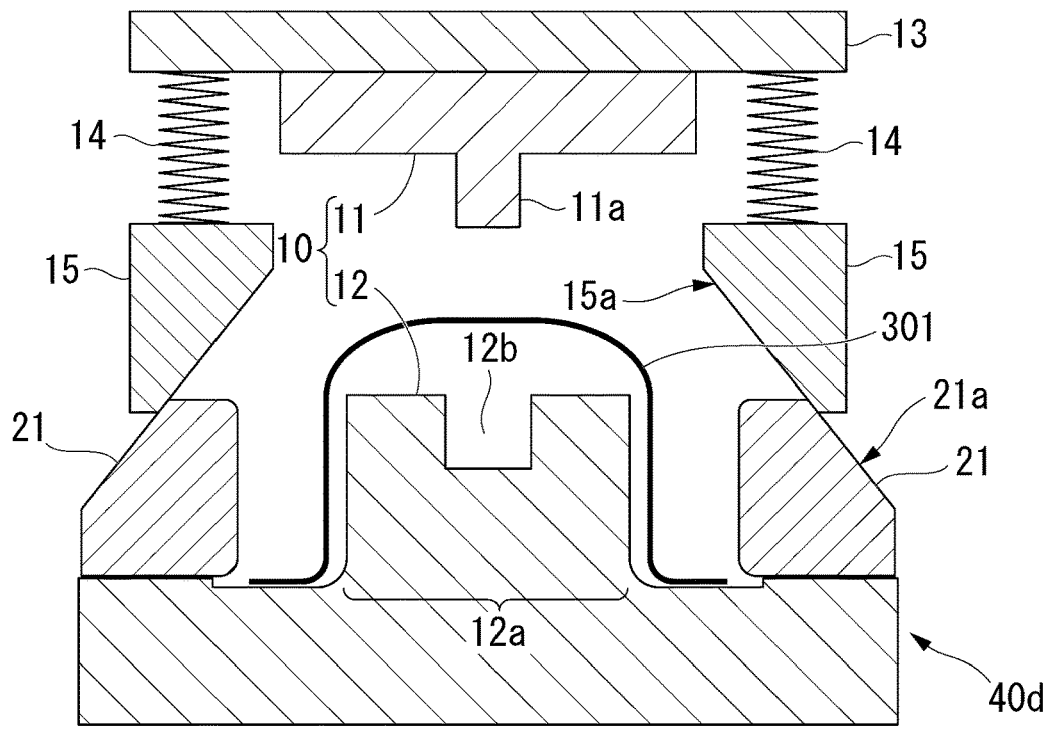
FIG. 14B is a cross-sectional view schematically showing one step in the second step in the example of the manufacturing method of the present embodiment, and is a cross-sectional view in the second region of the preliminary formed article.

First, as shown in FIGS. 14A and 14B, the preliminary formed article 301 is disposed between the upper die 11 and the lower die 12. At this time, it is preferable to dispose the lower die 12 and the preliminary formed article 301 in a state where the protrusion 12a of the lower die 12 and at least a portion of the preliminary formed article 301 are not in contact with each other. In the example of FIG. 14A, the protrusion 12a of the lower die 12 and the preliminary formed article 301 are not in contact with each other.

As shown in FIG. 14B, the upper die 11 is provided with a protruding die portion 11a, and the lower die 12 is provided with a recessed die portion 12b.

When the preliminary formed article 301 is placed between the upper die 11 and the lower die 12, in a state where the U-shaped portion 301a of the preliminary formed article 301 (the region including the portion (top sheet portion equivalent portion) which becomes the top sheet portion 111, the portion (two standing wall portion equivalent portions) which becomes the two standing wall portions 113, and the portion (protrusion portion equivalent portion) which becomes the protrusion portion 115) is in contact with the protrusion 12a of the lower die 12, a place of the preliminary formed article 301 in contact with the protrusion 12a of the lower die 12 is cooled by the lower die 12. In this case, a steel sheet temperature required for hot pressing cannot be maintained during the press forming. Therefore, there is a concern that the press-formed article may be cracked or wrinkled, and a desired strength cannot be obtained. In addition, a cooling rate required for quenching could not be obtained. It is impossible to obtain a desired strength.

In particular, since cracks and wrinkles are likely to occur in the portion (the protrusion portion equivalent portion) of the preliminary formed article 301 which becomes the protrusion portion 115 and in the vicinity thereof, it is important to dispose the preliminary formed article 301 in the state in which the preliminary formed article 301 is in contact with the protrusion 12a of the lower die 12.

When the second step is performed by the hot stamping, preferably, the temperature of the first region (the region corresponding to the protrusion region P1 of the formed article 100) of the preliminary formed article 301 at the time when the step of disposing the preliminary formed article 301 between the upper die 11 and the lower die 12 ends is set to 700° C. or higher, a time until the preliminary formed article 301 and the upper die 11 come into contact with each other or until the preliminary formed article 301 and the cam die 21 come into contact with each other from the time when the step of disposing the preliminary formed article 301 between the upper die 11 and the lower die 12 ends is set within 3 seconds or less, and more preferably, 2 seconds or less is set from the viewpoint of suppressing cracks and wrinkles in the portion (protrusion portion equivalent portion) which becomes the protrusion portion 115 and in the vicinity thereof.

In the example shown in FIG. 14A, since the preliminary formed article 301 and the lower die 12 are not in contact with each other, it is possible to suppress cracks and wrinkles in the portion (protrusion portion equivalent portion) which becomes the protrusion portion 115 and in the vicinity thereof.

However, even in a case where the protrusion 12a of the lower die 12 and a portion of the preliminary formed article 301 come into contact with each other when the preliminary formed article 301 is placed between the upper die 11 and the lower die 12, the time until the preliminary formed article 301 and the upper die 11 come into contact with each other or until the preliminary formed article 301 and the cam die 21 come into contact with each other from the time when the step of disposing the preliminary formed article 301 between the upper die 11 and the lower die 12 ends is set within 3 seconds or less, and thus, it is possible to suppress the cracks and wrinkles in the portion (protrusion portion equivalent portion) which becomes the protrusion portion 115 and in the vicinity thereof.

Moreover, when the second step is performed by the hot stamping, preferably, the temperature of the first region (the region corresponding to the protrusion region P1 of the formed article 100) of the preliminary formed article 301 when the preliminary formed article 301 and the upper die 11 or the preliminary formed article 301 and the cam die 21 come into contact with each other is set to 700° C. or higher. The temperature of the preliminary formed article 301 can be measured by a non-contact thermometer using infrared rays or a thermometer incorporated in a die.

Figure 14C:
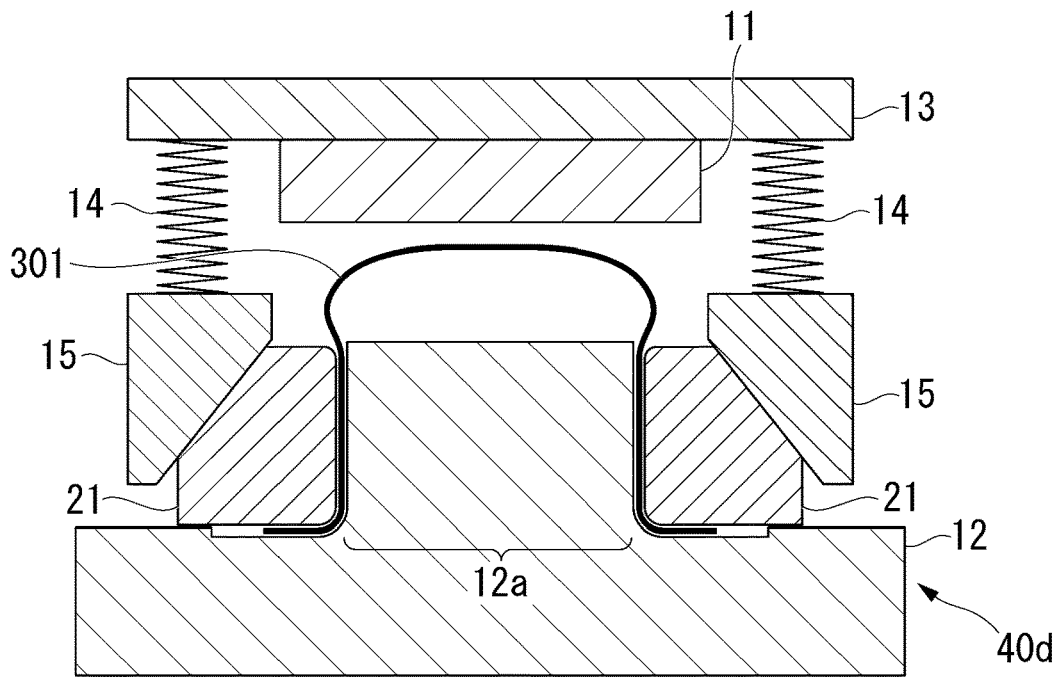
FIG. 14C is a cross-sectional view in the first region of the preliminary formed article schematically showing one step following Step of FIG. 14A.
Figure 14D:
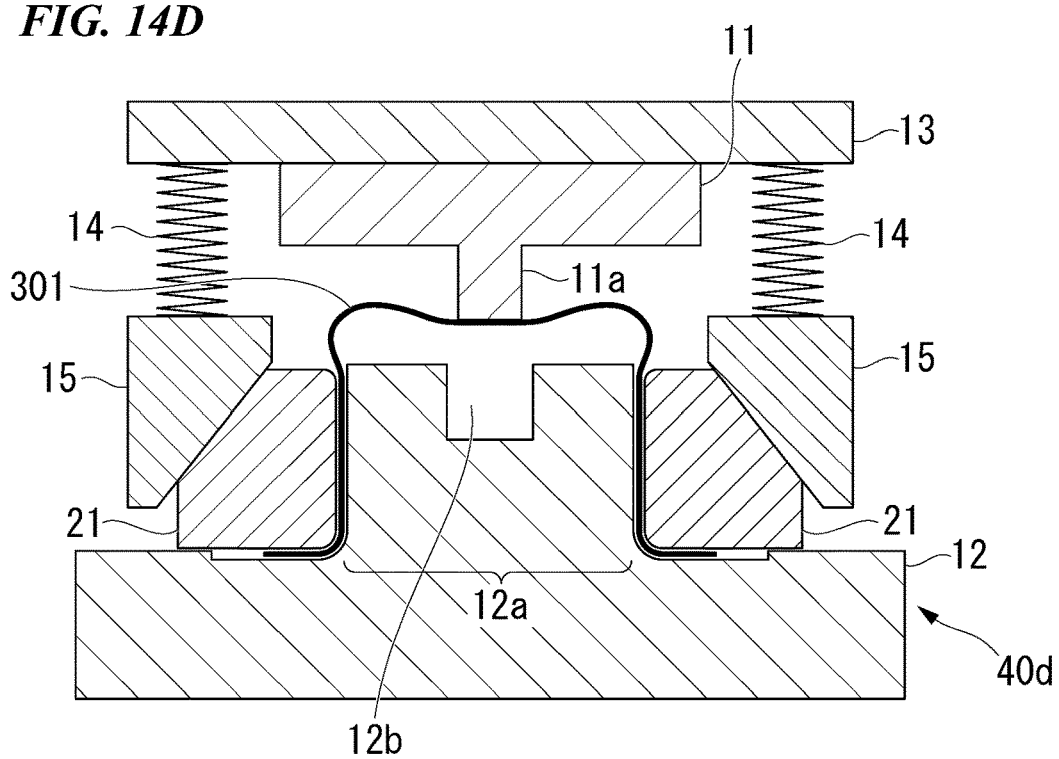
FIG. 14D is a cross-sectional view in the second region of the preliminary formed article schematically showing one step following Step of FIG. 14B.

Next, the plate 13 is lowered. The cam dies 21 are pushed by the cam pressing dies 15 which are lowered with the plate 13, and slide toward the protrusion 12a. As a result, as shown in FIGS. 14C and 14D, the lower die 12 (protrusion 12a) and the cam dies 21 press and restrain the portion which becomes the standing wall portion 113. In this way, Step (b) is completed.

At this time, as shown in FIG. 14D, the deformation of the preliminary formed article 301 may be started by the protruding die portion 11a.

Figure 14E:
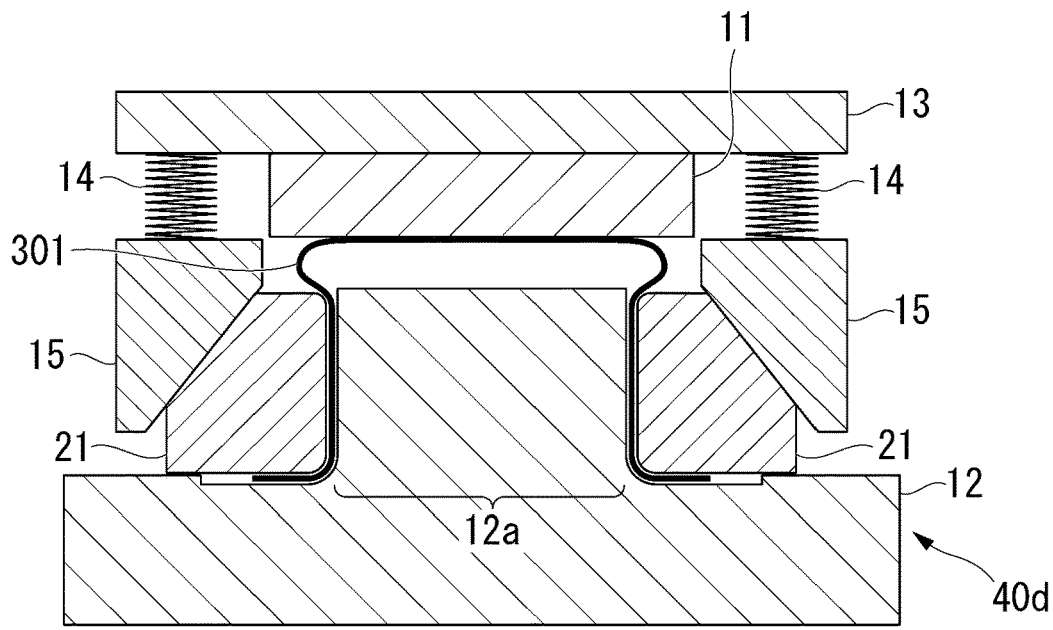
FIG. 14E is a cross-sectional view in the first region of the preliminary formed article schematically showing one step following Step of FIG. 14C.
Figure 14F:
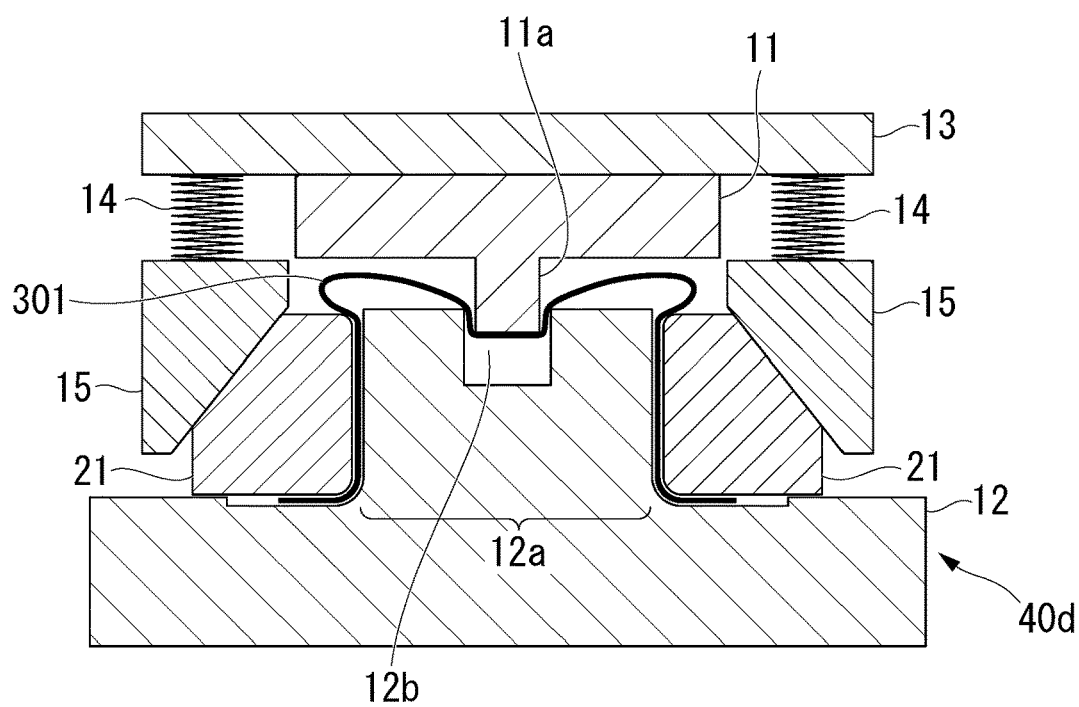
FIG. 14F is a cross-sectional view in the second region of the preliminary formed article schematically showing one step following Step of FIG. 14D.

Next, as shown in FIGS. 14E and 14F, the plate 13 is further lowered, and thus, the pressing of the portion which becomes the top sheet portion is started. At this time, the extension/contraction mechanism 14 contracts. As shown in FIG. 14E, since the preliminary formed article 301 has the protrusion portion equivalent portion in the first region (the region corresponding to the protrusion region P1 of the formed article 100), the protrusion portion equivalent portion extends toward the cam die 21 side.

Figure 14G:
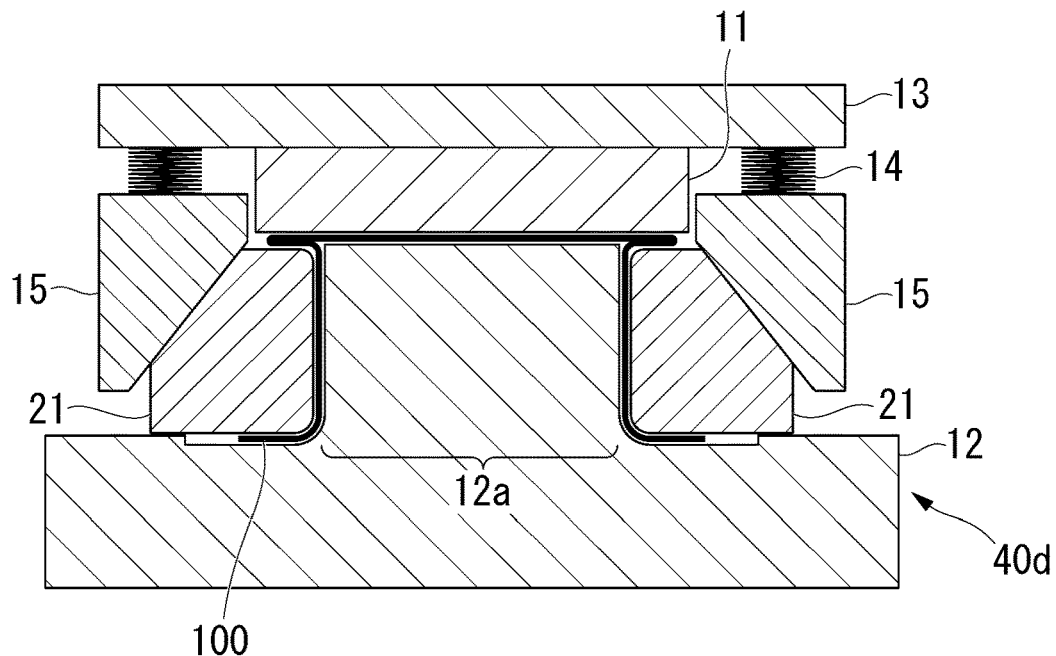
FIG. 14G is a cross-sectional view in the first region of the preliminary formed article schematically showing one step following Step of FIG. 14E.
Figure 14H:
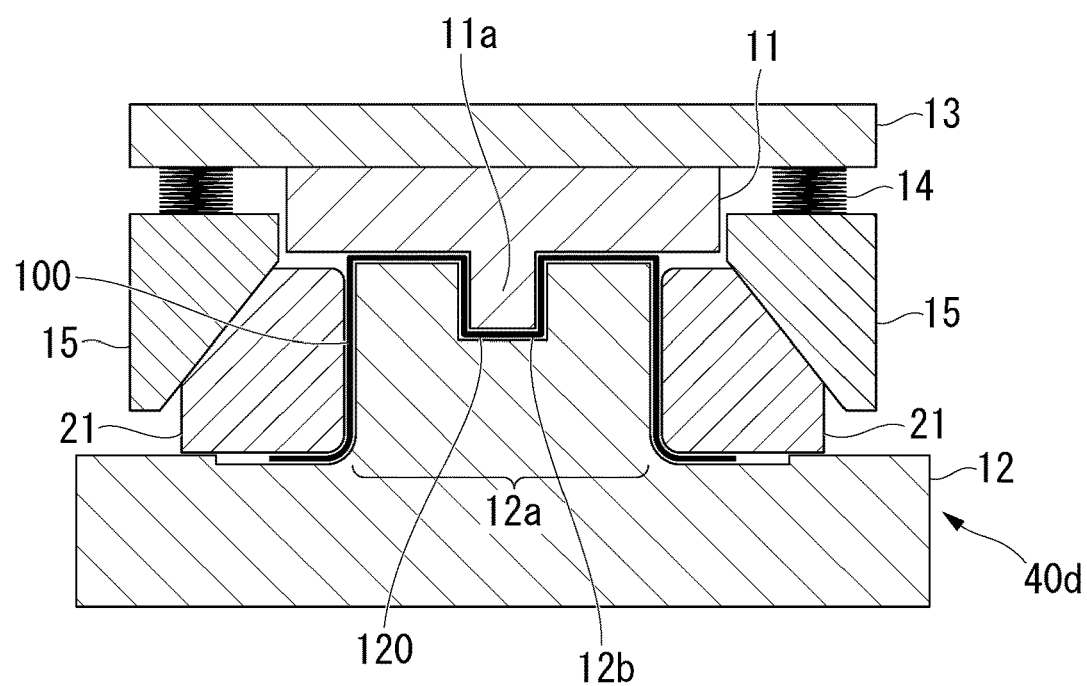
FIG. 14H is a cross-sectional view in the second region of the preliminary formed article schematically showing one step following Step of FIG. 14F.

Next, as shown in FIGS. 14G and 14H, the upper die 11 is lowered to the bottom dead point, and the portion which becomes the top sheet portion is pressed and restrained by the upper die 11 and the lower die 12 (protrusion 12a). In this way, Step (a) is completed.

As described above, the press forming is completed. As shown in FIG. 14G, in the protrusion region P1 of the press-formed article 100, the protrusion portion 115 having the overlapping portion 115d is formed. Further, as shown in FIG. 14H, the recessed part 120 is formed in the non-protrusion region P2 of the press-formed article 100. In this way, the press-formed article 100 of the present embodiment is obtained.

When performing the hot stamping, in order to ensure the hardenability of the protrusion portion, that is, in order to set the tensile strength of the protrusion portion of the press-formed article to a predetermined target strength of the hot stamping, it is necessary to perform the forming without reducing the cooling rate during the forming. From this point of view, in a portion except for the protrusion portion, since both surfaces of the steel sheet come into contact with the die, the material can be cooled from both surfaces and a predetermined cooling rate can be secured.

Meanwhile, in the protrusion portion, since only one surface (outside of the press-formed article) of the steel sheet is cooled, the cooling rate may decrease and a desired tensile strength may not be obtained. Therefore, when the angle X of the protrusion portion of the press-formed article 100 is in the range of 135° to 180°, it is preferable to form the standing wall portion with the cam die 21 and then form the top sheet portion with the upper die 11.

In a case where the second step is performed by the hot stamping, at the time when the movements of the dies (press dies 10 and cam dies 21) are completed in order to perform proper quenching in the second step, it is preferable that the dies and the press-formed article 100 are in close contact with each other. The press-formed article 100 obtained in the second step is post-treated as necessary. The obtained formed article is used in combination with other components as necessary.

Figure 15:
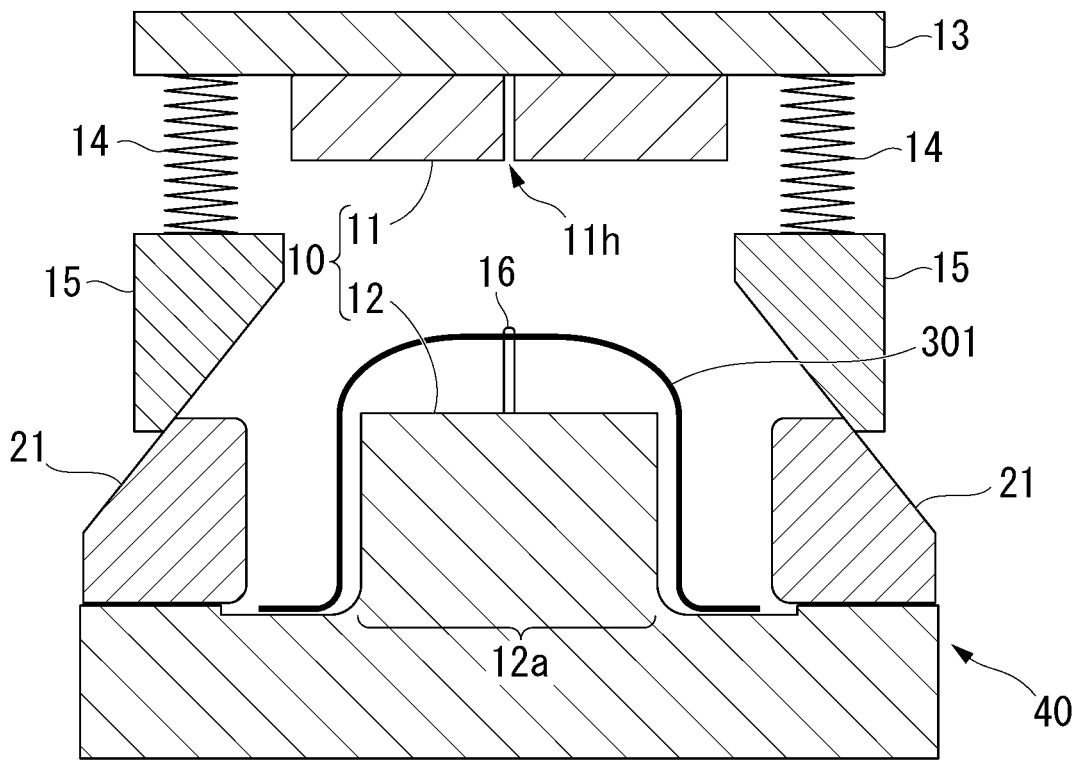
FIG. 15 is a cross-sectional view schematically showing one example of an apparatus that can be used in the manufacturing method of the present embodiment.

The above-mentioned second step may be performed using a press die including a pin protruding from at least one of the upper die and the lower die of the press die (the same applies to other embodiments). An example of the second step is schematically shown in FIG. 15. A press die of FIG. 15 is similar to the press die shown in FIG. 14A and the like, but includes a pin 16 protruding from the protrusion 12a of the lower die 12. The upper die 11 is formed with a hole 11h into which the pin 16 is inserted when the upper die 11 is lowered. The pin 16 is inserted into a through-hole formed in the preliminary formed article 301. By performing the press forming in the second step in this state, the protrusion portion can be formed with high accuracy. The press die may have a mechanism in which at least a portion of the pin 16 is housed in the lower die 12 when the pin 16 is pressed from above.

In the present embodiment, the case where the hot pressing is performed in the second step is described, but the second step can also be performed by the cold pressing. When the second step is performed by the cold pressing, there is an advantage that it is not necessary to consider the time until the preliminary formed article 301 and the upper die 11 come into contact with each other or until the preliminary formed article 301 and the cam die 21 come into contact with each other from the time when the step of disposing the preliminary formed article 301 between the upper die 11 and the lower die 12 ends.

When the press-formed article is manufactured from a 590 MPa class material steel sheet (thickness 1.4 mm) without using the hot stamping, the formed article having the same shape as the hot press-formed article hot-pressed in the second step can be manufactured. This is because the material steel sheet(blank) has high ductility. When trying to form the 590 MPa class material steel sheet without using the hot stamping, the steel sheet having high ductility can be processed, but when the ductility of the steel sheet is low, cracks may occur and processing may not be possible. Preferably, the ductility of the material steel sheet is 35% or more in a tensile test having a gauge length of 50 mm. When the ductility of the material steel sheet is within this range, close contact bending for forming a protrusion portion having a desired shape is possible.

In the above description, the manufacturing method of the press-formed article 100 in which the recessed part 120 is formed in the non-protrusion region P2 is described. However, the press-formed article 100A in which the top sheet portion 111 has the enlarged top sheet portion 111' in the non-protrusion region P2 and the press-formed article 100B in which the standing wall portion 113 has the enlarged standing wall portion 113' in the non-protrusion region P2 can also be manufactured in the same manner. When the press-formed articles 100A and 100B are manufactured, the recessed die portion 12b is not provided in the lower die 12 shown in FIGS. 14B, 14D, 14F, and 14H, and a lower die having a shape corresponding to the enlarged top sheet portion 111' or the enlarged standing wall portion 113' may be adopted.

Example 1

The present invention will be described in more detail with reference to the following examples.

Example 1

In Example 1, a simulation of a three-point bending test was performed on a structural member using the press-formed article (formed article) of the above embodiment and the conventional article. For the simulation, general-purpose FEM (finite element method) software (manufactured by LIVERMORE SOFTWARE TECHNOLOGY, trade name LS-DYNA) was used.

Figure 16A:
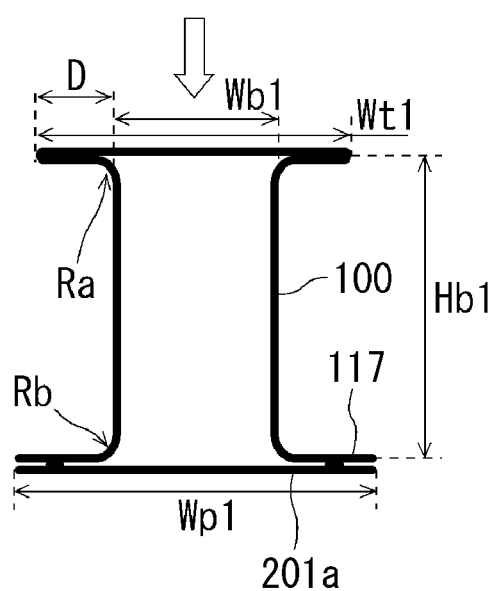
FIG. 16A is a cross-sectional view schematically showing a shape in a first region of a sample 1 used in Example 1.

FIG. 16A schematically shows a cross-sectional view of the protrusion region of the sample 1 used in the simulation as the structural member according to the above embodiment. A structural member of FIG. 16A includes the press-formed article 100 of the above embodiment and the back sheet 201a welded to the flange portion 117 of the press-formed article 100. A size of Sample 1 shown in FIG. 16A is as follows. However, a thickness of the steel sheet is not considered for the following size.

Angle X: 180°
Angle Y: 90°
Length of protrusion portion D: 10 mm
Height of standing wall portion Hb1: 60 mm
Width between tip end portions of two protrusion portions Wt1: 80 mm
Distance between two standing wall portions (width of top sheet portion) Wb1: 60 mm (80−2D)
Back sheet width Wp1: 100 mm (120−2D)
Radius of curvature at corner portions Ra and Rb: 5 mm
Length in longitudinal direction: 1,000 mm
Length of protrusion region in longitudinal direction: 700 mm Further, the recessed part of the non-protrusion region was disposed at the center of the top sheet portion, and had a height of 20 mm and a width of 30 mm.

Figure 16B:
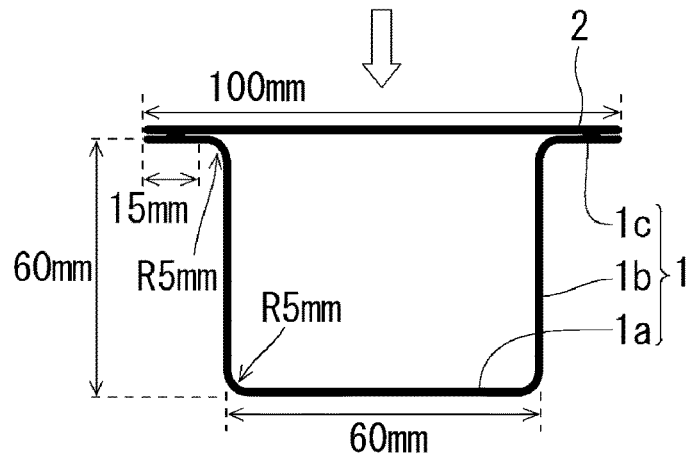
FIG. 16B is a cross-sectional view schematically showing a shape of a sample 2 used in Example 1.
Figure 16C:
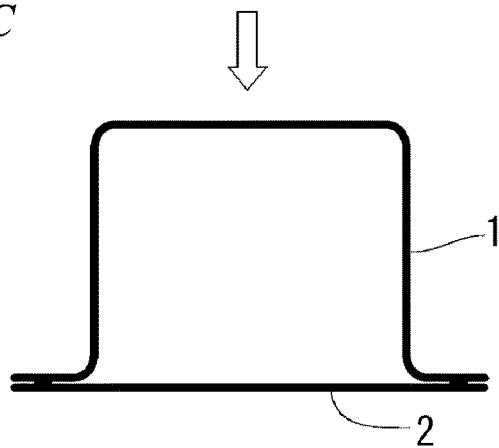
FIG. 16C is a cross-sectional view schematically showing a shape of a sample 3 used in Example 1.

Further, cross-sectional views of Sample 2 and Sample 3 used in the simulation as the structural member of the conventional example are schematically shown in FIGS. 16B and 16C. The sample 2 shown in FIG. 16B includes a press-formed article 1 having a hat-shaped cross section and a back sheet 2 welded to a flange portion 1c of the press-formed article 1. The press-formed article 1 includes a top sheet portion 1a, a standing wall portion 1b, and a flange portion 1c. A size of sample 2 shown in FIG. 16B is as follows.

Width of top sheet portion 1a: 60 mm
Height of standing wall portion 1b: 60 mm
Width of back sheet 2: 100 mm
Radius of curvature at corner portion: 5 mm
Length in longitudinal direction: 1,000 mm Sample 2 and Sample 3 have exactly the same structure and differ only in disposition. Specifically, in Sample 2, the back sheet 2 side is disposed on the upper side (impactor side), and in Sample 3, the top sheet portion 1a side is disposed on the upper side (impactor side). Hereinafter, a disposition (disposition of Sample 2) in which the back sheet side is upward is referred to as a disposition of a reverse hat. Further, a disposition (disposition of Sample 3) in which the top sheet portion side is upward is referred to as a disposition of a normal hat.

As will be described below, collisions that occur in actual structural member mainly occur in the disposition of normal hats. Therefore, a comparative example of Sample 1 (example of the present invention) of the above embodiment is Sample 3 with the normal hat disposition, and Sample 2 with the reverse hat disposition is described as a reference example. Sample 2 and Sample 3 have the same cross-sectional shape in the entire length in the longitudinal direction.

Further, a sample having the cross-sectional shape shown in FIG. 16A in the entire length in the longitudinal direction was used as Sample 4. Sample 4 has the same configuration as Sample 1 except that Sample 4 has the same cross-sectional shape in the entire length in the longitudinal direction. Further, Sample 1 does not have a recessed part.

Samples 1 to 4 were assumed to be formed of a steel sheet having a thickness of 1.4 mm and a tensile strength of 1500 MPa. It was assumed that the flange portion and the back sheet of the press-formed article were spot-welded and fixed at a pitch of 40 mm. Samples 2 to 4 were designed so that the mass per unit length in the longitudinal direction was the same.

Figure 17:
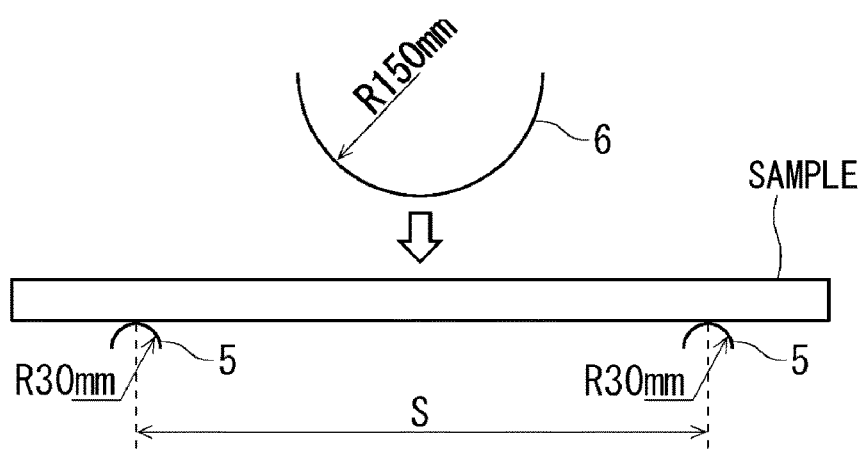
FIG. 17 is a diagram schematically showing a three-point bending test simulated in Example.
Figure 18A:
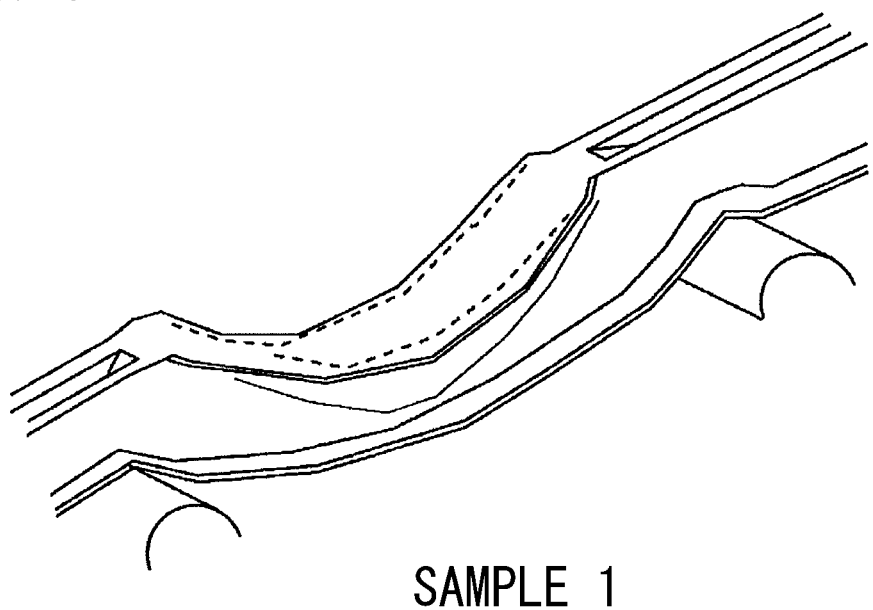
FIG. 18A is a cross-sectional view schematically showing one example of a shape change of a sample 1 in simulation of Example 1.
Figure 18B:
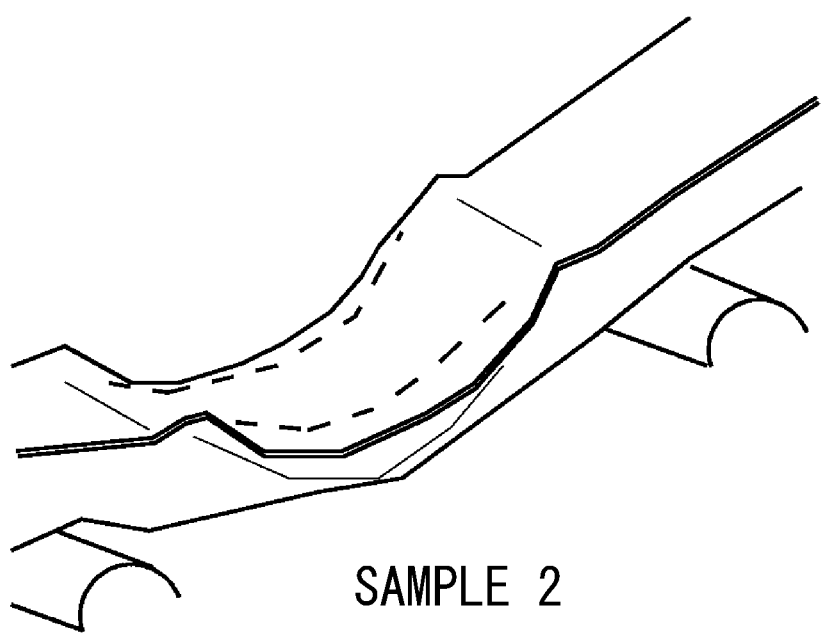
FIG. 18B is a cross-sectional view schematically showing one example of a shape change of a sample 2 in the simulation of Example 1.
Figure 18C:
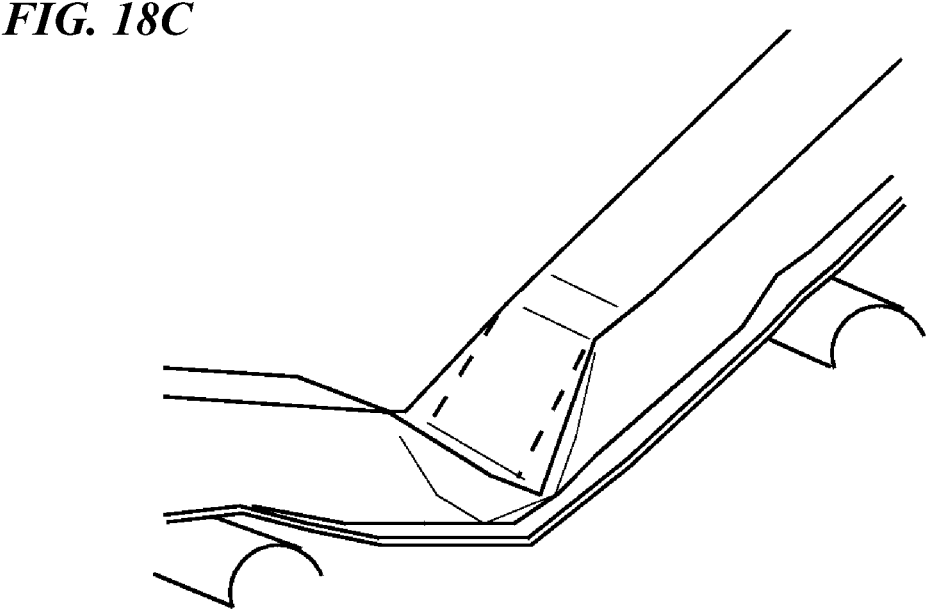
FIG. 18C is a cross-sectional view schematically showing one example of a shape change of a sample 3 in the simulation of Example 1.
Figure 18D:
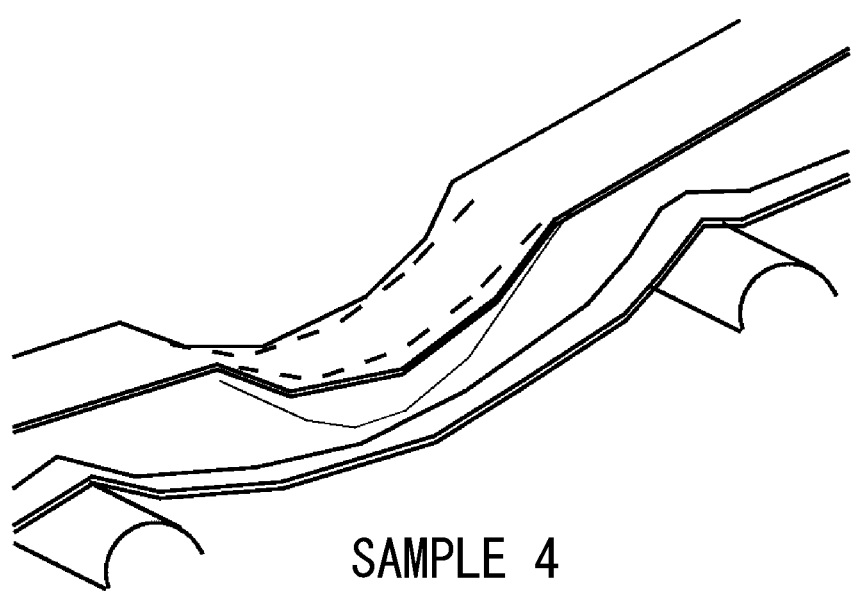
FIG. 18D is a cross-sectional view schematically showing one example of a shape change of a sample 4 in the simulation of Example 1.

The method of the three-point bending test used in the simulation is schematically shown in FIG. 17. The three-point bending test was performed by placing the sample on the two fulcrums 5 and pushing the sample from above by the impactor 6. In the test of Example 1, a distance S between the two fulcrums 5 was set to 400 mm or 700 mm A radius of curvature of the fulcrum 5 was set to 30 mm. A radius of curvature of the impactor 6 was set to 150 mm. A collision speed of the impactor 6 was set to 7.5 km/h.

In the three-point bending test, the impactor 6 collided with each sample from above the sample. A collision direction of the impactor 6 is indicated by an arrow in FIGS. 16A to 16C.

For Samples 1 to 4, when the fulcrum-to-fulcrum distance S is 400 mm and an amount of displacement is 70 mm, perspective views of the samples are schematically shown in FIGS. 18A to 18D. As shown in the drawings, in Sample 1 having the protrusion portion in a portion in the longitudinal direction, Sample 2 with the reverse hat disposition, and Sample 4 having the protrusion portion over the entire length in the longitudinal direction, the standing wall portion is bent in a long range. On the other hand, in Sample 3 with the normal hat disposition, a portion of the standing wall portion is locally buckled.

Figure 19A:
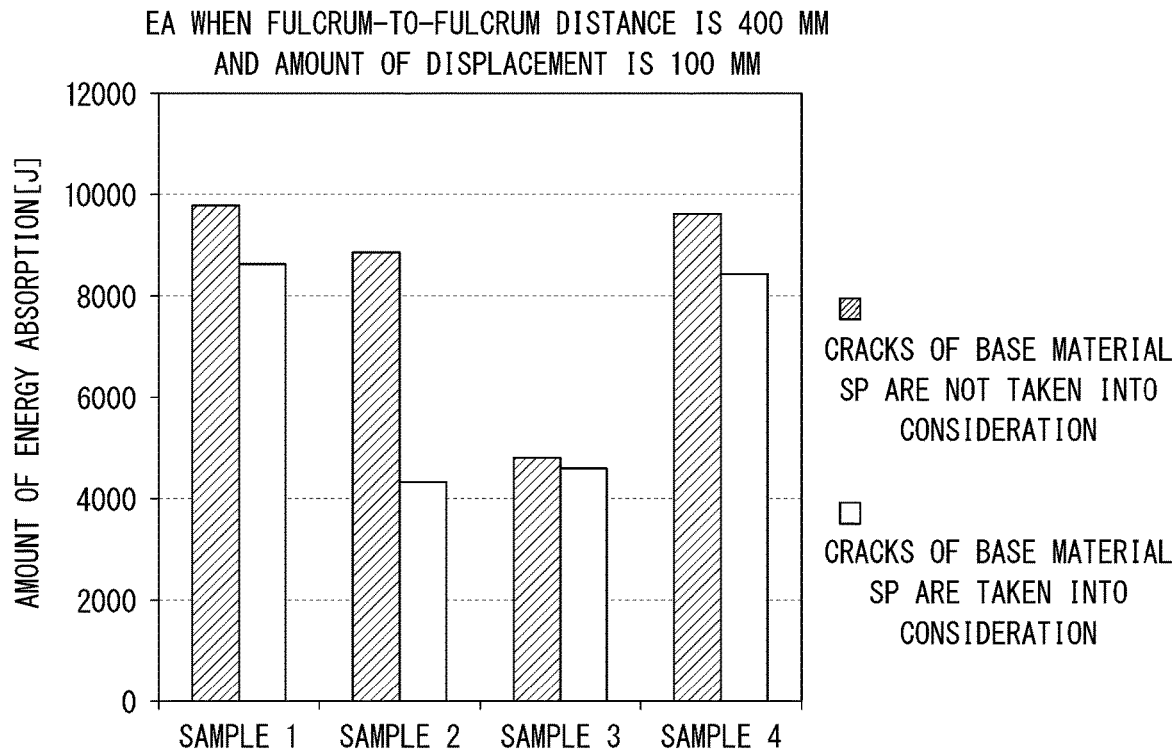
FIG. 19A is a graph schematically showing one example of an amount of energy absorption of each sample in the simulation of Example 1.
Figure 19B:
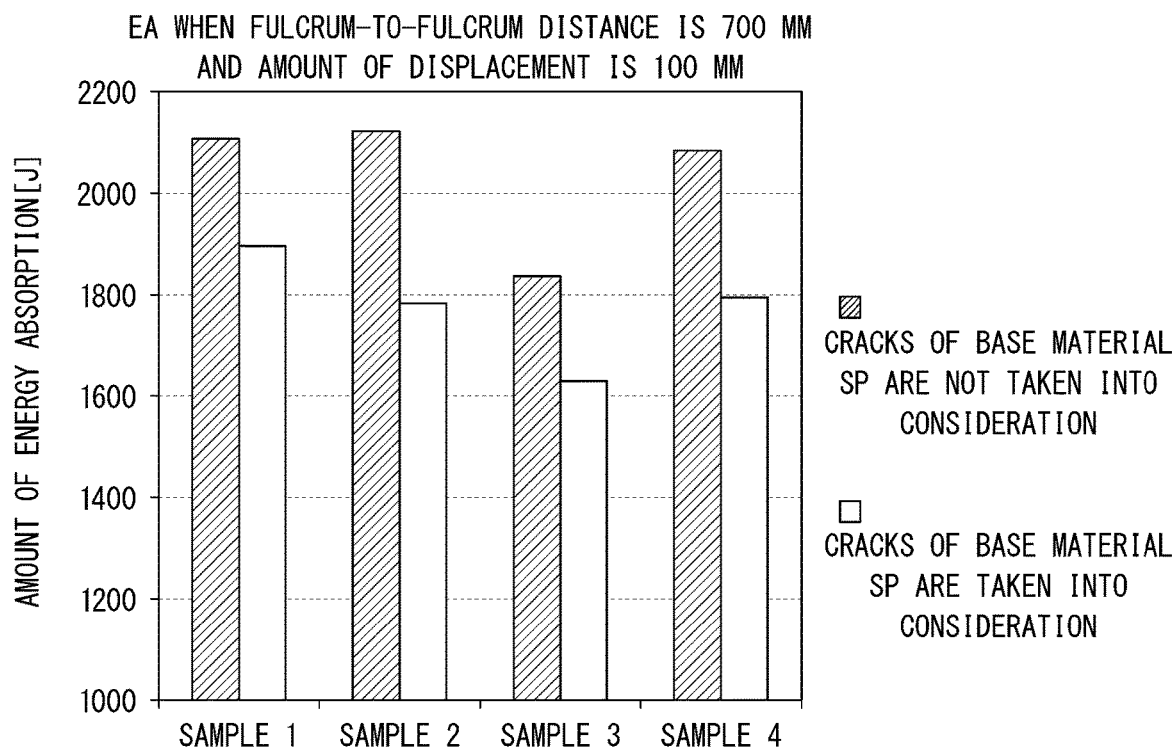
FIG. 19B is a graph schematically showing another example of the amount of energy absorption of each sample in the simulation of Example 1.

For Samples 1 to 4, an amount of energy absorption of each sample when the amount of displacement was 100 mm was determined. The results are shown in FIGS. 19A and 19B. FIG. 19A shows the result of the fulcrum-to-fulcrum distance S of 400 mm, and FIG. 19B shows the result of the fulcrum-to-fulcrum distance S of 700 mm. Automobile structural components that absorb a large amount of energy mean that the safety of occupants in a collision is high.

As shown in FIGS. 19A and 19B, all the samples of the present invention having protrusion portion absorbed more energy than Sample 3 (Comparative Example) with the normal hat disposition. Further, Sample 1 having the protrusion portion in a portion in the longitudinal direction according to the present invention showed higher characteristics than Sample 4 having the protrusion portion in the entire length in the longitudinal direction in most cases.

As shown in FIGS. 19A and 19B, in the result of Sample 2 (reverse hat disposition), the amount of energy absorption when the cracks of the steel sheet and the spot weld are taken into consideration was much lower than the amount of energy absorption amount when the cracks are not taken into consideration. This result suggests that when the impactor 6 collides from the back sheet side, cracks (for example, cracks in the spot-welding portion) are likely to occur.

When a press-formed article having a hat-shaped cross section is used as an automobile or other structural member, in most cases, the top sheet portion side is disposed toward the outside of the body. Therefore, it is necessary to assume that the collision at the time of an accident occurs not from the back sheet side but from the top sheet portion side. In that respect, even when the characteristics of Sample 2 in the reverse hat disposition are good, in most cases, it is meaningless when actually applied as a structural member. Therefore, the characteristics against collision from the top sheet portion side are important. When compared with respect to the collision from the top sheet portion side, Sample 1 of the present invention showed more excellent characteristics than Sample 3 having a normal hat disposition or Sample 4 having the protrusion portion over the entire length in the longitudinal direction. Therefore, Sample 1 of the present invention is very useful as a structural member, and has an advantage that the degree of freedom in design is high because Sample 1 has a protrusion portion only in a portion in the longitudinal direction.

In Sample 1 according to the present invention, the standing wall portion falls inward in the same manner as in Sample 2 with the reverse hat disposition, with respect to the collision from the top sheet portion side at least in the region having the protrusion portion. Therefore, Sample 1 has a larger amount of energy absorption at the time of collision than Sample 3 in the normal hat disposition. Further, in Sample 1, the welded portion between the back sheet and the flange portion is not on the assumed collision side. Therefore, Sample 1 has a smaller deterioration in characteristics due to cracks in the welded portion than Sample 2 in the reverse hat disposition. As described above, Sample 1 according to the present invention is considered to have both the advantages of the reverse hat disposition and the advantages of the normal hat disposition.

Further, Sample 1 of the present invention has characteristics equal to or higher than those of Sample 4 having a protrusion portion over the entire length in the longitudinal direction.

Example 2

In Example 2, the simulation of the three-point bending test was performed in the same manner as in Example 1 for a sample in which only the angle X of sample 1 was changed. The angles X were 105°, 120°, 135°, and 180°. The amount of energy absorption of each sample when the amount of displacement was 100 mm was determined by simulation.

Figure 20A:
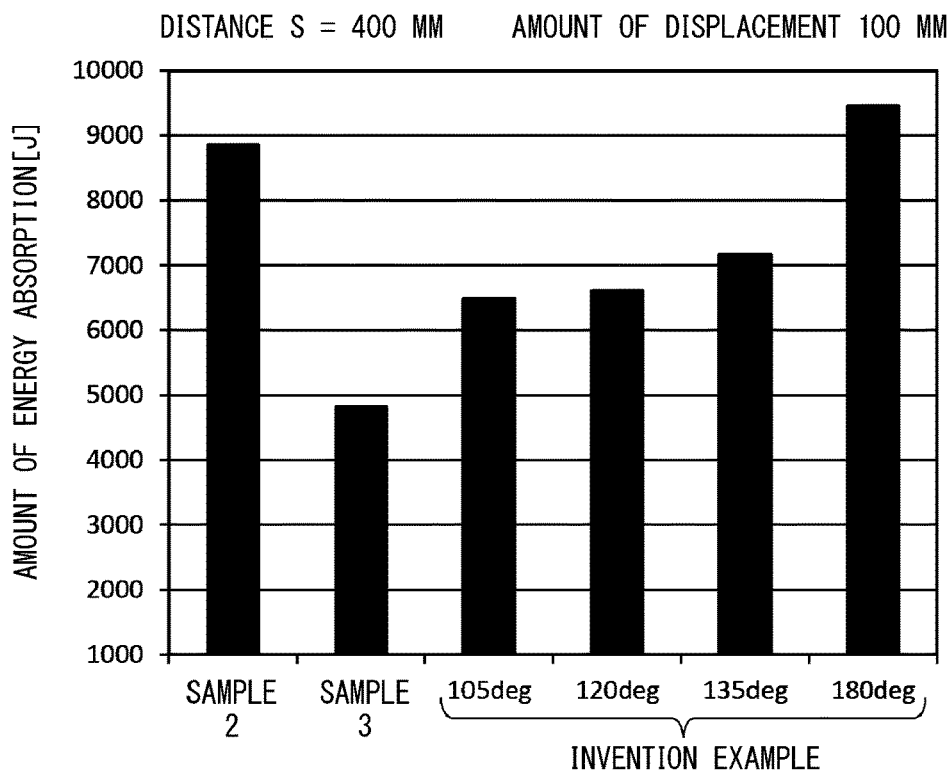
FIG. 20A is a graph schematically showing one example of an amount of energy absorption of each sample in simulation of Example 2.
Figure 20B:
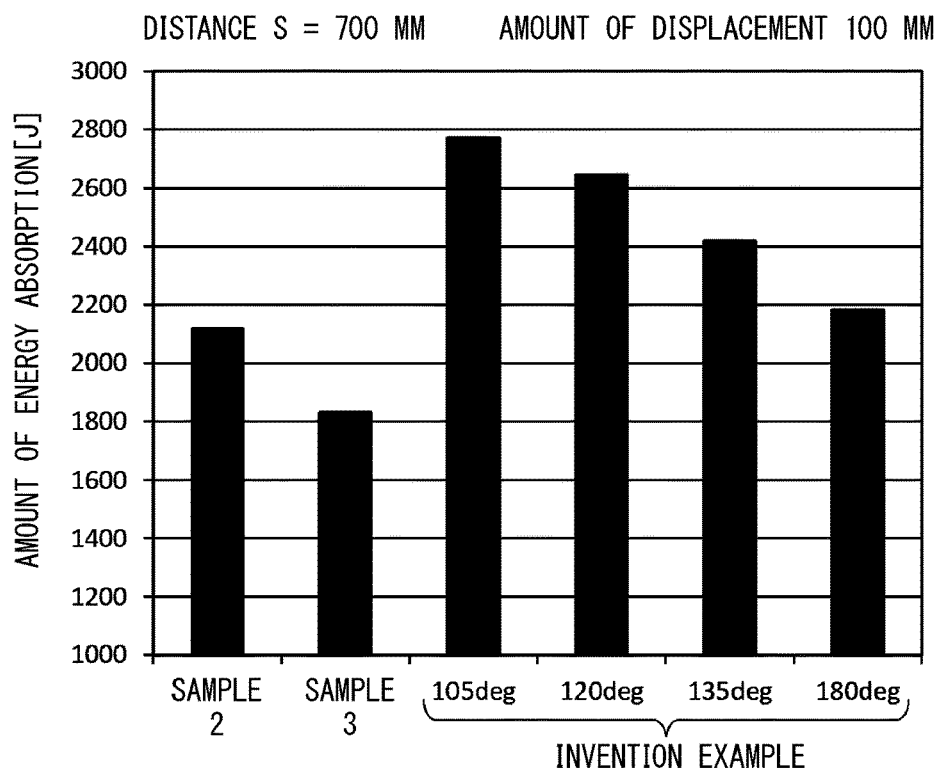
FIG. 20B is a graph schematically showing another example of the amount of energy absorption of each sample in the simulation of Example 2.

The result when the fulcrum-to-fulcrum distance S is 400 mm is shown in FIG. 20A. The result when the fulcrum-to-fulcrum distance S is 700 mm is shown in FIG. 20B. In the simulation of Example 2, cracks in the steel sheet and cracks in the spot-welding portion were not considered.

Figure 21A:
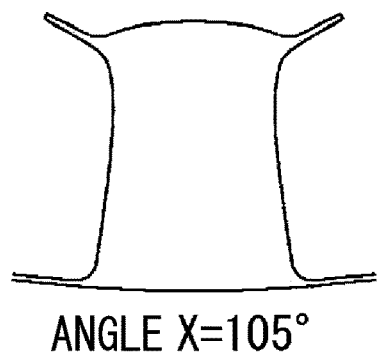
FIG. 21A is a cross-sectional view schematically showing one example of the shape change of the sample in the simulation of Example 2.
Figure 21B:
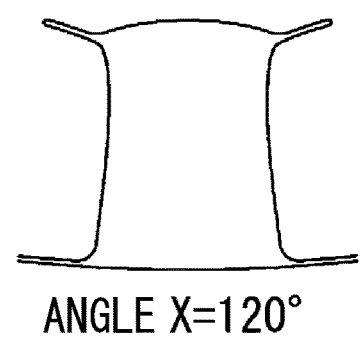
FIG. 21B is a cross-sectional view schematically showing another example of the shape change of the sample in the simulation of Example 2.
Figure 22A:
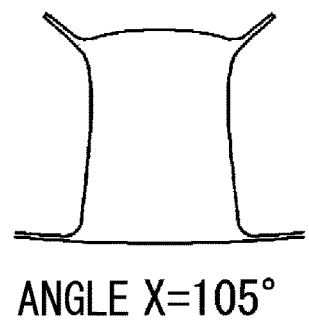
FIG. 22A is a cross-sectional view schematically showing still another example of the shape change of the sample in the simulation of Example 2.
Figure 22B:
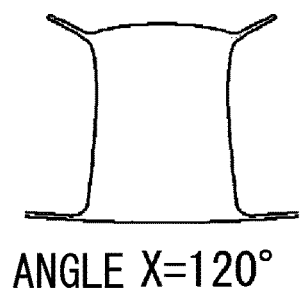
FIG. 22B is a cross-sectional view schematically showing still another example of the shape change of the sample in the simulation of Example 2.

FIGS. 21A and 21B show the results of simulating the cross-sectional shape of each sample having the angle X of 105° and 120° when the fulcrum-to-fulcrum distance S is 400 mm and the amount of displacement is 10 mm. Further, FIGS. 22A and 22B show the results of simulating the cross-sectional shape of each sample having the angle X of 105° and 120° when the fulcrum-to-fulcrum distance S is 700 mm and the amount of displacement is 10 mm.

As shown in FIGS. 20A and 20B, the sample according to the present invention showed better characteristics than Sample 3 in the normal hat disposition even when the angle X changed. As shown in FIG. 20A, when the fulcrum-to-fulcrum distance S was 400 mm, the larger the angle X, the larger the amount of energy amount of energy absorption. On the other hand, as shown in FIG. 20B, when the fulcrum-to-fulcrum distance S was 700 mm, the smaller the angle X, the larger the amount of energy amount of energy absorption.

In the formed article according to the present invention, when a martensite fraction of the protrusion portion is 90% or more, a predetermined hardness can be obtained for the protrusion portion. It can be seen that the hardness of the protrusion portion is equal to or higher than the hardness of the standing wall portion in the same cross section of the formed article.

Example 3

In Example 3, results of investigating a relationship between the martensite fraction of the protrusion portion and a Vickers hardness of the formed article manufactured by the hot stamping are shown. In Example 3, the formed article manufactured by the two-step manufacturing method of the fifth embodiment described above was used.

The martensite fraction was measured for the steel sheet extending from the top sheet portion in the vicinity of the center position of the protrusion portion in the cross section perpendicular to the longitudinal direction, that is, in the vicinity of the position of half the length of the protrusion portion. At the center position of this protrusion portion, a position of a distance (t/4) from a sheet surface (sheet surface located on the steel sheet side extending from the standing wall portion) of the steel sheet located inside the hot-stamping formed article to ¼ of a sheet thickness t of the steel sheet along the sheet thickness direction of the steel sheet was set to a measurement position.

It should be noted that this measurement position may have a certain range, and a range of a distance (t/8) from this measurement position to ⅛ of the sheet thickness t of the steel sheet in the sheet surface direction inside the hot-stamping formed article and the sheet surface direction outside the hot-stamping formed article along the sheet thickness direction of the steel sheet may be a measurement range.

The Vickers hardness (MHv) at the protrusion portion was also measured for the steel sheet extending from the top sheet portion in the vicinity of the center position of the protrusion portion in the cross section perpendicular to the longitudinal direction, that is, near the position of half the length of the protrusion portion. Similar to the measurement of the martensite fraction, at the center position of the protrusion portion, the position of a distance (t/4) from a sheet surface (sheet surface located on the steel sheet side extending from the standing wall portion) of the steel sheet located inside the hot-stamping formed article to ¼ of the sheet thickness t of the steel sheet along the sheet thickness direction of the steel sheet was set to the measurement position.

For the Vickers hardness (MHv) as well, the range of the distance (t/8) of ⅛ of the sheet thickness t of the steel sheet in the sheet surface direction inside the hot-stamping formed article and the sheet surface direction outside the hot-stamping formed article along the sheet thickness direction of the steel sheet may be the measurement range.

At the above measurement positions, the martensite fraction and Vickers hardness (MHv) of the protrusion portion were measured. The steel sheet to be tested was a 1500 MPa class hot-stamping formed article. The cross section to be measured was a cross section through the center of the hot-stamping formed article in the longitudinal direction.

The martensite fraction was read from the photographs of the metallographic structure in the cross section.

For the Vickers hardness (MHv), the Vickers test specified in JIS Z 2244 was performed on the cross section perpendicular to the longitudinal direction. A load of the Vickers test was 1 kgf. At the above measurement positions, Vickers hardness at 5 different points was measured.

Table 1 shows the measurement results of the martensite fraction and Vickers hardness (MHv) of the protrusion portion.

No. 1 is an experimental example in which the top sheet portion equivalent portion of the deformed steel sheet comes into contact with the die (lower die) when the deformed steel sheet is disposed (state of FIG. 14A).

No. 2 is an experimental example in which the top sheet portion equivalent portion of the deformed steel sheet does not come into contact with the die when the deformed steel sheet is disposed, this state is maintained until just before the top sheet portion equivalent portion reaches the bottom dead point, and hot stamping is performed.

No. 3 is an experimental example in which the top sheet portion equivalent portion of the deformed steel sheet does not come into contact with the die and a forming procedure is changed according to the angle X. In No. 3, when the angle X between the protrusion portion and the top sheet portion is 135° or more and 180° or less, first, the standing wall portion is formed by the cam die, and then the top sheet portion is formed by the press die. Moreover, when the angle X between the protrusion portion and the top sheet portion is greater than 95° and 135° or less, first, the top sheet portion is formed by the press die, and then the standing wall portion is formed by the cam die.

TABLE 1

| No. | | Martensite fraction (%) | Vickers hardness MHv | MHv/WHv |
|---|---|---|---|---|
| 1 | Experimental example in which top sheet portion equivalent portion of steel sheet comes into contact with die | 80 | 420 | 0.91 |
| 2 | Experimental example in which state where top sheet portion equivalent portion of steel sheet does not come into contact with die is maintained | 90 | 460 | 1.01 |
| 3 | Experimental example in which top sheet portion equivalent portion of steel sheet does not come into contact with die and forming procedure is changed according to angle X | 95 | 480 | 1.05 |

In addition, Table 1 shows a ratio (MHv/WHv) of the Vickers hardness (MHv) in the protrusion portion with respect to the Vickers hardness (WHv) in the standing wall portion. The Vickers hardness (WHv) in the standing wall portion was also measured in the same cross section as the Vickers hardness (MHv) in the protrusion portion. The measurement was performed in the vicinity of the central position of the standing wall portion, that is, in the vicinity of a position of half the height of the standing wall portion.

As shown in Table 1, in the hot-stamping formed articles (experimental examples of Nos. 2 and 3) obtained by the manufacturing method according to the present invention, the martensite fraction is 90% or more, and the Vickers hardness (MHv) in the protrusion portion is 460 or more.

Further, the ratio (MHv/WHv) of the Vickers hardness (MHv) in the protrusion portion with respect to the Vickers hardness (WHAT) in the standing wall portion is 1.01 or more.

In the hot-stamping formed article of the example of the present invention, when the martensite fraction of the protrusion portion is 90% or more, a predetermined hardness can be obtained for the protrusion portion. It can be seen that the hardness of the protrusion portion is equal to or higher than the hardness of the standing wall portion in the same cross section of the hot-stamping formed article.

INDUSTRIAL APPLICABILITY

The present invention can be used for a formed article, a structural member using the formed article, and a manufacturing method of the formed article.

BRIEF DESCRIPTION OF THE REFERENCE SYMBOLS

10: press die
11, 50: upper die (press die)
12, 60: lower die (press die)
40a, 40b, 40c, 40d: pressing apparatus
51: movable die
61: punch die
64: movable plate
100, 100A, 100B: press-formed article
101: steel sheet
111: top sheet portion
112: boundary portion
112p: boundary point
113: standing wall portion
115: protrusion portion
115d: overlapping portion
117: flange portion
200, 200a, 200b, 200c: structural member (vehicle component)
201: steel sheet member
201a: back sheet (steel sheet)
201b: press-formed article having hat-shaped cross section
201c: press-formed article
301: preliminary formed article (deformed steel sheet)
301at, 310at: top sheet portion equivalent portion
301aw, 310aw: standing wall portion equivalent portion
301ae, 310ae: protrusion portion equivalent portion
310: deformed steel sheet
601, 701: auxiliary member
602, 702: joint portion
P1: protrusion region
P2: non-protrusion region
D: length of protrusion portion and protrusion length from boundary portion
X: angle between top sheet portion and protrusion portion

The invention claimed is:

1. A long formed article made of one steel sheet, the formed article comprising:
   a top sheet portion which extends in a longitudinal direction;
   a standing wall portion which extends downward from each of both edges of the top sheet portion in a width direction; and
   a protrusion portion which is formed in a portion of the top sheet portion in the longitudinal direction by overlapping a portion extending toward an outside from each of both ends of the top sheet portion in the width direction and a portion extending toward the outside from an upper end of the standing wall portion, wherein in the longitudinal direction of the formed article, when a region provided with the protrusion portion is defined as a protrusion region and a region not provided with the protrusion portion is defined as a non-protrusion region, in the non-protrusion region, a recessed part extending in the longitudinal direction is formed in the top sheet portion, and a total value $\alpha$ of inner surface peripheral lengths of the top sheet portion and the standing wall portion in a cross section of the formed article perpendicular to the longitudinal direction in the protrusion region and a total value $\beta$ of inner surface peripheral lengths of the top sheet portion, the standing wall portion, and the recessed part in the cross section of the formed article perpendicular to the longitudinal direction in the non-protrusion region satisfy $1.01 \leq \beta/\alpha \leq 1.50$, wherein the non-protrusion region having the recessed part is formed on at least one of both terminal ends in the longitudinal direction of the formed article.

2. The formed article according to claim 1, further comprising:

a flange portion which extends toward the outside from a lower end of the standing wall portion.

3. The formed article according to claim 1, wherein a length of the protrusion region in the longitudinal direction is 30% or more of an entire length of the formed article in the longitudinal direction.

4. The formed article according to claim 1, wherein in the protrusion portion, a portion extending from the top sheet portion and a portion extending from the standing wall portion are in close contact with each other.

5. The formed article according to claim 1, wherein in the protrusion portion, a portion extending from the top sheet portion and a portion extending from the standing wall portion are joined to each other.

6. The formed article according to claim 1, wherein in the protrusion region, in the cross section of the formed article perpendicular to the longitudinal direction, an angle formed by the top sheet portion and the protrusion portion is 90° or more and 180° or less.

7. The structural member according to claim 1, wherein the length of the standing wall portion of the protrusion portion and the length of the standing wall portion of the non-protrusion portion are substantially equal to each other.

8. The structural member according to claim 1, wherein the non-protrusion region having the recessed part is formed on both terminal ends in the longitudinal direction of the formed article.

9. A structural member comprising:

the formed article according to claim 1; and a steel sheet member which is fixed to the formed article, wherein in a cross-sectional view perpendicular to a longitudinal direction, the formed article and the steel sheet member form a closed cross section.

10. The structural member according to claim 9, further comprising:

an auxiliary member which is joined to at least one of the top sheet portion and the two standing wall portions, or the top sheet portion and at least one of the two standing wall portions.

* * * * *